(12) United States Patent
Walton et al.

(10) Patent No.: US 7,020,110 B2
(45) Date of Patent: *Mar. 28, 2006

(54) RESOURCE ALLOCATION FOR MIMO-OFDM COMMUNICATION SYSTEMS

(75) Inventors: Jay Rod Walton, Westford, MA (US);
John W. Ketchum, Harvard, MA (US);
Mark Wallace, Bedford, MA (US);
Irina Medvedev, Somerville, MA (US)

(73) Assignee: Qualcomm Incorporated, San Diego, CA (US)

( * ) Notice: Subject to any disclaimer, the term of this patent is extended or adjusted under 35 U.S.C. 154(b) by 257 days.

This patent is subject to a terminal disclaimer.

(21) Appl. No.: 10/042,529

(22) Filed: Jan. 8, 2002

(65) Prior Publication Data

US 2003/0128658 A1    Jul. 10, 2003

(51) Int. Cl.
*H04Q 7/00* (2006.01)
(52) U.S. Cl. .................. 370/334; 370/267; 370/347; 370/335; 370/336; 370/337; 370/342; 370/343; 370/344; 455/450; 455/452.1; 455/452.2
(58) Field of Classification Search .............. 370/437, 370/441, 442, 443, 444, 230, 232, 458, 478, 370/480, 481, 484, 536, 208, 334, 267, 347, 370/337, 335, 336, 342, 343, 344; 375/224, 375/225, 227, 259, 260, 267, 299, 346, 347, 375/348; 455/450, 452.1, 452.2, 561, 562.1
See application file for complete search history.

(56) References Cited

U.S. PATENT DOCUMENTS 5,515,378 A    5/1996    Roy, III et al. ............ 370/95.1

(Continued)

FOREIGN PATENT DOCUMENTS

EP    0884862 A1    12/1998

(Continued)

OTHER PUBLICATIONS

Heath, Jr. et al. "Antenna Selection for Spatial Multiplexing Systems with Linear Receivers," IEEE Communications Letters, IEEE Service Center Piscataway, US, vol. 5, No. 4, Apr. 2001, pp. 142-144.

(Continued)

*Primary Examiner*—Wellington Chin
*Assistant Examiner*—Chuong Ho
(74) *Attorney, Agent, or Firm*—Dmitry R. Milikovsky; Sandip S. (Micky) Minhas; Philip Wadsworth

(57) ABSTRACT

Techniques to schedule terminals for data transmission on the downlink and/or uplink in a MIMO-OFDM system based on the spatial and/or frequency "signatures" of the terminals. A scheduler forms one or more sets of terminals for possible (downlink or uplink) data transmission for each of a number of frequency bands. One or more sub-hypotheses may further be formed for each hypothesis, with each sub-hypothesis corresponding to (1) specific assignments of transmit antennas to the terminal(s) in the hypothesis (for the downlink) or (2) a specific order for processing the uplink data transmissions from the terminal(s) (for the uplink). The performance of each sub-hypothesis is then evaluated (e.g., based on one or more performance metrics). One sub-hypothesis is then selected for each frequency band based on the evaluated performance, and the one or more terminals in each selected sub-hypothesis are then scheduled for data transmission on the corresponding frequency band.

65 Claims, 13 Drawing Sheets

U.S. PATENT DOCUMENTS

| | | | | |
|---|---|---|---|---|
| 5,703,905 | A * | 12/1997 | Langberg | 375/232 |
| 6,205,193 | B1 * | 3/2001 | Solve et al. | 375/354 |
| 6,212,242 | B1 | 4/2001 | Smith et al. | |
| 6,215,818 | B1 * | 4/2001 | Velez et al. | 375/233 |
| 6,351,499 | B1 * | 2/2002 | Paulraj et al. | 375/267 |
| 6,353,645 | B1 * | 3/2002 | Solve et al. | 375/354 |
| 6,400,758 | B1 * | 6/2002 | Goldston et al. | 375/216 |
| 6,532,258 | B1 * | 3/2003 | Goldston et al. | 375/227 |
| 6,662,024 | B1 * | 12/2003 | Walton et al. | 455/562.1 |
| 2002/0177447 | A1 * | 11/2002 | Walton et al. | 455/452 |
| 2003/0125040 | A1 * | 7/2003 | Walton et al. | 455/454 |
| 2004/0082356 | A1 * | 4/2004 | Walton et al. | 455/522 |

FOREIGN PATENT DOCUMENTS

| | | |
|---|---|---|
| EP | 0966125 A1 | 12/1999 |

OTHER PUBLICATIONS

Hottinen et al. "Transmit Diversity by Antenna Selection in CDMA Downlink," IEEE International Symposium on Spread Spectrum Techniques and Applications, vol. 3, Sep. 2, 1998, pp. 767-770.

Gore et al. "Selecting an Optimal Set of Transmit Antennas for a Low Rank Matrix Channel," vol. 5, Jun. 5, 2000, pp. 2785-2788.

Wittneben, "Analysis and Comparison of Optimal Predictive Transmitter Selection and Combining Diversity for DECT," Global Telecommunications Conference, 1995. Conference Record. Communication Theory Mini-Conference, Globecom '95., IEEE Singapore Nov. 13-17, 1995, New York, NY, USA, IEEE, US, Nov. 13, 1995, pp. 1527-1531.

* cited by examiner

RESOURCE ALLOCATION FOR MIMO-OFDM COMMUNICATION SYSTEMS

BACKGROUND

1. Field

The present invention relates generally to data communication, and more specifically to techniques for allocating resources in multiple-input multiple-output communication systems that utilize orthogonal frequency division multiplexing (i.e., MIMO-OFDM systems).

2. Background

A multiple-input multiple-output (MIMO) communication system employs multiple ($N_T$) transmit antennas and multiple ($N_R$) receive antennas for transmission of multiple independent data streams. In one MIMO system implementation, at any given moment, all of the data streams are used for a communication between a multiple-antenna base station and a single multiple-antenna terminal. However, in a multiple access communication system, the base station may also concurrently communicate with a number of terminals. In this case, each of the terminals employs a sufficient number of antennas such that it can transmit and/or receive one or more data streams.

The RF channel between the multiple-antenna array at the base station and the multiple-antenna array at a given terminal is referred to as a MIMO channel. The MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized.

A wideband MIMO system typically experiences frequency selective fading, which is characterized by different amounts of attenuation across the system bandwidth. This frequency selective fading causes inter-symbol interference (ISI), which is a phenomenon whereby each symbol in a received signal acts as distortion to subsequent symbols in the received signal. This distortion degrades performance by impacting the ability to correctly detect the received symbols.

Orthogonal frequency division multiplexing (OFDM) may be used to combat ISI and/or for some other purposes. An OFDM system effectively partitions the overall system bandwidth into a number of ($N_F$) frequency subchannels, which may be referred to as subbands or frequency bins. Each frequency subchannel is associated with a respective subcarrier on which data may be modulated. The frequency subchannels of the OFDM system may also experience frequency selective fading, depending on the characteristics (e.g., the multipath profile) of the propagation path between the transmit and receive antennas. With OFDM, the ISI due to frequency selective fading may be combated by repeating a portion of each OFDM symbol (i.e., appending a cyclic prefix to each OFDM symbol), as is known in the art.

For a MIMO system that employs OFDM (i.e., a MIMO-OFDM system), $N_F$ frequency subchannels are available for each of the $N_S$ spatial subchannels of a MIMO channel. Each frequency subchannel of each spatial subchannel may be referred to as a transmission channel. Up to $N_F \cdot N_S$ transmission channels may be available for use at any given moment for communication between the multiple-antenna base station and the multiple-antenna terminal.

The MIMO channel between the base station and each terminal typically experiences different link characteristics and may thus be associated with different transmission capabilities. Moreover, each spatial subchannel may further experience frequency selective fading, in which case the frequency subchannels may also be associated with different transmission capabilities. Thus, the transmission channels available to each terminal may have different effective capacities. Efficient use of the available resources and higher throughput may be achieved if the $N_F \cdot N_S$ available transmission channels are effectively allocated such that these channels are utilized by a "proper" set of one or more terminals in the MIMO-OFDM system.

There is therefore a need in the art for techniques to allocate resources in a MIMO-OFDM system to provide high system performance.

SUMMARY

Techniques are provided herein to schedule terminals for data transmission on the downlink and/or uplink based on the spatial and/or frequency "signatures" of the terminals. In a MIMO-OFDM system, each "active" terminal desiring data transmission in an upcoming time interval may be associated with transmission channels having different capabilities due to different link conditions experienced by the terminal. Various scheduling schemes are provided herein to select a "proper" set of one or more terminals for data transmission on each frequency band and to assign the available transmission channels to the selected terminals such that system goals (e.g., high throughput, fairness, and so on) are achieved.

A scheduler may be designed to form one or more sets of terminals for possible (downlink or uplink) data transmission for each of a number of frequency bands. Each set includes one or more active terminals and corresponds to a hypothesis to be evaluated. Each frequency band corresponds to a group of one or more frequency subchannels in the MIMO-OFDM system. The scheduler may further form one or more sub-hypotheses for each hypothesis. For the downlink, each sub-hypothesis may correspond to specific assignments of a number of transmit antennas at the base station to the one or more terminals in the hypothesis. And for the uplink, each sub-hypothesis may correspond to a specific order for processing the uplink data transmissions from the one or more terminals in the hypothesis. The performance of each sub-hypothesis is then evaluated (e.g., based on one or more performance metrics, such as a performance metric indicative of the overall throughput for the terminals in the hypothesis). One sub-hypothesis is then selected for each frequency band based on the evaluated performance, and the one or more terminals in each selected sub-hypothesis are then scheduled for data transmission on the corresponding frequency band.

The set of one or more terminals scheduled for (downlink or uplink) data transmission on each frequency band may include multiple SIMO terminals, a single MIMO terminal, multiple MISO terminals, or a combination of SIMO, MISO, and MIMO terminals. A SIMO terminal is one scheduled for data transmission via a single spatial subchannel in the MIMO-OFDM system and which employs multiple receive antennas and a single transmit antenna, a MISO terminal is one utilizing a single receive antenna to receive a transmission utilizing a single spatial subchannel, and a MIMO terminal is one scheduled for data transmission via two or more spatial subchannels. Each SIMO, MISO, or MIMO terminal may be assigned with one or multiple frequency bands for data transmission. The available transmission channels are assigned to the terminals such that the system goals are achieved.

Details of various aspects, embodiments, and features of the invention are described below. The invention further provides methods, computer products, schedulers, base stations, terminals, systems, and apparatuses that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
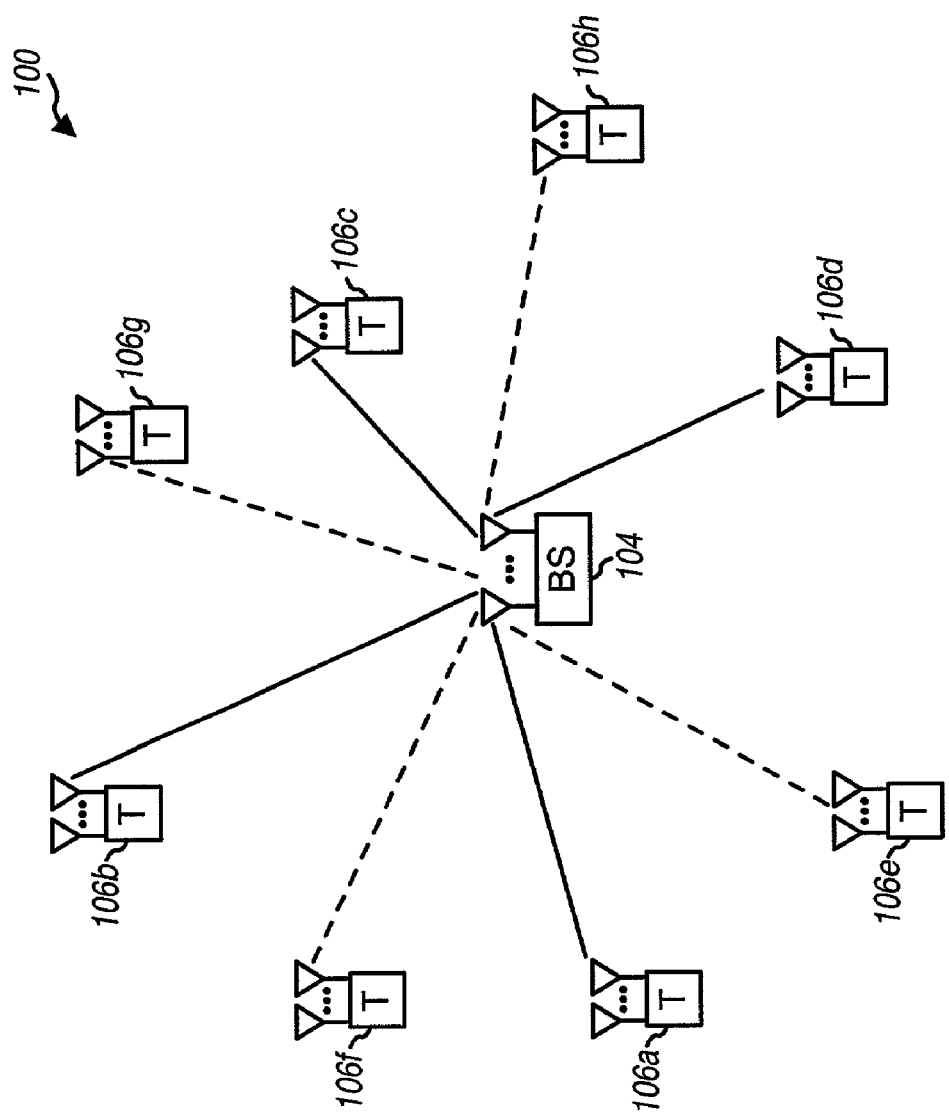
FIG. 1 is a diagram of a MIMO-OFDM system.

FIG. 1 is a diagram of a multiple-input multiple-output communication system 100 that utilizes orthogonal frequency division multiplexing (i.e., a MIMO-OFDM system). MIMO-OFDM system 100 employs multiple ($N_T$) transmit antennas and multiple ($N_R$) receive antennas for data transmission. MIMO-OFDM system 100 may be a multiple-access communication system having one or more base stations (BS) 104 that can concurrently communicate with one or more terminals (T) 106 (only one base station is shown in FIG. 1 for simplicity). The base stations may also be referred to as access points, UTRAN, or some other terminology, and the terminals may also be referred to as handsets, mobile stations, remote stations, user equipment, or some other terminology.

Each base station 104 employs multiple antennas and represents the multiple-input (MI) for downlink transmissions from the base station to the terminals and the multiple-output (MO) for uplink transmissions from the terminals to the base station. A set of one or more "communicating" terminals 106 collectively represents the multiple-output for downlink transmissions and the multiple-input for uplink transmissions. As used herein, a communicating terminal is one that transmits and/or receives user-specific data to/from the base station, and an "active" terminal is one that desires downlink and/or uplink data transmission in an upcoming or future time slot. Active terminals may include terminals that are currently communicating.

For the example shown in FIG. 1, base station 104 concurrently communicates with terminals 106a through 106d (as indicated by the solid lines) via the multiple antennas available at the base station and the one or more antennas available at each communicating terminal. Terminals 106e through 106h may receive pilots and/or other signaling information from base station 104 (as indicated by the dashed lines), but are not transmitting or receiving user-specific data to/from the base station.

For the downlink, the base station employs $N_T$ antennas and each communicating terminal employs 1 or $N_R$ antennas for reception of one or more data streams from the base station. In general, $N_R$ can be any integer two or greater. A MIMO channel formed by the $N_T$ transmit antennas and $N_R$ receive antennas may be decomposed into $N_S$ independent channels, with $N_S \leq \min\{N_T, N_R\}$. Each such independent channel may be referred to as a spatial subchannel of the MIMO channel.

For the downlink, the number of receive antennas at a communicating terminal may be equal to or greater than the number of transmit antennas at the base station (i.e., $N_R \geq N_T$). For such a terminal, the number of spatial subchannels is limited by the number of transmit antennas at the base station. Each multi-antenna terminal communicates with the base station via a respective MIMO channel formed by the base station's $N_T$ transmit antennas and its own $N_R$ receive antennas. However, even if multiple multi-antenna terminals are selected for downlink data transmission, only $N_S$ spatial subchannels are available regardless of the number of terminals receiving the downlink transmission. The terminals to be considered for downlink data transmission need not all be equipped with equal number of receive antennas.

For the downlink, the number of receive antennas at a communicating terminal may also be less than the number of transmit antennas at the base station (i.e., $N_R < N_T$). In particular, a MISO terminal employs a single receive antenna ($N_R=1$) for downlink data transmission. The base station may then employ beam steering and space division multiple access (SDMA) to communicate simultaneously with a number of MISO terminals, as described below.

For the uplink, each communicating terminal may employ a single antenna or multiple antennas for uplink data transmission. Each terminal may also utilize all or only a subset of its available antennas for uplink transmission. At any given moment, the $N_T$ transmit antennas for the uplink are formed by all antennas used by one or more communicating terminals. The MIMO channel is then formed by the $N_T$ transmit antennas from all communicating terminals and the base station's $N_R$ receive antennas. The number of spatial subchannels is limited by the number of transmit antennas, which in turn is limited by the number of receive antennas at the base station (i.e., $N_S \leq \min(N_T, N_R)$).

With SDMA, the "spatial signatures" associated with different terminals are exploited to allow multiple terminals to operate simultaneously on the same channel, which may be a time slot, a frequency band, a code channel, and so on. A spatial signature constitutes a complete RF characterization of the propagation path between each transmit-receive antenna pair to be used for data transmission. On the downlink, the spatial signatures may be derived at the terminals and reported to the base station. The base station may then process these spatial signatures to select terminals for data transmission on the same channel, and to derive mutually "orthogonal" steering vectors for each of the independent data streams to be transmitted to the selected terminals. On the uplink, the base station may derive the spatial signatures of the different terminals. The base station may then process these signatures to schedule terminals for data transmission and to further process the transmissions from the scheduled terminals to separately demodulate each transmission If the terminals are equipped with multiple receive antennas such that $N_R \geq N_T$, then the base station does not need the spatial signatures of the terminals in order to obtain the benefit of SDMA. All that may be needed at the base station is information from each terminal indicating the "post-processed" SNR associated with the signal from each base station transmit antenna, after demodulation at the terminal. The SNR estimation process may be facilitated by periodically transmitting a pilot from each base station transmit antenna, as described below.

As used herein, a SIMO terminal is one designated (or scheduled) to transmit and/or receive data via a single spatial subchannel and which employs multiple receive antennas for data transmission, a MISO terminal is one designated to receive a data transmission via a single spatial subchannel and which employs a single receive antenna, and a MIMO terminal is one designated to transmit and/or receive data via multiple spatial subchannels. For the downlink, a SIMO terminal may receive a data transmission from a single transmit antenna at the base station, and a MISO terminal may receive a data transmission via a beam formed by the $N_T$ transmit antennas at the base station. And for the uplink, the SIMO terminal may transmit data from one antenna at the terminal.

For the MIMO-OFDM system, each spatial subchannel is further partitioned into $N_F$ frequency subchannels. Each frequency subchannel of each spatial subchannel may be referred to as a transmission channel. For both the downlink and uplink, the $N_T$ transmit antennas may thus be used to transmit up to $N_F \cdot N_S$ independent data streams on the $N_F \cdot N_S$ transmission channels. Each independent data stream is associated with a particular "rate", which is indicative of various transmission parameter values such as, for example, a specific data rate, a specific coding scheme, a specific modulation scheme, and so on, used for the data stream. The rate is typically determined by the capacity of the one or more transmission channels used to transmit the data stream.

Multi-User OFDM System

For a multiple-access OFDM system without MIMO capability, the overall system bandwidth, W, is divided into $N_F$ orthogonal frequency subchannels, with each such subchannel having a bandwidth of $W/N_F$. For this system, a number of terminals may share the available spectrum via time division multiplexing (TDM). In a "pure" TDM scheme, a single terminal may be assigned the entire system bandwidth, W, for each fixed time interval, which may be referred to as a time slot. Terminals may be scheduled for data transmission by allocating time slots on a demand basis. Alternatively, for this OFDM system, it is possible to assign only a fraction, $N_A$, of the $N_F$ frequency subchannels to a given terminal for a given time slot, thus making the remaining ($N_F - N_A$) frequency subchannels in the same time slot available to other terminals. In this way, the TDM access scheme is converted into a hybrid TDM/FDM access scheme.

Allocating different frequency subchannels to different terminals may provide improved performance for frequency selective channel. In the pure TDM scheme whereby all $N_F$ frequency subchannels are allocated to a single terminal for a given time slot, it is possible that some of the frequency subchannels associated with this terminal could be faded, thereby resulting in low SNR and poor throughput for these faded subchannels. However, these same frequency subchannels may have high SNR for another terminal in the system since the RF channel is likely to be uncorrelated from terminal to terminal. If a scheduler has knowledge of the SNR for each active terminal and for all $N_F$ frequency subchannels, then it may be possible to maximize system throughput by allocating each of the $N_F$ frequency subchannels to the terminal achieving the best SNR for that subchannel. In practice, certain minimum performance requirements typically need to be met for all terminals so that the scheduler would need to observe some fairness criteria to ensure that the terminals in the best locations do not continually "hog" the resources.

The pure TDM scheduling scheme described above can assign time slots to terminals that have favorable fading conditions. For improved performance, the scheduler can further consider allocating frequency subchannels to terminals in each time slot and possibly allocating transmit power per subchannel. The ability to allocate transmit power provides an additional degree of scheduling flexibility that may be used to improve performance (e.g., to increase throughput).

Single-User MIMO-OFDM System

For the MIMO-OFDM system, the $N_F$ frequency subchannels may be used to transmit up to $N_F$ independent data streams on each of the $N_S$ spatial subchannels. The total number of transmission channels is thus $N_C = N_F \cdot N_S$. For the pure TDM scheme, the $N_C$ transmission channels may be allocated to a single terminal for each time slot.

The $N_C$ transmission channels may be associated with different SNRs and may have different transmission capabilities. A fraction of the transmission channels may achieve poor SNR. In one scheme, additional redundancy (e.g., a lower rate code) may be used for the transmission channels with poor SNR to achieve the target packet error rate (PER). The additional redundancy effectively reduces throughput. In another scheme, some or all of the transmission channels with poor SNR may be eliminated from use, and only a subset of the available frequency subchannels is selected for use for each spatial subchannel.

The total available transmit power may be allocated uniformly or non-uniformly across the transmission channels to improve throughput. For example, the total available transmit power for each transmit antenna may be allocated in a uniform or non-uniform manner across the frequency subchannels selected for use for that transmit antenna. In this way, transmit power is not wasted on transmission channels that provide little or no information to allow the receiver to recover the transmitted data. The frequency subchannel selection and the power allocation may be implemented on a per-transmit antenna basis whereby (1) all or a subset of the $N_F$ frequency subchannels for each transmit antenna may be selected for use, and (2) the transmit power available for each transmit antenna may be uniformly or non-uniformly allocated across the selected frequency subchannels.

The technique used to process the received signals at the receiver can have an impact on which transmission channels get selected for use. If a successive equalization and interference cancellation (or "successive cancellation") receiver processing technique (described below) is used at the receiver, then it may be advantageous to disable certain transmit antennas in order to increase throughput on the link. In this case, the receiver can determine which subset of transmit antennas should be used for data transmission and can provide this information to the transmitter via a feedback channel. If the RF channel experiences frequency selective fading, then the set of transmit antennas used for one frequency subchannel may not be the best set to use for another frequency subchannel. In this case, the scheduler can select a proper set of transmit antennas to use on a per frequency subchannel basis in order to improve throughput.

Multi-User MIMO-OFDM System

Various techniques are described above for (1) allocating different frequency subchannels to different terminals in a multi-user OFDM system, and (2) allocating transmission channels to a single terminal in a single-user MIMO-OFDM system. These techniques may also be used to allocate resources (e.g., transmission channels and transmit power) to multiple terminals in a multiple-access MIMO-OFDM system. Various scheduling schemes may be designed to achieve high system throughput by utilizing these and possibly other techniques for the multi-user environment.

The system resources may be allocated by selecting the "best" set of terminals for data transmission such that high throughput and/or some other criteria are achieved. With frequency selective fading, the resource allocation may be performed for each group of one or more frequency subchannels. Resource allocation for each fractional portion of the overall system bandwidth may provide additional gains over a scheme that attempts to maximize throughput on the total system bandwidth basis (i.e., as would be the case for a single carrier MIMO system).

If the entire system bandwidth is treated as a single frequency channel (e.g., as in a single carrier MIMO system), then the maximum number of terminals that may be scheduled to transmit simultaneously is equal to the number of spatial subchannels, which is $N_S \leq \min\{N_R, N_T\}$. If the system bandwidth is divided into $N_F$ frequency channels (e.g., as in a MIMO-OFDM system), then the maximum number of terminals that may be scheduled to transmit simultaneously is $N_F \cdot N_S$, since each transmission channel (i.e., each frequency subchannel of each spatial subchannel) may be allocated to a different terminal. And if the system bandwidth is divided into $N_G$ groups of frequency subchannels, then the maximum number of terminals that may be scheduled to transmit simultaneously is $N_G \cdot N_S$, since each frequency subchannel group of each spatial subchannel may be allocated to a different terminal. If the number of terminals is less than the maximum number permitted, then multiple transmission channels may be allocated to a given terminal.

Various operating modes may be supported by the MIMO-OFDM system. In a MIMO mode, all spatial subchannels of a particular frequency subchannel group are allocated to a single MIMO terminal. Multiple MIMO terminals may still be supported concurrently via the $N_G$ frequency subchannel groups. In an N-SIMO mode, the $N_S$ spatial subchannels of a particular frequency subchannel group are allocated to a number of distinct SIMO terminals, with each SIMO terminal being assigned one spatial subchannel. A given SIMO terminal may be assigned one or more frequency subchannel groups of a particular spatial subchannel. In an N-MISO mode (which may also be referred to a multi-user beam-steering mode), the $N_S$ spatial subchannels of a particular frequency subchannel group are allocated to a number of distinct MISO terminals, with each MISO terminal being assigned one spatial subchannel. Full characterization of the transmit-receive antenna paths may be used to derive distinctive beams for the data transmission to these MISO terminals. Similarly, a given MISO terminal may be assigned one or more frequency subchannel groups of a particular spatial subchannel. And in a mixed mode, the $N_S$ spatial subchannels for a particular frequency subchannel group may be allocated to a combination of SIMO, MISO, and MIMO terminals, with multiple types of terminals being concurrently supported. Any combination of operating modes may be supported for a particular time slot. For example, the MIMO mode may be supported for the first frequency subchannel group, the N-SIMO mode may be supported for the second frequency subchannel group, the N-MISO mode may be supported for the third frequency subchannel group, the mixed mode may be supported for the fourth frequency subchannel group, and so on. By communicating simultaneously with multiple SIMO terminals, multiple MISO terminals, one or more MIMO terminals, or a combination of SIMO, MISO, and MIMO terminals, the system throughput may be increased.

If the propagation environment has sufficient scattering, then MIMO receiver processing techniques may be used to efficiently exploit the spatial dimensionalities of the MIMO channel to increase transmission capacity. MIMO receiver processing techniques may be used whether the base station is communicating with one or multiple terminals simultaneously. For the downlink, from a terminal's perspective, the same receiver processing techniques may be used to process $N_T$ different signals intended for that terminal (if it is a MIMO terminal) or just one of the $N_T$ signals (if it is a SIMO terminal). If successive cancellation receiver processing is to be used at the terminals, then certain restrictions may apply since a data stream assigned to one terminal may not be detected error-free by another terminal. And for the uplink, from the base station's perspective, there is no discernable difference in processing $N_T$ different signals from a single MIMO terminal versus processing one signal from each of $N_T$ different SIMO terminals.

As shown in FIG. 1, the terminals may be randomly distributed in the base station's coverage area (or "cell") or may be co-located. For a wireless communication system, the link characteristics typically vary over time due to a number of factors such as fading and multipath. At a particular instant in time, the response for a MIMO channel formed by an array of $N_T$ transmit antennas and an array of $N_R$ receive antennas may be characterized by a matrix $\underline{H}(k)$ whose elements are composed of independent Gaussian random variables, as follows:

$$\underline{H}(k) = \begin{bmatrix} h_{1,1}(k) & h_{1,2}(k) & \cdots & h_{1,N_T}(k) \\ h_{2,1}(k) & h_{2,2}(k) & \cdots & h_{2,N_T}(k) \\ \vdots & \vdots & & \vdots \\ h_{N_R,1}(k) & h_{N_R,2}(k) & \cdots & h_{N_R,N_T}(k) \end{bmatrix}. \quad \text{Eq (1)}$$

For the downlink, the array of $N_T$ transmit antennas is at the base station, and the array of $N_R$ receive antennas may be formed at a single SIMO or MIMO terminal (for the N-SIMO or MIMO mode) or at multiple MISO terminals (for the N-MISO mode). And for the uplink, the transmit antenna array is formed by the antennas used by all communicating terminals, and the receive antenna array is at the base station. In equation (1), $\underline{H}(k)$ is the channel response matrix for the MIMO channel for the k-th frequency subchannel group, and $h_{i,j}(k)$ is the coupling (i.e., the complex gain) between the j-th transmit antenna and the i-th receive antenna for the k-th frequency subchannel group.

Each frequency subchannel group may include one or more frequency subchannels and corresponds to a particular frequency band of the overall system bandwidth. Depending on the particular system design, there may be (1) only one group with all $N_F$ frequency subchannels, or (2) $N_F$ groups, with each group having a single frequency subchannel, or (3) any number of groups between 1 and $N_F$. The number of frequency subchannel groups, $N_G$, can thus range between 1 and $N_F$, inclusive (i.e., $1 \leq N_G \leq N_F$). Each group may include any number of frequency subchannels, and the $N_G$ groups may include the same or different number of frequency subchannels. Moreover, each group may include any combination of frequency subchannels (e.g., the frequency subchannels for a group need not be adjacent to one another).

As shown in equation (1), the MIMO channel response for each frequency subchannel group may be represented with a respective matrix $\underline{H}(k)$ having $N_R \times N_T$ elements corresponding to the number of receive antennas and the number of transmit antennas. Each element of the matrix $\underline{H}(k)$ describes the response for a respective transmit-receive antenna pair for the k-th frequency subchannel group. For a flat fading channel (or when $N_G=1$), one complex value may be used for the entire system bandwidth (i.e., for all $N_F$ frequency subchannels) for each transmit-receive antenna pair.

In an actual operating environment, the channel response typically varies across the system bandwidth, and a more detailed channel characterization may be used for the MIMO channel. Thus, for a frequency selective fading channel, one channel response matrix $\underline{H}(k)$ may be provided for each frequency subchannel group. Alternatively, a channel impulse response matrix, $\underline{\hat{H}}(n)$, may be provided for the MIMO channel, with each element of this matrix corresponding to a sequence of values indicative of the sampled impulse response for a respective transmit-receive antenna pair.

The receiver may periodically estimate the channel response for each transmit-receive antenna pair. The channel estimates may be facilitated in a number of ways such as, for example, with the use of pilot and/or data decision directed techniques known in the art. The channel estimates may comprise the complex-value channel response estimate (e.g., the gain and phase) for each frequency subchannel group of each transmit-receive antenna pair, as shown in equation (1). The channel estimates provide information on the transmission characteristics of (e.g., what data rate is supportable by) each spatial subchannel for each frequency subchannel group.

The information given by the channel estimates may also be distilled into (1) a post-processed signal-to-noise-and-interference ratio (SNR) estimate (described below) for each spatial subchannel of each frequency subchannel group, and/or (2) some other statistic that allows the transmitter to select the proper rate for each independent data stream. This process of deriving the essential statistic may reduce the amount of data required to characterize a MIMO channel.

The complex channel gains and the post-processed SNRs represent different forms of channel state information (CSI) that may be reported by the receiver to the transmitter. For time division duplexed (TDD) systems, the transmitter may be able to derive or infer some of the channel state information based on transmission (e.g., a pilot) from the receiver since there may be sufficient degree of correlation between the downlink and uplink for such systems, as described below. Other forms of CSI may also be derived and reported and are described below.

The aggregate CSI received from the receivers may be used to achieve high throughput by assigning a proper set of one or more terminals to the available transmission channels such that they are allowed to communicate simultaneously with the base station. A scheduler can evaluate which specific combination of terminals provides the best system performance (e.g., the highest throughput) subject to any system constraints and requirements.

By exploiting the spatial and frequency "signatures" of the individual terminals (i.e., their channel response estimates, which may be a function of frequency), the average throughput can be increased relative to that achieved by a single terminal. Furthermore, by exploiting multi-user diversity, the scheduler can identify combinations of "mutually compatible" terminals that can be allowed to communicate at the same time on the same channel, effectively enhancing system capacity relative to single-user scheduling and random scheduling for multiple users.

The terminals may be scheduled for data transmission based on various factors. One set of factors may relate to system constraints and requirements such as the desired quality of service (QoS), maximum latency, average throughput, and so on. Some or all of these factors may need to be satisfied on a per terminal basis (i.e., for each terminal) in a multiple-access communication system. Another set of factors may relate to system performance, which may be quantified by an average system throughput or some other indications of performance. These various factors are described in further detail below.

For the downlink, the scheduler may (1) select the "best" set of one or more terminals for data transmission, (2) assign the available transmission channels to the selected terminals, (3) allocate transmit power uniformly or non-uniformly across the assigned transmission channels, and (4) determine the proper rate for each independent data stream to be transmitted to the selected terminals. For the uplink, the scheduler may (1) select the best set of one or more terminals for data transmission, (2) assign the available transmission channels to the selected terminals, (3) determine the proper order for processing the data streams from these selected terminals (if the successive cancellation receiver processing technique is used at the base station), and (4) determine the rate for each independent data stream from the selected terminals. Various details of the resource allocation for the downlink and uplink are described below.

To simplify the scheduling, the terminals may be allocated transmission channels (and possibly transmit power) based on their priority. Initially, the active terminals may be ranked by their priority, which may be determined based on various factors, as described below. The $N_X$ highest priority terminals may then be considered in each scheduling interval. This then allows the scheduler to allocate the available transmission channels to just $N_X$ terminals instead of all active terminals. The resource allocation may be further simplified by (1) selecting $N_X=N_S$ and assigning each terminal with all frequency subchannels of one spatial subchannel, or (2) selecting $N_X=N_G$ and assigning each terminal with all spatial subchannels of one frequency subchannel group, or (3) making some other simplification. The gains in throughput even with some of these simplifications may be substantial compared to the pure TDM scheduling scheme that allocates all transmission channels to a single terminal for each time slot, particularly if independent frequency selective fading of the $N_X$ terminals is considered in the resource allocation.

For simplicity, several assumptions are made in the following description. First, it is assumed that the average received power for each independent data stream may be adjusted to achieve a particular target energy-per-bit-to-total-noise-and-interference ratio ($E_b/N_t$) after signal processing at the receiver (which is the terminal for a downlink transmission and the base station for an uplink transmission). This target $E_b/N_t$ is often referred to as a power control setpoint (or simply, the setpoint) and is selected to provide a particular level of performance (e.g., a particular PER). The setpoint may be achieved by a closed-loop power control mechanism that adjusts the transmit power for each data stream (e.g., based on a power control signal from the receiver). For simplicity, a common setpoint may be used for all data streams received at the receiver. Alternatively, a different setpoint may be used for each data stream, and the techniques described herein may be generalized to cover this operating mode. Also, for the uplink, it is assumed that simultaneous transmissions from different terminals are synchronized so that the transmissions arrive at the base station within a prescribed time window.

For simplicity, the number of receive antennas is assumed to be equal to the number of transmit antennas (i.e., $N_R = N_T$) for the following description of the N-SIMO and MIMO modes. This is not a necessary condition since the analysis applies for the case where $N_R \geq N_T$. For the N-MISO mode, the number of receive antennas at each MISO terminal is assumed to be equal to one (i.e., $N_R = 1$). Also for simplicity, the number of spatial subchannels is assumed to be equal to the number of transmit antennas (i.e., $N_S = N_T$).

Downlink Resource Allocation

Resource allocation for the downlink comprises (1) selecting one or more sets of terminals for evaluation, (2) assigning the available transmission channels to the terminals in each set and evaluating performance, and (3) identifying the best set of terminals and their transmission channel assignments. Each set may include a number of SIMO terminals, a number of MISO terminals, one or more MIMO terminals, or a combination of SIMO, MISO, and MIMO terminals. All or only a subset of the active terminals may be considered for evaluation, and these terminals may be selected to form one or more sets to be evaluated. Each terminal set corresponds to a hypothesis. For each hypothesis, the available transmission channels may be assigned to the terminals in the hypothesis based on any one of a number of channel assignment schemes. The terminals in the best hypothesis may then be scheduled for data transmission in an upcoming time slot. The flexibility in both selecting the best set of terminals for data transmission and assigning the transmission channels to the selected terminals allows the scheduler to exploit multi-user diversity environment to achieve high performance in both flat fading and frequency selective fading channels.

In order to determine the "optimum" transmission to a set of terminals, SNRs or some other sufficient statistics may be provided for each terminal. For the N-SIMO and MIMO modes, where ($N_R \geq N_T$), the spatial processing may be performed by at the SIMO and MIMO terminals to separate out the transmitted signals, and the base station does not need the spatial signatures of the terminals in order to simultaneously transmit multiple data streams on the available spatial subchannels. All that may be needed at the base station is the post-processed SNR associated with the signal from each base station transmit antenna. For clarity, downlink scheduling for SIMO and MIMO terminals is described first, and downlink scheduling for MISO terminals is described subsequently.

Downlink Scheduling for SIMO and MIMO Terminals

The scheduling for SIMO and MIMO terminals may be performed based on various types of channel state information, including full-CSI (e.g., complex channel gains) and partial-CSI (e.g., SNRs). If the statistic to be used for scheduling terminals is SNR, then for each set of one or more terminals to be evaluated for data transmission in an upcoming time slot, a hypothesis matrix $\underline{\Gamma}(k)$ of post-processed SNRs for this terminal set for the k-th frequency subchannel group may be expressed as:

$$\underline{\Gamma}(k) = \begin{bmatrix} \gamma_{1,1}(k) & \gamma_{2,1}(k) & \cdots & \gamma_{N_T,1}(k) \\ \gamma_{1,2}(k) & \gamma_{2,2}(k) & \cdots & \gamma_{N_T,2}(k) \\ \vdots & \vdots & & \vdots \\ \gamma_{1,N_T}(k) & \gamma_{2,N_T}(k) & \cdots & \gamma_{N_T,N_T}(k) \end{bmatrix}, \quad \text{Eq (2)}$$

where $\gamma_{i,j}(k)$ is the post-processed SNR for a data stream (hypothetically) transmitted from the j-th transmit antenna to the i-th terminal for the k-th frequency subchannel group. A set of $N_G$ such matrices $\underline{\Gamma}(k)$, for $1 \leq k \leq N_G$, would then characterize the entire frequency and spatial dimensions for this set of terminals.

At each terminal in the set being evaluated, $N_T$ data streams may be (hypothetically) transmitted from the $N_T$ transmit antennas for each frequency subchannel group and received by that terminal's $N_R$ receive antennas. The $N_R$ received signals at the terminal may be processed using spatial or space-time equalization to separate out the $N_T$ transmitted data streams for each frequency subchannel group, as described below. The SNR of a post-processed data stream (i.e., after the equalization) may be estimated and comprises the post-processed SNR for that data stream. For each terminal, a set of $N_T$ post-processed SNRs may be provided for the $N_T$ data streams that may be received by that terminal for each of the $N_G$ frequency subchannel groups.

In the N-SIMO mode, the $N_T$ rows of the hypothesis matrix $\underline{\Gamma}(k)$ correspond to $N_T$ vectors of SNRs for $N_T$ different terminals for the k-th frequency subchannel group. In this mode, each row of the hypothesis matrix $\underline{\Gamma}(k)$ gives the SNR of each of the $N_T$ (hypothetical) data streams from the $N_T$ transmit antennas for the k-th frequency subchannel group for one SIMO terminal. In the MIMO mode, the $N_T$ rows of the hypothesis matrix $\underline{\Gamma}(k)$ correspond to a single vector of SNRs for a single MIMO terminal. This SNR vector includes the SNRs for the $N_T$ data streams for the k-th frequency subchannel group, and may be replicated $N_T$ times to form the matrix $\underline{\Gamma}(k)$. And in the mixed mode, for a particular MIMO terminal to be potentially assigned with two or more spatial subchannels for the k-th frequency subchannel group, that terminal's vector of SNRs may be replicated such that the SNR vector appears in as many rows of the hypothesis matrix $\underline{\Gamma}(k)$ as the number of spatial subchannels to be assigned to the terminal (i.e., one row per spatial subchannel).

Alternatively, for all operating modes, one row in the hypothesis matrix $\underline{\Gamma}(k)$ may be used for each SIMO or MIMO terminal, and the scheduler may be designed to mark and evaluate these different types of terminals accordingly. For the following description, the hypothesis matrix $\underline{\Gamma}(k)$ is assumed to include SNR vectors for $N_T$ terminals, where an SIMO terminal is represented as a single terminal in the matrix and a MIMO terminal may be represented as two or more of the $N_T$ terminals in the matrix.

If the successive cancellation receiver processing technique is used at a terminal to process the received signals, then the post-processed SNR achieved at the terminal for each transmitted data stream for a particular frequency subchannel group depends on the order in which the transmitted data streams are detected (i.e., demodulated and decoded) to recover the transmitted data, as described below. In this case, a number of sets of SNRs may be provided for each terminal for a number of possible detection orderings. Multiple hypothesis matrices $\underline{\Gamma}(k)$ may then be formed for each frequency subchannel group of each set of terminals, and these matrices may be evaluated to determine which specific combination of terminals and detection ordering provides the best system performance.

In any case, each hypothesis matrix $\underline{\Gamma}(k)$ includes the post-processed SNRs for a given frequency subchannel group for a specific set of terminals (i.e., hypothesis) to be evaluated. These post-processed SNRs represent the SNRs achievable by the terminals and are used to evaluate the hypothesis.

For the N-SIMO and MIMO modes, each transmit antenna in the base station's antenna array may be used to transmit a different data stream on each frequency subchannel group using channel state information (e.g., SNRs or some other statistics) derived by the terminals in the coverage area. High performance is achieved on the basis of the CSI, which is used to schedule terminals and process data.

Various downlink scheduling schemes may be used to allocate resources (e.g., transmission channels) to the active terminals. These various schemes include (1) an "exhaustive" scheduling scheme that can assign each transmission channel to a specific terminal such that "optimum" performance, as determined by some metrics, is achieved, (2) a priority-based scheduling scheme that assigns transmission channels based on the priority of the active terminals, (3) a FDM-TDM scheduling scheme that assigns all spatial subchannels of each frequency subchannel group to a specific terminal, and (4) a SDMA-TDM scheduling scheme that assigns all frequency subchannels of each spatial subchannel to a specific terminal. These various downlink scheduling schemes are described in further detail below. Other scheduling schemes that can provide good or near-optimum performance, and which may require less processing and/or statistic, may also be used, and this is within the scope of the invention.

Figure 2:
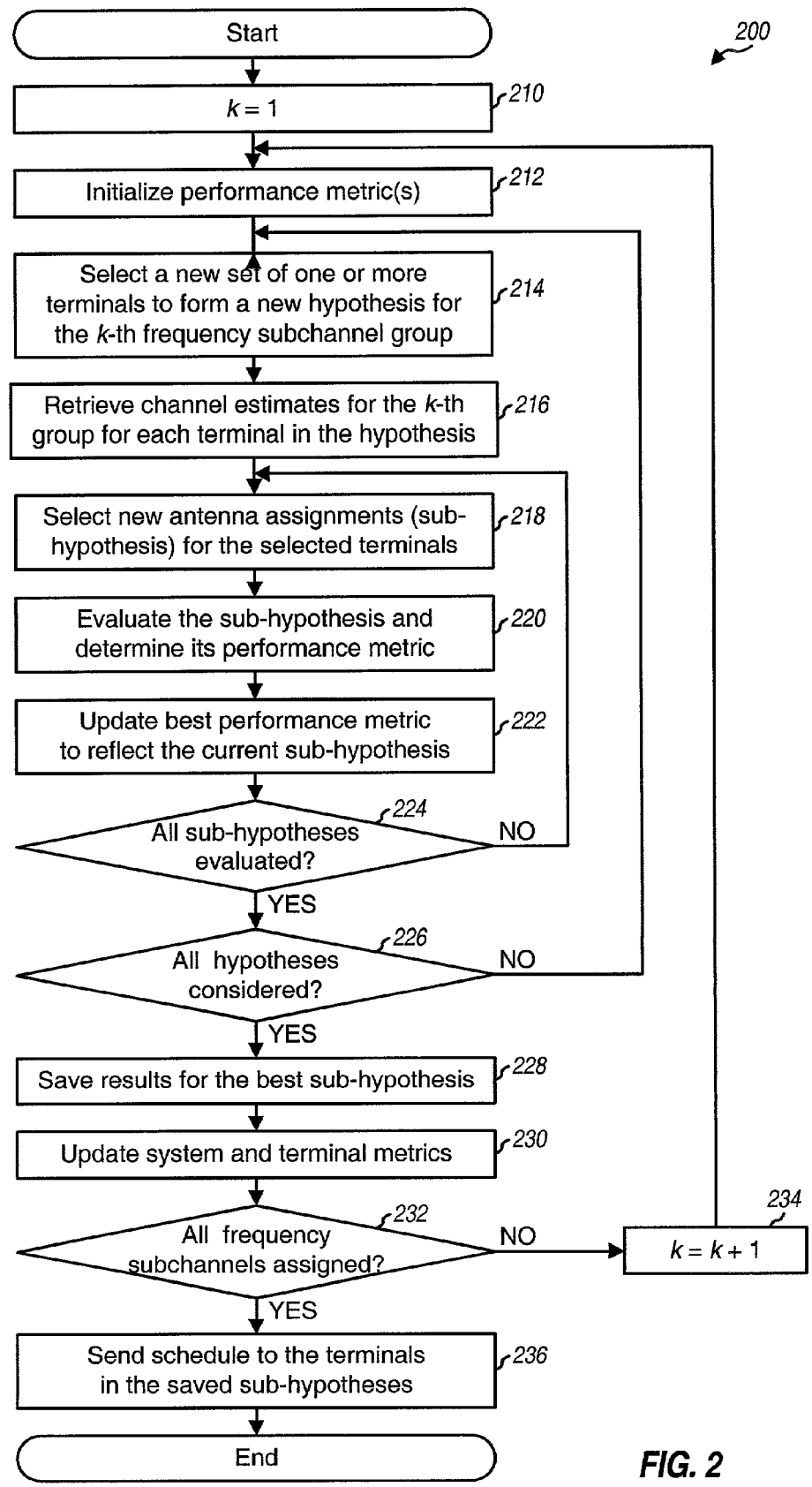
FIG. 2 is a flow diagram of a process to schedule terminals for downlink data transmission.

FIG. 2 is a flow diagram of a process 200 to schedule terminals for downlink data transmission. Process 200 may be used to implement various downlink scheduling schemes, as described below. For clarity, the overall process is described first, and the details for some of the steps in the process are described subsequently.

In an embodiment, the transmission channels are assigned to the active terminals by evaluating one frequency subchannel group at a time. The first frequency subchannel group is considered by setting the frequency index k=1, at step 210. The spatial subchannels for the k-th frequency subchannel group are then assigned to the terminals for downlink transmission starting at step 212. For the N-SIMO and MIMO modes on the downlink, assignment of spatial subchannels to the terminals is equivalent to assignment of the base station's transmit antennas to the terminals, since it is assumed that $N_S = N_T$.

Initially, one or more performance metrics to be used to select the best set of terminals for downlink transmission are initialized, at step 212. Various performance metrics may be used to evaluate the terminal sets and some of these are described in further detail below. For example, a performance metric that maximizes system throughput may be used.

A new set of one or more active terminals is then selected from among all active terminals and considered for transmit antenna assignment, at step 214. This set of terminals forms a hypothesis to be evaluated. Various techniques may be used to limit the number of active terminals to be considered for scheduling, which then reduces the number of hypotheses to be evaluated, as described below. For each terminal in the hypothesis, the SNR vector, $\underline{\gamma}_i(k) = [\gamma_{i,1}(k), \gamma_{i,2}(k), \ldots, \gamma_{i,N_T}(k)]$, indicative of the post-processed SNRs for the $N_T$ transmit antennas in the k-th frequency subchannel group is retrieved, at step 216. For the MIMO mode, a single MIMO terminal is selected for evaluation for the k-th frequency subchannel group, and one SNR vector for this terminal is retrieved. For the N-SIMO mode, $N_T$ SIMO terminals are selected for evaluation, and $N_T$ SNR vectors for these terminals are retrieved. And for the mixed mode, SNR vectors are retrieved for the SIMO and MIMO terminals in the selected set. For each MIMO terminal in the MIMO and mixed modes, the SNR vector may be replicated (or appropriately marked) such that the number of SNR vectors for this terminal is equal to the number of transmit antennas to be assigned to the terminal. The SNR vectors for all selected terminals in the hypothesis are used to form the hypothesis matrix $\underline{\Gamma}(k)$ shown in equation (2).

For each hypothesis matrix $\underline{\Gamma}(k)$ for $N_T$ transmit antennas and $N_T$ terminals, there are $N_T$ factorial possible combinations of assignments of transmit antennas to terminals (i.e., $N_T!$ sub-hypotheses). Since a MIMO terminal is represented as multiple terminals in the matrix $\underline{\Gamma}(k)$, fewer sub-hypotheses exist if the hypothesis matrix $\underline{\Gamma}(k)$ includes one or more MIMO terminals. In any case, a particular new combination of antenna/terminal assignments is selected for evaluation, at step 218. This combination includes one antenna assigned to each of the $N_T$ terminals. The antenna assignment may be performed such that all possible combinations of antenna/terminal assignments are eventually evaluated. Alternatively, a specific scheme may be used to assign antennas to the terminals, as described below. The new combination of antenna/terminal assignments forms a sub-hypothesis to be evaluated.

The sub-hypothesis is then evaluated and the performance metric (e.g., the system throughput) corresponding to this sub-hypothesis is determined (e.g., based on the SNRs for the sub-hypothesis), at step 220. The performance metric corresponding to the best sub-hypothesis is then updated to reflect the performance metric for the current sub-hypothesis, at step 222. Specifically, if the performance metric for the current sub-hypothesis is better than that for the best sub-hypothesis, then the current sub-hypothesis becomes the new best sub-hypothesis, and the performance metric, terminal metrics, and antenna/terminal assignments corresponding to this sub-hypothesis are saved. The performance and terminal metrics are described below.

A determination is then made whether or not all sub-hypotheses for the current hypothesis have been evaluated, at step 224. If all sub-hypotheses have not been evaluated, then the process returns to step 218 and a different and not yet evaluated combination of antenna/terminal assignments is selected for evaluation. Steps 218 through 224 are repeated for each sub-hypothesis to be evaluated.

If all sub-hypotheses for the current hypothesis have been evaluated, at step 224, then a determination is next made whether or not all hypotheses have been considered for the current frequency subchannel group, at step 226. If all hypotheses have not been considered, then the process returns to step 214 and a different and not yet considered set of terminals is selected for evaluation. Steps 214 through 226 are repeated for each hypothesis to be considered for the current frequency subchannel group.

If all hypotheses for the current frequency subchannel group have been evaluated, at step 226, then the results for the best sub-hypothesis for this frequency subchannel group are saved, at step 228. The best sub-hypothesis corresponds to a specific set of one or more active terminals that provides the best performance for the frequency subchannel group.

If the scheduling scheme requires other system and terminal metrics to be maintained (e.g. the average throughput over the past $N_P$ time slots, latency for data transmission, and so on), then these metrics are updated and may be saved, at step 230. The terminal metrics may be used to evaluate the performance of the individual terminals, and are described below.

A determination is then made whether or not all frequency subchannels have been assigned for downlink transmission, at step 232. If all frequency subchannels have not been assigned, then the next frequency subchannel group is considered by incrementing the index k (i.e., k=k+1), at step 234. The process then returns to step 212 to assign the spatial subchannels of this new frequency subchannel group to the terminals for downlink transmission. Steps 212 through 234 are repeated for each frequency subchannel group to be assigned.

If all frequency subchannel groups have been assigned, at step 232, then the data rates and the coding and modulation schemes for the terminals in the best sub-hypothesis for each frequency subchannel group are determined (e.g., based on their post-processed SNRs), at step 236. A schedule indicative of the specific active terminals selected for downlink data transmission, their assigned transmission channels, the scheduled time slot(s), the data rates, the coding and modulation schemes, other information, or any combination thereof, may be formed and communicated to these terminals (e.g., via a control channel) prior to the scheduled time slot, also at step 236. Alternatively, the active terminals may perform "blind" detection and attempt to detect all transmitted data streams to determine which ones, if any, of the data streams are intended for them. The downlink scheduling is typically performed for each scheduling interval, which may correspond to one or more time slots.

The process shown in FIG. 2 may be used to implement the various downlink scheduling schemes described above. For the exhaustive scheduling scheme, each available transmission channel may be assigned to any active terminal. This may be achieved by considering (1) all possible sets of terminals (i.e., all possible hypotheses) for each frequency subchannel group and (2) all possible antenna assignments for each terminal set (i.e., all possible sub-hypotheses). This scheme may provide the best performance and most flexibility, but also requires the most processing to schedule terminals for downlink data transmission.

For the priority-based scheduling scheme, the active terminals to be considered for assignment of transmission channels may be selected based on their priority, and the performance metric may also be made a function of the terminal priority, as described below. This scheme can reduce the number of terminals to be considered for transmission channel assignment, which then reduces scheduling complexity. For the FDM-TDM scheduling scheme, one MIMO terminal is assigned all of the spatial subchannels for each frequency subchannel group. In this case, the hypothesis matrix $\underline{\Gamma}(k)$ includes a single vector of post-processed SNRs for one MIMO terminal, and there is only one sub-hypothesis for each hypothesis. And for the SDMA-TDM scheduling scheme, all frequency subchannels of each spatial subchannel are assigned to a single terminal, which may be a SIMO or MIMO terminal. For this scheme, steps 210, 212, 232, and 234 in FIG. 2 may be omitted.

For a given hypothesis matrix $\underline{\Gamma}(k)$, the scheduler evaluates various combinations of transmit antenna and terminal pairings (i.e., sub-hypotheses) to determine the best antenna/terminal assignments for the hypothesis. Various schemes may be used to assign transmit antennas to the terminals to achieve various system goals such as fairness, high performance, and so on.

In one antenna assignment scheme, all possible sub-hypotheses are evaluated based on a particular performance metric, and the sub-hypothesis with the best performance metric is selected. For each hypothesis matrix $\underline{\Gamma}(k)$, there are $N_T$ factorial (i.e., $N_T!$) possible sub-hypotheses that may be evaluated. Each sub-hypothesis corresponds to a specific assignment of each transmit antenna to a particular terminal. Each sub-hypothesis may thus be represented with a vector of post-processed SNRs, which may be expressed as:

$$\underline{\gamma}_{sub-hyp}(k) = \{\gamma_{a,1}(k), \gamma_{b,2}(k), \ldots, \gamma_{r,N_T}(k)\}, \quad \text{Eq (3)}$$

where $\gamma_{i,j}(k)$ is the post-processed SNR for the data stream from the j-th transmit antenna to the i-th terminal for the k-th frequency subchannel group, and the subscripts {a, b, . . . and r} identify the specific terminals in the transmit antenna/terminal pairings for the sub-hypothesis.

Each sub-hypothesis is further associated with a performance metric, $R_{sub-hyp}(k)$, which may be a function of various factors. For example, a performance metric based on the post-processed SNRs may be expressed as:

$$R_{sub-hyp}(k) = f(\underline{\gamma}_{sub-hyp}(k)), \quad \text{Eq (4)}$$

where $f(\cdot)$ is a particular positive real function of the argument(s) within the parenthesis.

Various functions may be used to formulate the performance metric. In one embodiment, a function of the achievable throughput for all $N_T$ transmit antennas for the sub-hypothesis may be used as the performance metric, which may be expressed as:

$$f\left(\underline{\gamma}_{sub-hyp}(k)\right) = \sum_{j=1}^{N_T} r_j(k), \quad \text{Eq (5)}$$

where $r_j(k)$ is the throughput associated with the j-th transmit antenna in the sub-hypothesis for the k-th frequency subchannel group, and may be expressed as:

$$r_j(k) = c_j \cdot \log_2(1 + \gamma_j(k)), \quad \text{Eq (6)}$$

where $c_j$ is a positive constant that reflects the fraction of the theoretical capacity achieved by the coding and modulation scheme selected for the data stream transmitted on the j-th transmit antenna, and $\gamma_j(k)$ is the post-processed SNR for the j-th data stream on the k-th frequency subchannel group.

To simplify the scheduling, the resource allocation may be performed based on groups of multiple frequency subchannels instead of groups of single frequency subchannels. Even if a given group includes multiple frequency subchannels, the frequency selective nature of the channel response may be considered in allocating resources to the terminals. This may be achieved by evaluating the performance metric based on the response for the group of frequency subchannels. For example, the resource allocation may be performed based on groups of $N_k$ frequency subchannels, where $N_k \geq 2$. The channel response over the $N_k$ frequency subchannels may then be used to evaluate the performance metric. If the performance metric is throughput, then the summation of the achievable rates in equation (5) may be performed over both transmit antennas and frequency subchannels, as follows:

$$f\left(\underline{\gamma}_{sub-hyp}(k)\right) = \sum_{j=1}^{N_T} \sum_{i=1}^{N_k} r_j(i),$$

where $r_j(i)$ is the throughput associated with the j-th transmit antenna in the sub-hypothesis for the i-th frequency subchannel, and $N_k$ is the number of frequency subchannels for the k-th frequency subchannel group. Thus, even if scheduling and resource allocation are performed for groups of multiple frequency subchannels, the performance of the individual frequency subchannels in each group may be considered in the scheduling.

The first antenna assignment scheme described above and used in FIG. 2 represents a specific scheme that can evaluate all possible combinations of assignments of transmit antennas to terminals. The number of potential sub-hypotheses to be evaluated by the scheduler for each hypothesis may be as large as $N_T!$, which may then result in a large number of total sub-hypotheses to be evaluated since a large number of hypotheses may also be considered.

The scheduling scheme shown in FIG. 2 performs an exhaustive search to determine the sub-hypothesis that provides the "optimal" system performance, as quantified by the performance metric used to select the best sub-hypothesis. A number of techniques may be used to reduce the complexity of the processing to assign transmit antennas to the terminals. One of these techniques is described below, and others may also be used and are within the scope of the invention. These techniques may also provide high system performance while reducing the amount of processing required to assign antennas to terminals.

In a second antenna assignment scheme, a maximum-maximum ("max-max") criterion is used to assign transmit antennas to the terminals in the hypothesis being evaluated. Using this max-max criterion, each transmit antenna is assigned to the terminal that achieves the best SNR for the transmit antenna. The antenna assignment may be performed for each frequency subchannel group and for one transmit antenna at a time.

Figure 3:
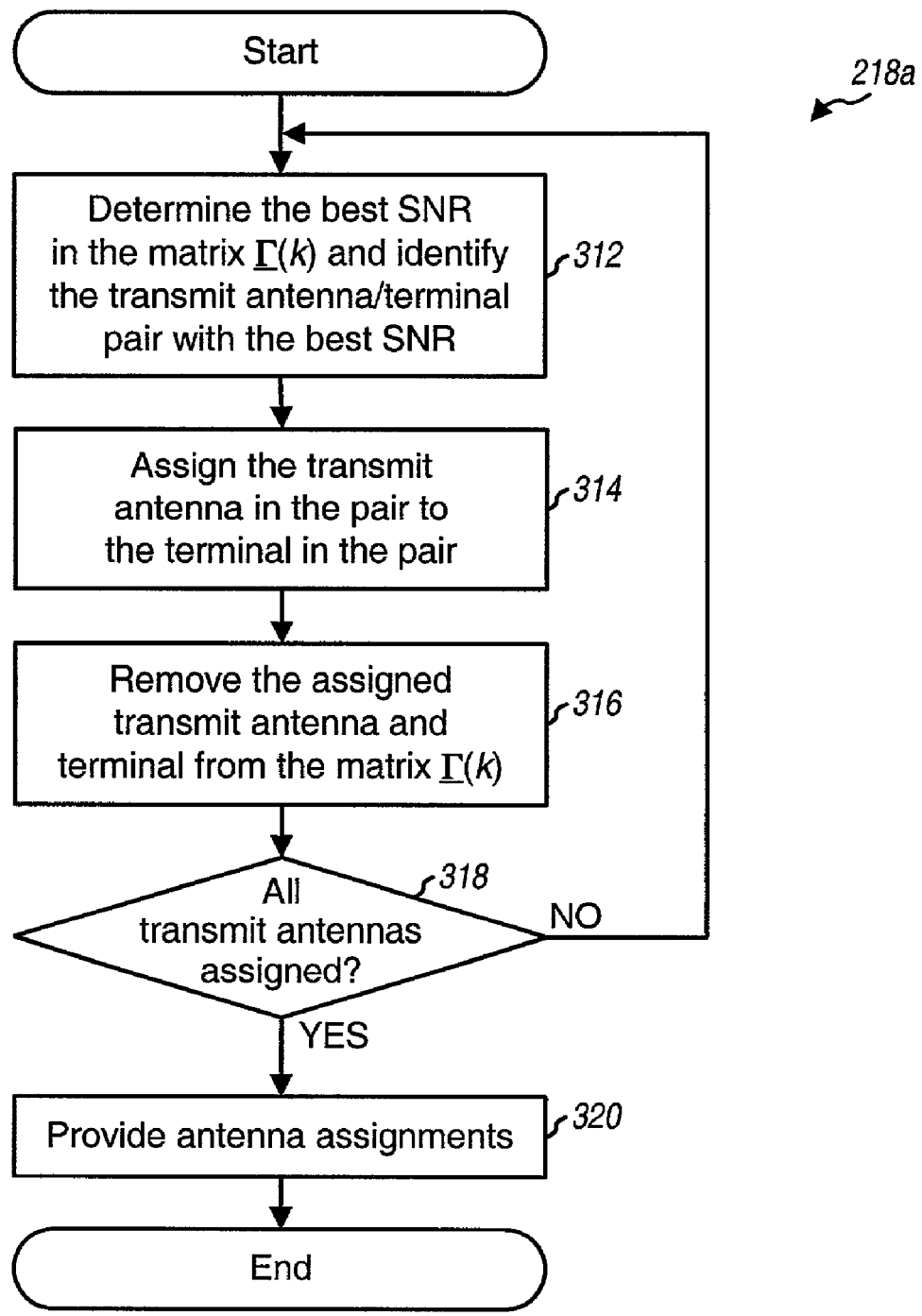
FIG. 3 is a flow diagram of a process to assign transmit antennas to terminals using a "max-max" criterion.

FIG. 3 is a flow diagram of a process 218a to assign transmit antennas to terminals for a particular frequency subchannel group using the max-max criterion. Process 218a is performed for a particular hypothesis, which corresponds to a specific set of one or more active terminals to be evaluated. Process 218a may be used for step 218 in FIG. 2, in which case only one sub-hypothesis is evaluated for each hypothesis in process 200.

Initially, the maximum SNR in the hypothesis matrix $\underline{\Gamma}(k)$ is determined, at step 312. This maximum SNR corresponds to a specific transmit antenna/terminal pairing, and the transmit antenna is assigned to this terminal, at step 314. This transmit antenna and terminal are then removed from the matrix $\underline{\Gamma}(k)$, and the matrix is reduced to dimension $(N_T-1) \times (N_T-1)$ by removing both the column corresponding to the transmit antenna and the row corresponding to the terminal just assigned, at step 316.

At step 318, a determination is made whether or not all transmit antennas in the hypothesis have been assigned. If all transmit antennas have been assigned, then the antenna assignments are provided, at step 320, and the process terminates. Otherwise, the process returns to step 312 and another transmit antenna is assigned in similar manner.

Table 1 shows an example matrix $\underline{\Gamma}(k)$ of SNRs derived by the terminals in a 4×4 MIMO system in which the base station includes four transmit antennas and each terminal includes four receive antennas. For the antenna assignment scheme based on the max-max criterion, the best SNR (16 dB) in the original 4×4 matrix is achieved by transmit antenna 3 and is assigned to terminal 1, as indicated by the shaded box in the third row of the fourth column in the table. Transmit antenna 3 and terminal 1 are then removed from the matrix. The best SNR (14 dB) in the reduced 3×3 matrix is achieved by both transmit antennas 1 and 4, which are respectively assigned to terminals 3 and 2. The remaining transmit antenna 2 is then assigned to terminal 4.

TABLE 1

| SNR (dB) | Transmit Antenna | | | |
|---|---|---|---|---|
| Terminal | 1 | 2 | 3 | 4 |
| 1 | 7 | 9 | 16 | 5 |
| 2 | 8 | 10 | 12 | 14 |
| 3 | 14 | 7 | 6 | 9 |
| 4 | 12 | 10 | 7 | 5 |

Table 2 shows the antenna assignments using the max-max criterion for the example matrix $\underline{\Gamma}(k)$ shown in Table 1. For terminal 1, the best SNR (16 dB) is achieved when processing the signal transmitted from transmit antenna 3. The best transmit antennas for the other terminals are also indicated in Table 2. The scheduler may then use this information to select the proper coding and modulation scheme to use for data transmission.

TABLE 2

| Terminal | Transmit Antenna | SNR (dB) |
|---|---|---|
| 1 | 3 | 16 |
| 2 | 4 | 14 |
| 3 | 1 | 14 |
| 4 | 2 | 10 |

Once the antenna assignments have been made for a particular hypothesis matrix $\underline{\Gamma}(k)$ using the max-max criterion, the performance metric (e.g., the system throughput) corresponding to this hypothesis may be determined (e.g., based on the SNRs corresponding to the antenna assignments), as shown in equations (4) through (6). This performance metric is updated for each hypothesis in a particular frequency subchannel group. When all hypotheses for the frequency subchannel group have been evaluated, the best set of terminals and antenna assignments are selected for downlink data transmission on the frequency subchannel group in an upcoming time slot. The scheduling may be performed for each of the $N_G$ frequency subchannel groups.

The downlink scheduling scheme described in FIGS. 2 and 3 represents a specific scheme that evaluates various hypotheses corresponding to various possible sets of active terminal (which may include SIMO and/or MIMO terminals) desiring downlink data transmission in an upcoming time slot. The total number of hypotheses to be evaluated by the scheduler can be quite large, even for a small number of active terminals. In fact, the total number of hypotheses, $N_{hyp}$, can be expressed as:

$$N_{hyp} = N_G \cdot \binom{N_U}{N_T} = \frac{N_G \cdot N_U!}{(N_U - N_T)! N_T!}, \quad \text{Eq (7)}$$

where $N_U$ is the number of active terminals to be considered for scheduling. For example, if $N_G=16$, $N_U=8$, and $N_T=4$, then $N_{hyp}=1120$. An exhaustive search may be used to determine the particular hypothesis and the particular antenna assignments that provide the best system performance, as quantified by the performance metric used to select the best hypothesis and antenna assignments.

As noted above, other downlink scheduling schemes having reduced complexity may also be implemented. These scheduling schemes may also provide high system performance while reducing the amount of processing required to schedule terminals for downlink data transmission.

In the priority-based scheduling scheme, active terminals are scheduled for data transmission based on their priority. The priority of each active terminal may be derived based on one or more metrics (e.g., average throughput), system constraints and requirements (e.g., maximum latency), other factors, or a combination thereof, as described below. A list may be maintained for all active terminals desiring data transmission in an upcoming time slot. When a terminal desires downlink data transmission, it is added to the list and its metrics are initialized (e.g., to zero). The metrics of each terminal in the list are thereafter updated at each time slot. Once a terminal no longer desires data transmission, it is removed from the list.

For each frequency subchannel group in each time slot, all or a subset of the terminals in the list may be considered for scheduling. The specific number of terminals to be considered may be selected based on various factors. In one embodiment, only the $N_T$ highest priority terminals are selected for data transmission. In another embodiment, the highest $N_X$ priority terminals in the list are considered for scheduling, where $N_X > N_T$. A MIMO terminal may be represented as multiple terminals when selecting the $N_T$ or $N_X$ highest priority terminals for scheduling. For example, if $N_T=4$ and four independent data streams are transmitted from the base station for a given frequency subchannel group, then one SIMO terminal may be selected along with a MIMO terminal to be assigned three spatial subchannels (in which case the MIMO terminal is effectively representing three terminals in selecting the four highest priority terminals).

Figure 4:
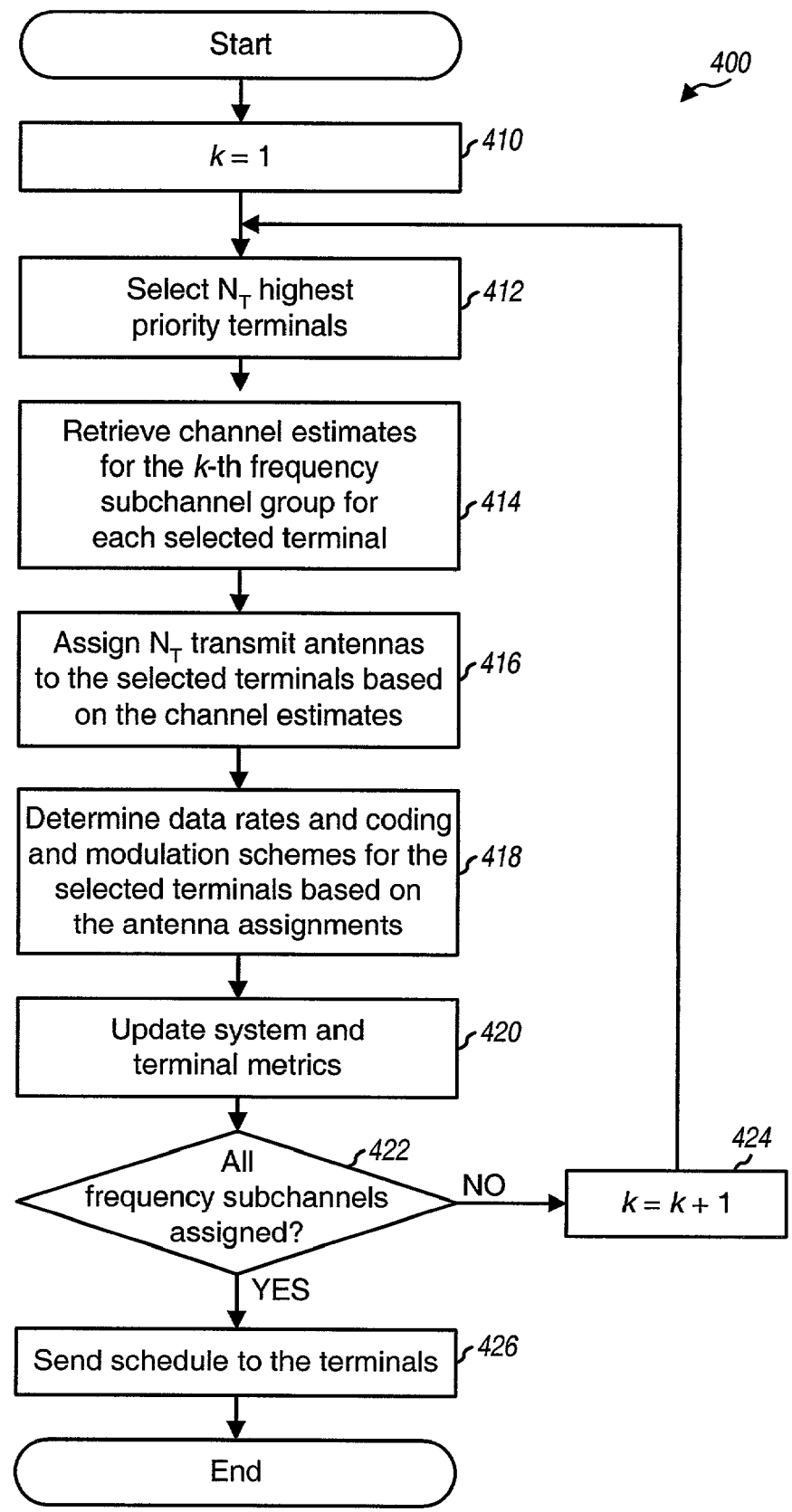
FIG. 4 is a flow diagram for a priority-based downlink scheduling scheme whereby a set of $N_T$ highest priority terminals is considered for scheduling.

FIG. 4 is a flow diagram for a priority-based downlink scheduling scheme 400 whereby a set of $N_T$ highest priority terminals is considered for scheduling for each frequency subchannel group. Initially, the first frequency subchannel group is considered by setting the frequency index k=1, at step 410. The spatial subchannels for the k-th frequency subchannel group are then assigned to the terminals for downlink transmission starting at step 412.

The scheduler examines the priority for all active terminals in the list and selects the set of $N_T$ highest priority terminals, at step 412. The remaining active terminals in the list are not considered for scheduling for this frequency subchannel group in this scheduling interval. The channel estimates for each selected terminal are then retrieved, at step 414. For example, the post-processed SNRs for the $N_T$ selected terminals may be retrieved and used to form the hypothesis matrix $\underline{\Gamma}(k)$.

The $N_T$ transmit antennas are then assigned to the $N_T$ selected terminals based on the channel estimates and using any one of a number of antenna assignment schemes, at step 416. For example, the antenna assignments may be based on an exhaustive search or the max-max criterion described above. In another antenna assignment scheme, the transmit antennas are assigned to the terminals such that their priorities are normalized as close as possible, after the terminal metrics are updated.

The data rates and the coding and modulation schemes for the terminals are then determined based on the antenna assignments, at step 418. The metrics of the scheduled (and unscheduled) terminals in the list are updated to reflect the scheduled data transmission (and non-transmission, respectively), and the system metrics are also updated, at step 420.

A determination is then made whether or not all frequency subchannels have been assigned for downlink transmission, at step 422. If all frequency subchannels have not been assigned, then the next frequency subchannel group is considered by incrementing the index k (i.e., k=k+1), at step 424. The process then returns to step 412 to assign the spatial subchannels of this new frequency subchannel group to the same or a different set of active terminals. Steps 412 through 424 are repeated for each frequency subchannel group to be assigned.

If all frequency subchannel groups have been assigned, at step 422, then a schedule indicative of the specific active terminals selected for downlink data transmission, their assigned transmission channels, the scheduled time slot(s), the data rates, the coding and modulation schemes, and so on, or any combination thereof, may be formed and communicated to these terminals, at step 426. The process then terminates for this scheduling interval.

As noted above, the transmit antennas may be assigned to the selected terminals for each frequency subchannel group based on various schemes. In one antenna assignment scheme, the transmitted antennas are assigned to achieve high system performance and based on the priority of the terminals.

Table 3 shows an example of the post-processed SNRs derived by each terminal in a hypothesis being considered, which is for a specific frequency subchannel group. For terminal 1, the best SNR is achieved when detecting the data stream transmitted from transmit antenna 3, as indicated by the shaded box in row 3, column 4 of the table. The best transmit antennas for other terminals in the hypothesis are also indicated by the shading in the boxes.

TABLE 3

| SNR (dB) | Transmit Antenna | | | |
| --- | --- | --- | --- | --- |
| Terminal | 1 | 2 | 3 | 4 |
| 1 | 7 | 9 | 16 | 5 |
| 2 | 8 | 10 | 12 | 14 |
| 3 | 14 | 7 | 6 | 9 |
| 4 | 12 | 10 | 7 | 5 |

If each terminal identifies a different transmit antenna from which the best post-processed SNR is detected, then the transmit antennas may be assigned to the terminals based on their best post-processed SNRs. For the example shown in Table 3, terminal 1 may be assigned to transmit antenna 3, and terminal 2 may be assigned to transmit antenna 2.

If more than one terminal prefers the same transmit antenna, then the scheduler can determine the antenna assignments based on various criteria (e.g., fairness, performance metric, and others). For example, Table 3 indicates that the best post-processed SNRs for terminals 3 and 4 occur for the data stream transmitted from the same transmit antenna 1. If the objective is to maximize throughput, then the scheduler may assign transmit antenna 1 to terminal 3 and transmit antenna 2 to terminal 4. However, if antennas are assigned to achieve fairness, then transmit antenna 1 may be assigned to terminal 4 if terminal 4 has higher priority than terminal 3.

The scheduling for MIMO terminals may also be performed based on full-CSI. In this case, the statistic to be used for scheduling terminals is the complex channel gains between the base station's transmit antennas and the terminal's receive antennas, which are used to form the channel response matrix, $\underline{H}(k)$, shown in equation (1). The scheduling is then performed such that a set of mutually compatible spatial signatures is selected for each frequency subchannel group. Scheduling of terminals based on the channel response matrix, $\underline{H}(k)$, is described in further detail below.

Downlink Scheduling for MISO Terminals

For the N-MISO mode, where ($N_R < N_T$), complex channel gains between the transmit antennas at the base station and the receive antenna(s) at the terminals may be used to form the channel response matrix, $\underline{H}(k)$, shown in equation (1) for each set of MISO terminals to be evaluated. The selection of MISO terminals for downlink transmission is then performed over the active terminals, and the selection goal is mutually compatible spatial signatures over the band of interest.

For the downlink in the multi-user N-MISO mode, the base station employs $N_T$ transmit antennas and (for simplicity) each of the $N_U$ MISO terminals to be considered for downlink scheduling employs a single receive antenna (i.e., $N_R=1$). In this case, up to $N_T$ terminals may be served by the base station simultaneously on any given frequency subchannel group (i.e., $N_U \leq N_T$). The model of the MISO channel for terminal i may be expressed as:

$$y_i(k) = \underline{H}_i(k)\underline{x}(k) + n_i(k), \quad \text{Eq (8)}$$

where $y_i(k)$ is the symbol received by the i-th terminal, for $i \in \{1, \ldots, N_U\}$, on the k-th frequency subchannel group;

$\underline{x}(k)$ is the transmitted vector (i.e., $\underline{x} = [x_1 \, x_2 \ldots x_{N_T}]^T$), where $\{x_j\}$ is the entry transmitted from the j-th transmit antenna for $j \in \{1, \ldots, N_T\}$, and for any matrix, $\underline{M}$, $\underline{M}^T$ denotes the transpose of $\underline{M}$;

$\underline{H}_i(k)$ is the $1 \times N_T$ channel response vector for the MISO channel of the i-th terminal for the k-th frequency subchannel group, where element $h_{i,j}$ is the coupling (i.e., the complex gain) between the j-th transmit antenna and the receive antenna of the i-th terminal, for $i \in \{1, \ldots, N_U\}$ and $j \in \{1, \ldots, N_T\}$; and $n_i(k)$ is the additive white Gaussian noise (AWGN) for the k-th frequency subchannel group of the i-th terminal, which has a mean of 0 and a variance of $\sigma_i^2$.

For simplicity, each frequency subchannel group is assumed to be a flat-fading, narrowband channel that can be represented by a constant complex value. Therefore, the elements of the channel response vector, $\underline{H}_i(k)$, for $i \in \{1, \ldots, N_U\}$, are scalars. In addition, it is assumed that there is a maximum power limit on each transmit antenna, which is denoted as $P_{max,j}$, for $j \in \{1, \ldots, N_T\}$. The transmit power on antenna j at any given time is denoted as $P_j$, where $P_j \leq P_{max,j}$.

The $N_T$ data streams transmitted from the $N_T$ transmit antennas for each frequency subchannel group can interfere with each other at the receive antenna of each terminal according to the channel response vectors, $\underline{H}_i(k)$. Without any pre-processing at the base station, the different data streams intended for different MISO terminals are subject to interference, which is referred to as multi-access interference (MAI). Because each MISO terminal employs only one receive antenna, all spatial processing aimed at combating the channel and MAI needs to be performed at the transmitter.

If the base station has knowledge of the channel response vector, $\underline{H}_i(k)$, for each MISO terminal to be considered for downlink scheduling (i.e., full channel state information), one technique for eliminating or reducing the MAI is by use of channel correlation matrix inversion (CCMI).

The transmit vector at the base station is $\underline{x}(k) = [x_1(k) \, x_2(k) \ldots x_{N_T}(k)]^T$, where $\{x_j(k)\}$ is the entry transmitted from the j-th transmit antenna for the k-th frequency subchannel group. Denoting the data stream intended for terminal i by $d_i(k)$, the actual data vector is $\underline{d}(k) = [d_1(k) \, d_2(k) \ldots d_{N_u}(k)]^T$, where the relations between the data vector and the transmitted vector is may be expressed as:

$$\underline{x}(k) = \underline{A}(k)\underline{S}(k)\underline{d}(k), \quad \text{Eq (9)}$$

where $\underline{A}(k)$ is an $N_T \times N_U$ CCMI matrix and $\underline{S}(k)$ is an $N_U \times N_U$ scaling matrix. The CCMI matrix may be viewed as including a number of steering vectors, one for each MISO terminal, with each steering vector being used to generate a beam for a respective MISO terminal. The CCMI technique decorrelates the data streams for the MISO terminals, and the solution for $\underline{A}(k)$ may be expressed as:

$$\underline{A}(k) = \underline{H}^T(k)(\underline{H}(k)\,\underline{H}^T(k))^{-1} \quad \text{Eq (10)}$$

where $$H(k) = \begin{bmatrix} H_1(k) \\ H_2(k) \\ \vdots \\ H_{N_U}(k) \end{bmatrix}$$

is an $N_U \times N_T$ matrix that holds the channel response vectors of the set of $N_U$ MISO terminals being considered for downlink scheduling for the current hypothesis.

The solution for $\underline{A}(k)$ does not require $\underline{H}(k)$ to be a square matrix, which is the case when $N_U \neq N_T$. However, if $\underline{H}(k)$ is a square matrix, then the solution in equation (10) can be rewritten as $\underline{A}(k) = \underline{H}^{-1}(k)$, where $\underline{H}^{-1}(k)$ is the inverse of $\underline{H}(k)$, so that $\underline{H}^{-1}(k)\underline{H}(k) = \underline{H}(k)\underline{H}^{-1}(k) = \underline{I}$, where $\underline{I}$ is the square identity matrix with ones on the diagonal and zeros elsewhere.

Because there is a power limit of $P_{max,j}$ on each transmit antenna $j \in \{1, \ldots, N_T\}$, it may be necessary to scale the rows of $\underline{A}(k)$ to ensure that the power used on transmit antenna j, $P_j$, does not exceed $P_{max,j}$. However, in order to maintain the orthogonality between the rows of $\underline{H}(k)$ and the columns of $\underline{A}(k)$, all entries within each column of $\underline{A}(k)$ need be scaled by the same value. The scaling is accomplished by the scaling matrix, $\underline{S}(k)$, in equation (9), which has the following form:

$$\underline{S}(k) = \begin{bmatrix} S_1(k) & 0 & \cdots & 0 \\ 0 & S_2(k) & \cdots & 0 \\ \vdots & \vdots & \ddots & \vdots \\ 0 & 0 & \cdots & S_{N_U}(k) \end{bmatrix}, \quad \text{Eq (11)}$$

where the scale value $S_i(k)$ multiplies data stream $d_i(k)$. The set of scale values, $\{S_i(k)\}$, can be obtained by solving the following set of equations $$\text{diag}((\underline{A}(k)\underline{S}(k)(\underline{A}(k)\underline{S}(k))^T) \leq \underline{P}_{max}(k), \quad \text{Eq (12)}$$

where $\underline{P}_{max}(k) = [P_{max,1}(k) \; P_{max,2}(k) \; \ldots \; P_{max,N_T}(k)]^T$ and $P_{max,j}(k)$ is the maximun power allocated to the k-th frequency subchannel group for the j-th transmit antenna. The values $S_i(k)$ can be solved for from equation (12) and ensure that the power used on each transmit antenna for the k-th frequency subchannel group does not exceed $P_{max,j}(k)$.

The total transmit power, $P_{max,j}$, for each transmit antenna may be allocated to the $N_G$ frequency subchannel groups in various manners. In one embodiment, the total transmit power is allocated equally among the $N_G$ frequency subchannel groups such that $P_j(k) = P_{max,j}/N_G$. In another embodiment, the total transmit power can be allocated unequally among the $N_G$ frequency subchannel groups while maintaining $$\sum_{k=1}^{N_G} P_j(k) = P_{max,j}.$$

The total transmit power, $P_{max,j}$, $P_{max,j}$, may be allocated based on various techniques, including a "water-pouring" or "water-filling" technique that allocates transmit power such that throughput is maximized. The water-pouring technique is described by Robert G. Gallager in "Information Theory and Reliable Communication," John Wiley and Sons, 1968, which is incorporated herein by reference. A specific algorithm for performing the basic water-pouring process for a MIMO-OFDM system is described in U.S. patent application Ser. No. 09/978,337, published as U.S. Patent Publication No. 2003-0072379, entitled "Method and Apparatus for Determining Power Allocation in a MIMO) Communication System,"assigned to the assignee of the present application and incorporated herein by reference. Transmit power allocation is also described in U.S. patent application Ser. No. 10/017,308, issued as U.S. Pat. No. 6,760,388, entitled "Time-Domain Transmit and Receive Processing with Channel Eigen-mode Decomposition for MIMO Systems, "assigned to the assignee of the present application and incorporated herein by reference. The optimum allocation of the total transmit power, $P_{max,j}$, for each of the $N_T$ transmit antennas among the $N_G$ frequency subchannel groups is typically complex, and iterative techniques may be used to solve for the optimum power allocation.

Substituting equation (9) into equation (8), the expression for the received symbol for terminal i may be expressed as:

$$y_i(k) = \underline{H}_i(k)\underline{A}(k)\underline{S}(k)\underline{d}(k) + n_i(k), \quad \text{Eq (13)}$$

which simplifies to $$y_i(k) = S_i(k)d_i(k) + n_i(k), \quad \text{Eq (14)}$$

since $\underline{H}_i(k)$ is orthogonal to all, except the i-th, columns of $\underline{A}(k)$.

The resulting SNR for terminal i for the k-th frequency subchannel group may be expressed as:

$$\gamma_i(k) = \frac{S_i^2(k)}{\sigma_i^2(k)}. \quad \text{Eq (15)}$$

In selecting a set of MISO terminals having mutually compatible spatial signatures for downlink data transmission on a given frequency subchannel group, the above analysis may be performed for each set of MISO terminals to be evaluated (i.e., each hypothesis). The SNR for each terminal in the set may be determined as shown in equation (15). This SNR may be used in a performance metric, such as the one based on throughput shown above in equations (5) and (6). Mutual compatibility may thus be defined based on throughput or some other criteria (e.g., the most mutually compatible MISO terminals may be the ones that achieve the highest overall throughput).

The MISO terminals may also be scheduled for downlink data transmission based on their priorities. In this case, the above description for scheduling SIMO and MIMO terminals based on priority may also be applied for scheduling MISO terminals. For example, the $N_T$ highest priority MISO terminals may be considered for scheduling for each frequency subchannel group.

Other techniques to generate multiple beams for multiple terminals may also be used, and this is within the scope of the invention. For example, the beam steering may be performed based on a minimum mean square error (MMSE) technique. The CCMI and MMSE techniques are described in detail in U.S. patent application Ser. No. U.S. patent application Ser. Nos. 09/826,481, issued as U.S. Pat. No. 6,771,706, and 09/956,449, published as U.S. Patent Publication No. 2003-0003880, both entitled "Method and Apparatus for Utilizing Channel State Information in a Wireless Communication System," both assigned to the assignee of the present application and incorporated herein by reference.

Data transmission to multiple terminals concurrently based on spatial signatures is also described in U.S. Pat. No. 5,515,378, entitled "Spatial Division Multiple Access Wireless Communication System," issued May 7, 1996, which is incorporated herein by reference.

The beam-steering technique described above for MISO terminals may also be used for MIMO terminals.

The ability to schedule MISO terminals on a per frequency subchannel group basis can result in improved system performance since the frequency signatures of the MISO terminals may be exploited in selecting the set of mutually compatible terminals for each frequency subchannel group.

The techniques described above may be generalized to handle a combination of SIMO, MISO, and MIMO terminals. For example, if four transmit antennas are available at the base station, then four independent data streams may be transmitted to a single 4×4 MIMO terminal, two 2×4 MIMO terminals, four 1×4 SIMO terminals, four 4×1 MISO terminals, one 2×4 MIMO terminal and two 1×4 SIMO terminals, or any other combination of terminals designated to receive a total of four data streams for each frequency subchannel group. The scheduler can be designed to select the best combination of terminals based on the post-processed SNRs for various hypothesized sets of terminals, where each hypothesized set may include a mixture of SIMO, MISO, and MIMO terminals.

Various metrics and factors may be used to determine the priority of the active terminals. In an embodiment, a "score" may be maintained for each active terminal and for each metric to be used for scheduling. In one embodiment, a score indicative of an average throughput over a particular averaging time interval is maintained for each active terminal. In one implementation, the score $\phi_i(n)$ for terminal i at time slot n is computed as a linear average throughput achieved over $N_P$ prior time slots, and may be expressed as:

$$\phi_i(n) = \frac{1}{N_P} \sum_{l=n-N_P+1}^{n} r_i(l)/r_{max}, \qquad \text{Eq (16)}$$

where $r_i(n)$ is the "realized" data rate (in unit of bits/time slot) for terminal i at time slot n and may be computed based on the post-processed SNRs as shown in equation (6). Typically, $r_i(n)$ is bound by a particular maximum achievable data rate, $r_{max}$, and a particular minimum data rate (e.g., zero). In another implementation, the score $\phi_i(n)$ for terminal i at time slot n is an exponential average throughput achieved over some time interval, and may be expressed as:

$$\phi_i(n) = (1-\alpha)\cdot\phi_i(n-1) + \alpha\cdot r_i(n)/r_{max}, \qquad \text{Eq (17)}$$

where $\alpha$ is a time constant for the exponential averaging, with a larger value for $\alpha$ corresponding to a shorter averaging time interval.

When a terminal desires data transmission, it is added to the active terminals list and its score is initialized to zero. The score for each active terminal in the list may subsequently be updated at each time slot. Whenever an active terminal is not scheduled for transmission in a given time slot, its data rate for the time slot is set to zero (i.e., $r_i(n)=0$) and its score is updated accordingly. If the data packet transmitted in a scheduled time slot is received in error by a terminal, then the terminal's effective data rate for that time slot may be set to zero. The packet error may not be known immediately (e.g., due to round trip delay of an acknowledgment/negative acknowledgment (Ack/Nak) scheme used for the data transmission) but the score can be adjusted accordingly once this information is available.

The priority for the active terminals may also be determined based in part on system constraints and requirements. For example, if the maximum latency for a particular terminal exceeds a threshold value, then the terminal may be elevated to a high priority.

Other factors may also be considered in determining the priority of the active terminals. One such factor may be related to the type of data to be transmitted to the terminals. Delay sensitive data may be associated with higher priority, and delay insensitive data may be associated with lower priority. Retransmitted data due to decoding errors in a prior transmission may also be associated with higher priority since other processes may be waiting at the terminal for the retransmitted data. Another factor may be related to the type of data service being provided for the terminals. Other factors may also be considered in determining priority and are within the scope of the invention.

The priority of an active terminal may thus be a function of any combination of (1) the score maintained for the terminal for each metric to be considered, (2) other parameter values maintained for system constraints and requirements, and (3) other factors. In one embodiment, the system constraints and requirements represent "hard" values (i.e., high or low priority, depending on whether or not the constraints and requirements have been violated) and the scores represent "soft" values. For this embodiment, terminals for which the system constraints and requirements have not been met may be immediately considered, along with other terminals based on their scores.

A priority-based scheduling scheme may be designed to achieve equal average throughput (e.g., equal quality of service or QoS) for all active terminals in the list. In this case, the active terminals are prioritized based on their achieved average throughput, which may be determined as shown in equation (16) or (17). In this priority-based scheduling scheme, the scheduler uses the scores to prioritize terminals for assignment to the available transmission channels. The scores of the terminals are updated based on their assignments or non-assignments to transmission channels and may further be adjusted for packet errors. The active terminals in the list may be prioritized such that the terminal with the lowest score is given the highest priority, and the terminal with the highest score is conversely given the lowest priority. Other methods for ranking terminals may also be used. The prioritization may also assign non-uniform weighting factors to the terminal scores.

For a downlink scheduling scheme in which terminals are selected and scheduled for data transmission based on their priority, it is possible for poor terminal groupings to occur occasionally. A "poor" terminal set is one that results in similar channel response matrices $\underline{H}(k)$ which cause poor SNRs for all terminals on all transmitted data streams. This then results in low throughput for each terminal in the set and low overall system throughput. When this occurs, the priorities of the terminals may not change substantially over several time slots. The scheduler may then be stuck with this particular terminal set until the priorities of the terminals change sufficiently to cause a change in membership in the set.

To avoid the "clustering" effect described above, the scheduler can be designed to recognize this condition prior to assigning terminals to the available transmission channels and/or to detect the condition once it has occurred. A number of schemes may be used to determine the degree of linear dependence in the channel response matrices $\underline{H}(k)$. One scheme to detect clustering is to apply a particular threshold to the hypothesis matrix $\underline{\Gamma}(k)$. If all or a substantial number of SNRs in the matrix $\underline{\Gamma}(k)$ are below this threshold, then the clustering condition is deemed to be present. In the event that the clustering condition is detected, the scheduler can reorder the terminals (e.g., in a random manner) in an attempt to reduce the linear dependence in the hypothesis matrix. A shuffling scheme may also be devised to force the scheduler to select terminal sets that result in "good" hypothesis matrices (i.e., ones that have minimal amount of linear dependence).

The scheduling of terminals for downlink data transmission and the scheduling of terminals based on priority are also described in U.S. patent application Ser. No. 09/859,345, issued as U.S. Pat. No 6,662,024, entitled "Method and Apparatus for Allocating Downlink Resources in a Multiple-Input Multiple-Output (MIMO) Communication System," U.S. patent application Ser. No. 09/539,157, issued as U.S. Pat. No. 6,493,331, entitled "Method and Apparatus for Controlling Transmissions of a Communications System," and U.S. patent application Ser. No. 09/675,706, issued as U.S. Pat. No. 6,745,044, entitled "Method and Apparatus for Determining Available Transmit Power in a Wireless Communication System," all assigned to the assignee of the present application and incorporated herein by reference.

Some of the downlink scheduling schemes described above employ techniques to reduce the amount of processing required to select terminals for evaluation and assign transmission channels to the selected terminals. These and other techniques may also be combined to derive other scheduling schemes, and this is within the scope of the invention. For example, the $N_X$ highest priority terminals may be considered for scheduling using any one of the schemes described above.

In another downlink scheduling scheme, the transmit power is allocated such that approximately equal SNRs are achieved for all transmission channels used to transmit each data stream. A particular data stream may be transmitted via multiple transmission channels (i.e., via multiple spatial subchannels and/or multiple frequency subchannels), and these transmission channels may achieve different SNRs if equal transmit power is allocated to these transmission channels. By allocating different amounts of transmit power to these transmission channels, approximately equal SNRs may be achieved which would then allow a single common coding and modulation scheme to be used for the data stream transmitted on these transmission channels. In effect, the unequal power allocation performs a channel inversion on the transmission channels such that they appear as being similar at the receiver. Channel inversion of all transmission channels and the channel inversion of only the selected transmission channels are described in U.S. patent application Ser. No. 09/860,274, published as U.S. Patent Publication No. 2003-0048856, U.S. patent application Ser. No. 09/881,610, published as U.S. Patent Publication No. 2003-0112880, and U.S. patent application Ser. No. 09/892,379, issued as U.S. Pat. 6,751,187, all three entitled "Method and Apparatus for Processing Data for Transmission in a Multi-Channel Communication System Using Selective Channel Inversion," assigned to the assignee of the present application, and incorporated herein by reference.

In one downlink scheduling scheme with non-uniform transmit power allocation, only transmission channels with achieved SNRs above a particular threshold SNR are selected for use, and transmission channels with achieved SNRs below this threshold SNR are not used. This scheme may be used to remove poor transmission channels with limited transmission capabilities by allocating no transmit power to these transmission channels. The total available transmit power may then be allocated uniformly or non-uniformly across the selected transmission channels.

In another downlink scheduling scheme, the transmit power is allocated such that approximately equal SNRs are achieved for all transmission channels used to transmit each data stream. A particular data stream may be transmitted via multiple transmission channels (i.e., via multiple spatial subchannels and/or multiple frequency subchannels), and these transmission channels may achieve different SNRs if equal transmit power is allocated to these transmission channels. By allocating different amounts of transmit power to these transmission channels, approximately equal SNRs may be achieved which would then allow a single common coding and modulation scheme to be used for the data stream transmitted on these transmission channels. In effect, the unequal power allocation performs a channel inversion on the transmission channels such that they appear as being similar at the receiver. Channel inversion of all transmission channels and the channel inversion of only the selected transmission channels are described in U.S. patent application Ser. No. 09/860,274, filed May 17, 2001, U.S. patent application Ser. No. 09/881,610, filed Jun. 14, 2001, and U.S. patent application Ser. No. 09/892,379, filed Jun. 26, 2001, all three entitled "Method and Apparatus for Processing Data for Transmission in a Multi-Channel Communication System Using Selective Channel Inversion," assigned to the assignee of the present application, and incorporated herein by reference.

In yet another downlink scheduling scheme, the transmit power may be allocated such that a desired data rate is achieved for each of the scheduled terminals. For example, more transmit power may be allocated to terminals with higher priority and less transmit power may be allocated to terminals with lower priority.

In yet another downlink scheduling scheme, the transmit power may be allocated non-uniformly to achieve high throughput. High system throughput may be achieved by allocating more transmit power to better transmission channels and less transmit power to poor transmission channels. The "optimum" allocation of transmit power to transmission channels of varying capacities may be performed based on the water-pouring technique. A scheme for allocating transmit power based on water pouring is described in the aforementioned U.S. patent application Ser. No. 09/978,337.

Other downlink scheduling schemes that also allocate transmit power in a non-uniform manner to achieve the desired results may also be implemented, and this is within the scope of the invention.

Typically, the terminals determine their post-processed SNRs from some "assumed" power allocation, which may be the fixed power used for the pilot transmitted from the base station. Therefore, if the powers used for data transmission deviate from the assumed powers, then the post-processed SNRs will be different. Since the data rates used for the data transmission are based largely on the post-processed SNRs, the actual data rates may be sent to the terminals (e.g., in the preamble of a data packet). The terminals may also perform "blind" rate detection and attempt to process the received data transmission at various possible data rates until the data transmission is either received correctly or cannot be recovered error-free for all possible rates. Changing the transmit power in a given spatial subchannel can impact the post-processed SNR of another spatial subchannel in the same frequency subchannel group, and this effect can be considered in selecting terminals for data transmission.

"Water-filling" power allocation may also be used to allocate the available transmit power among the transmission channels such that throughput is maximized. The water-filling process may be performed in various manners such as (1) across all frequency subchannel groups for each spatial subchannel, (2) across all spatial subchannels for each frequency subchannel group, (3) across all frequency subchannels of all spatial subchannels, or (4) over some defined set of transmission channels. For example, the water-filling may be performed across a set of transmission channels used for a single data stream targeted for a particular terminal.

With partial-CSI schemes (e.g., those that use post-processed SNRs), there is a per antenna constraint on the allocation of transmit power. So for a multi-user case, the transmit powers may be allocated/reallocated (1) among multiple terminals scheduled on the same transmit antenna, (2) among the multiple transmission channels assigned to each scheduled terminal (with the total power allocated to each terminal being fixed), or (3) based on some other allocation scheme. For full-CSI schemes (e.g., those based on channel gains), additional flexibility is available since the transmit power may be reallocated across transmit antennas (i.e., eigenmodes) as well as across frequency subchannel groups. The allocation/reallocation of transmit power among multiple terminals then takes on an additional dimension.

Thus, more complex downlink scheduling schemes that may be able to achieve throughput closer to optimum may be devised. These scheduling schemes may evaluate a large number of hypotheses and antenna assignments (and possibly different transmit power allocations) in order to determine the best set of terminals and the best antenna assignments. Other downlink scheduling schemes may also be designed to take advantage of the statistical distribution of the data rates achieved by each terminal. This information may be useful in reducing the number of hypotheses to evaluate. In addition, for some applications, it may be possible to learn which terminal groupings (i.e., hypotheses) work well by analyzing performance over time. This information may then be stored, updated, and used by the scheduler in future scheduling intervals.

The successive cancellation receiver processing technique is described in further detail in U.S. patent application Ser. No. 09/854,235, issued as U.S. Pat. No. 6,785,341, entitled "Method and Apparatus for Processing Data in a Multiple-Input Multiple-Output (MIMO) Communication System Utilizing Channel State Information," and U.S patent application Ser. No. 09/993,087, published as U.S. Patent Publication No. 2003-0125040, entitled "Multiple-Access Multiple-Input Multiple-Output (MIMO) Communication System," both assigned to the assignee of the present application and incorporated herein by reference.

In the MIMO mode, (up to) $N_T$ independent data streams may be simultaneously transmitted by the base station from $N_T$ transmit antennas for each frequency subchannel group and targeted to a single MIMO terminal with $N_R$ receive antennas (i.e., $N_R \times N_T$ MIMO). The MIMO terminal may use spatial equalization (for a non-dispersive MIMO channel with flat fading) or space-time equalization (for a dispersive MIMO channel with frequency selective fading) to process and separate the $N_T$ transmitted data streams for each frequency subchannel group. The SNR of each post-processed data stream (i.e., after equalization) may be estimated and sent back to the base station as channel state information. The base station may then use this information to select the proper rate to use for each data stream such that the MIMO terminal is able to detect each transmitted data stream at the desired level of performance (e.g., the target PER).

If all data streams are transmitted to one terminal, as is the case in the MIMO mode, then the successive cancellation receiver processing technique may be used at this terminal to process $N_R$ received signals to recover $N_T$ transmitted data streams for each frequency subchannel group. This technique successively processes the $N_R$ received signals a number of times (or iterations) to recover the signals transmitted from the base station, with one transmitted signal being recovered for each iteration. For each iteration, the technique performs spatial or space-time equalization on the $N_R$ received signals. One of the transmitted signals is then recovered, and the interference due to the recovered signal is then estimated and canceled from the received signals to derive "modified" signals having the interference component removed.

The modified signals are then processed by the next iteration to recover another transmitted signal. By removing the interference due to each recovered signal from the received signals, the SNR improves for the transmitted signals included in the modified signals and not yet recovered. The improved SNR results in improved performance for the terminal as well as the system.

The successive cancellation receiver processing technique is described in further detail in U.S. patent application Ser. No. 09/854,235, issued as U.S. Pat. No. 6,785,341, entitled "Method and Apparatus for Processing Data in a Multiple-Input Multiple-Output (MIMO) Communication System Utilizing Channel State Information," and U.S. patent application Ser. No. 09/993,087, published as U.S. Patent Publication No. 2003-0125040, entitled "Multiple-Access Multiple-Input Multiple-Output (MIMO) Communication System," both assigned to the assignee of the present application and incorporated herein by reference.

In an embodiment, each MIMO terminal in the system estimates and sends back $N_T$ post-processed SNR values for the $N_T$ transmit antennas for each frequency subchannel group that may be separately assigned to the terminals. The SNRs from the active terminals may be evaluated by the scheduler to determine which terminal(s) to transmit data to and when, and the proper rate to use for each data stream transmitted to the selected terminals. MIMO terminals may be selected for data transmission based on a particular performance metric formulated to achieve the desired system goals. The performance metric may be based on one or more functions and any number of parameters. Various functions may be used to formulate the performance metric, such as the function of the achievable throughput for the MIMO terminals, which is shown above in equations (5) and (6).

In the N-SIMO mode, (up to) $N_T$ independent data streams may be simultaneously transmitted by the base station from the $N_T$ transmit antennas for each frequency subchannel group and targeted to (up to) $N_T$ different SIMO terminals. To achieve high performance, the scheduler may consider a large number of possible terminal sets for data transmission. The scheduler then determines the best set of $N_T$ SIMO terminals to transmit simultaneously for each frequency subchannel group. In a multiple-access communication system, there are generally constraints on satisfying certain requirements on a per terminal basis, such as maximum latency or average data rate. In this case, the scheduler can be designed to select the best set of terminals subject to these constraints.

In one implementation for the N-SIMO mode, the terminals use spatial equalization to process the receive signals, and the post-processed SNR corresponding to each data stream is provided to the base station. The scheduler then uses the information to select active terminals for data transmission and to assign transmission channels to the selected terminals.

In another implementation for the N-SIMO mode, the terminals use successive cancellation receiver processing to process the receive signal to achieve higher post-processed SNRs. With successive cancellation receiver processing, the post-processed SNRs for the transmitted data streams depend on the order in which the data streams are detected (i.e., demodulated and decoded). In some cases, a particular SIMO terminal may not be able to cancel the interference from a particular data stream designated for another terminal, since the coding and modulation scheme used for this data stream was selected based on the other terminal's post-processed SNR. For example, a transmitted data stream may be targeted for terminal $u_x$ and coded and modulated for proper detection at a (e.g., 10 dB) post-processed SNR achieved at the target terminal $u_x$, but another terminal $u_y$ may receive the same transmitted data stream at a worse post-processed SNR and is thus not able to properly detect the data stream. If the data stream intended for another terminal cannot be detected error free, then cancellation of the interference due to this data stream is not possible. Successive cancellation receiver processing is viable when the post-processed SNR corresponding to a transmitted data stream permits reliable detection.

The terminal can attempt to use successive cancellation receiver processing on all the other transmitted data streams not intended for it before attempting to process its own data stream to improve the reliability of the detection. However, in order for the system to capitalize on this improvement, the base station needs to know the hypothetical post-processed SNR given the interference from other antennas have been successfully cancelled. Independent constraints on the scheduler may result in a data rate assignment to these other antennas that precludes successful cancellation from being successful by the terminal. Thus there is no guarantee that the base station can select a data rate based on a post-processed SNR derived via successive cancellation receiver processing. However, the base station can use successive cancellation receiver processing on the uplink because it is the intended recipient of all data streams transmitted on the uplink.

In order for the scheduler to take advantage of the improvement in post-processed SNRs afforded by SIMO terminals using successive cancellation receiver processing, each such terminal can derive the post-processed SNRs corresponding to different possible orderings of detection for the transmitted data streams. The $N_T$ transmitted data streams for each frequency subchannel group may be detected based on $N_T$ factorial (i.e., $N_T!$) possible orderings at a SIMO terminal, and each ordering is associated with $N_T$ post-processed SNR values. Thus, $N_T \cdot N_T!$ SNR values may be reported by each active terminal to the base station for each frequency subchannel group (e.g., if $N_T=4$, then 96 SNR values may be reported by each SIMO terminal for each frequency subchannel group). The scheduler can then use the information to select terminals for data transmission and to further assign transmit antennas to the selected terminals.

If successive cancellation receiver processing is used at the terminals, then the scheduler can also consider the possible detection orderings for each terminal. However, a large number of these orderings are typically invalid because a particular terminal is able to properly detect data streams transmitted to other terminals due to the lower post-processed SNRs achieved at this terminal for the undetectable data streams.

In the mixed mode, the use of successive cancellation receiver processing by the (e.g., MIMO) terminals places additional constraints on the scheduler due to the dependencies introduced. These constraints may result in more hypothesized sets being evaluated, since in addition to considering different sets of terminals the scheduler needs to also consider the various orders for demodulating the data streams by each terminal in a given set. The assignment of the transmit antennas and the selection of the coding and modulation schemes would then take into account these dependencies in order to achieve high performance.

The set of transmit antennas at a base station may be a physically distinct set of "apertures", each of which may be used to directly transmit a respective data stream. Each aperture may be formed by a collection of one or more antenna elements that are distributed in space (e.g., physically located at a single site or distributed over multiple sites). Alternatively, the antenna apertures may be preceded by one or more (fixed) beam-forming matrices, with each matrix being used to synthesize a different set of antenna beams from the set of apertures. In this case, the above description for the transmit antennas applies analogously to the transformed antenna beams.

For the downlink, a number of fixed beam-forming matrices may be defined in advance, and the terminals may evaluate the post-processed SNRs for each of the possible matrices (or sets of antenna beams) and send SNR vectors back to the base station. Different performance (i.e., post-processed SNRs) is typically achieved for different sets of transformed antenna beams, and this is reflected in the reported SNR vectors. The base station may then perform scheduling and antenna assignment for each of the possible beam-forming matrices (using the reported SNR vectors), and select a particular beam-forming matrix as well as a set of terminals and their antenna assignments that achieve the best use of the available resources.

The use of beam-forming matrices affords additional flexibility in scheduling terminals and may further provide improved performance. As examples, the following situations may be well suited for beam-forming transformations:

Correlation in the MIMO channel is high so that the best performance may be achieved with a small number of data streams. However, transmitting with only a subset of the available transmit antennas (and using only their associated transmit amplifiers) results in a smaller total transmit power. A transformation may be selected to use most or all of the transmit antennas (and their amplifiers) for the data streams to be sent. In this case, higher transmit power is achieved for the transmitted data streams.

Physically dispersed terminals may be isolated somewhat by their locations. In this case, the terminals may be served by a standard FFT-type transformation of horizontally spaced apertures into a set of beams pointed at different azimuths.

Uplink Resource Allocation

On the uplink, since the base station is the intended recipient for the data transmissions from the scheduled terminals, the successive cancellation receiver processing technique may be used at the base station to process the transmissions from multiple terminals. This technique successively processes the $N_R$ received signals a number of times to recover the signals transmitted from the terminals, with one transmitted signal being recovered for each iteration.

When using the successive cancellation receiver processing technique to process the received signals, the SNR associated with each received data stream is a function of the particular order in which the transmitted signals are processed at the base station. The scheduling schemes can take this into account in selecting the best set of terminals for uplink data transmission.

Figure 5:
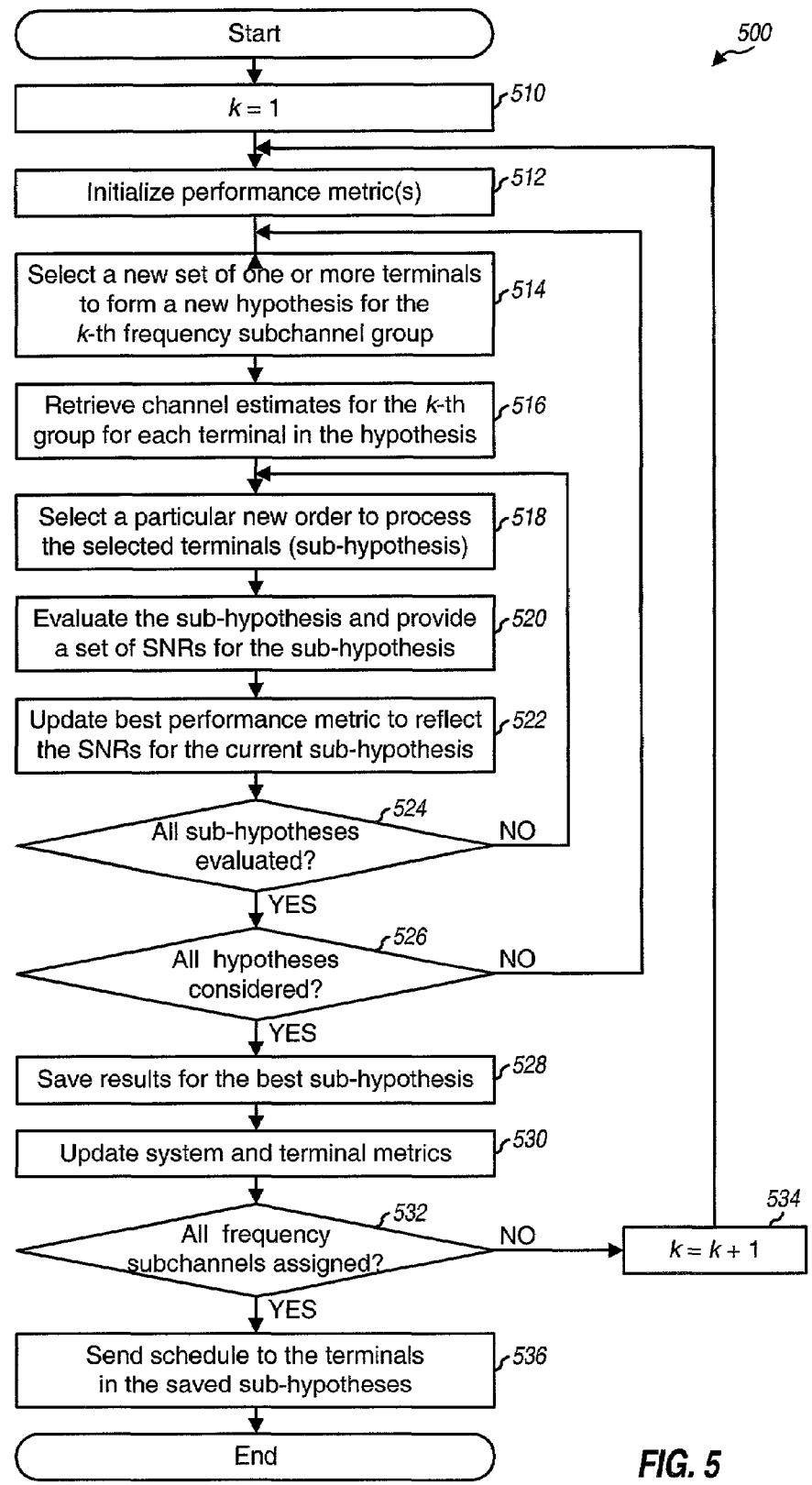
FIG. 5 is a flow diagram of a process to schedule terminals for uplink transmission.

FIG. 5 is a flow diagram of a process 500 to schedule terminals for uplink transmission. In this embodiment, the transmission channels are assigned to the active terminals by evaluating one frequency subchannel group at a time. The first frequency subchannel group is considered by setting the frequency index k=1, at step 510. The best set of terminals for uplink transmission on the k-th frequency subchannel group is then determined starting at step 512.

Initially, one or more performance metrics to be used to select the best set of terminals for uplink transmission on the current frequency subchannel group are initialized, at step 512. Various performance metrics may be used, such as the performance metric that maximizes system throughput as described above. Also, terminal metrics such as post-processed SNRs for the signals transmitted from the terminals, the average throughput, and so on, may also be used in the evaluation.

A new set of one or more active terminals is then selected from among all active terminals desiring to transmit data in an upcoming time slot, at step 514. As noted above, the number of active terminals to be considered for scheduling may be limited (e.g., based on their priority). This set of selected terminals forms a hypothesis to be evaluated. For each selected terminal, the channel estimates for each transmit antenna to be used for uplink data transmission are retrieved, at step 516. For the MIMO mode, a single MIMO terminal is selected for evaluation for the k-th frequency subchannel group, and $N_T$ vectors of channel estimates for $N_T$ transmit antennas of this terminal are retrieved. For the N-SIMO mode, $N_T$ SIMO terminals are selected for evaluation, and $N_T$ channel estimate vectors for one transmit antenna at each of the $N_T$ terminals are retrieved. And for the mixed mode, the $N_T$ channel estimate vectors are retrieved for the combination of SIMO and MIMO terminals in the set. In any case, the $N_T$ channel estimate vectors are used to form the channel response matrix $\underline{H}(k)$ shown in equation (1), with each channel estimate vector corresponding to a column of the matrix $\underline{H}(k)$. The set $\underline{u}(k)$ identifies the terminals whose channel estimate vectors are included in the channel response matrix $\underline{H}(k)$, where $\underline{u}(k)=\{u_a(k), u_b(k), \ldots, u_{N_T}(k)\}$ and a MIMO terminal may be represented as multiple terminals in the set $\underline{u}(k)$.

When the successive cancellation receiver processing technique is used at the base station, the order in which the terminals are processed directly impacts their performance. Thus, a particular new order is selected to process the terminals in the set $\underline{u}(k)$, at step 518. This particular order forms a sub-hypothesis to be evaluated.

The sub-hypothesis is then evaluated and terminal metrics for the sub-hypothesis are provided, at step 520. The terminal metrics may be the post-processed SNRs for the signals (hypothetically) transmitted from the terminals in the set $\underline{u}(k)$ to the base station. Step 520 may be achieved based on the successive cancellation receiver processing technique, which is described below in FIGS. 6A and 6B. The performance metric (e.g., the system throughput) corresponding to this sub-hypothesis is then determined (e.g., based on the post-processed SNRs for the terminals), at step 522. This performance metric is then used to update the performance metric for the best sub-hypothesis, also at step 522. Specifically, if the performance metric for the current sub-hypothesis is better than that for the best sub-hypothesis, then the current sub-hypothesis becomes the new best sub-hypothesis and the performance and terminal metrics corresponding to this sub-hypothesis are saved.

A determination is then made whether or not all sub-hypotheses for the current hypothesis have been evaluated, at step 524. If all sub-hypotheses have not been evaluated, then the process returns to step 518 and a different and not yet evaluated order for the terminals in the set $\underline{u}(k)$ is selected for evaluation. Steps 518 through 524 are repeated for each sub-hypothesis to be evaluated.

If all sub-hypotheses for the current hypothesis have been evaluated, at step 524, then a determination is next made whether or not all hypotheses have been considered, at step 526. If all hypotheses have not been considered, then the process returns to step 514 and a different and not yet considered set of terminals is selected for evaluation. Steps 514 through 526 are repeated for each hypothesis to be considered.

If all hypotheses for the current frequency subchannel group have been evaluated, at step 526, then the results for the best sub-hypothesis for this frequency subchannel group are saved, at step 528. The best sub-hypothesis corresponds to a specific set of one or more active terminals that provides the best performance metric for the frequency subchannel group. If successive cancellation receiver processing is used at the base station, then the best sub-hypothesis is further associated with a specific receiver processing order at the base station. The saved results may thus include the achievable SNRs for the terminals and the selected processing order.

If the scheduling scheme requires other system and terminal metrics to be maintained (e.g. the average throughput over the prior $N_P$ time slots, latency for data transmission, and so on), then these metrics are updated for the current frequency subchannel group, at step 530. The terminal and system metrics may also be saved.

A determination is then made whether or not all frequency subchannel groups have been assigned for uplink transmission, at step 532. If all frequency subchannel groups have not been assigned, then the next frequency subchannel group is considered by incrementing the index k (i.e., k=k+1), at step 534. The process then returns to step 512 to select the best set of terminals for uplink transmission on this new frequency subchannel group. Steps 512 through 534 are repeated for each frequency subchannel group to be assigned.

If all frequency subchannel groups have been assigned, at step 532, then the data rates and the coding and modulation schemes for the terminals in the best sub-hypotheses for each frequency subchannel group are determined (e.g., based on their SNRs), at step 536. A schedule indicative of the selected terminals and their assigned transmission channels and rates is formed and may be communicated to these terminals prior to the scheduled time slot, also at step 536. The uplink scheduling is typically performed for each scheduling interval.

Figure 6A:
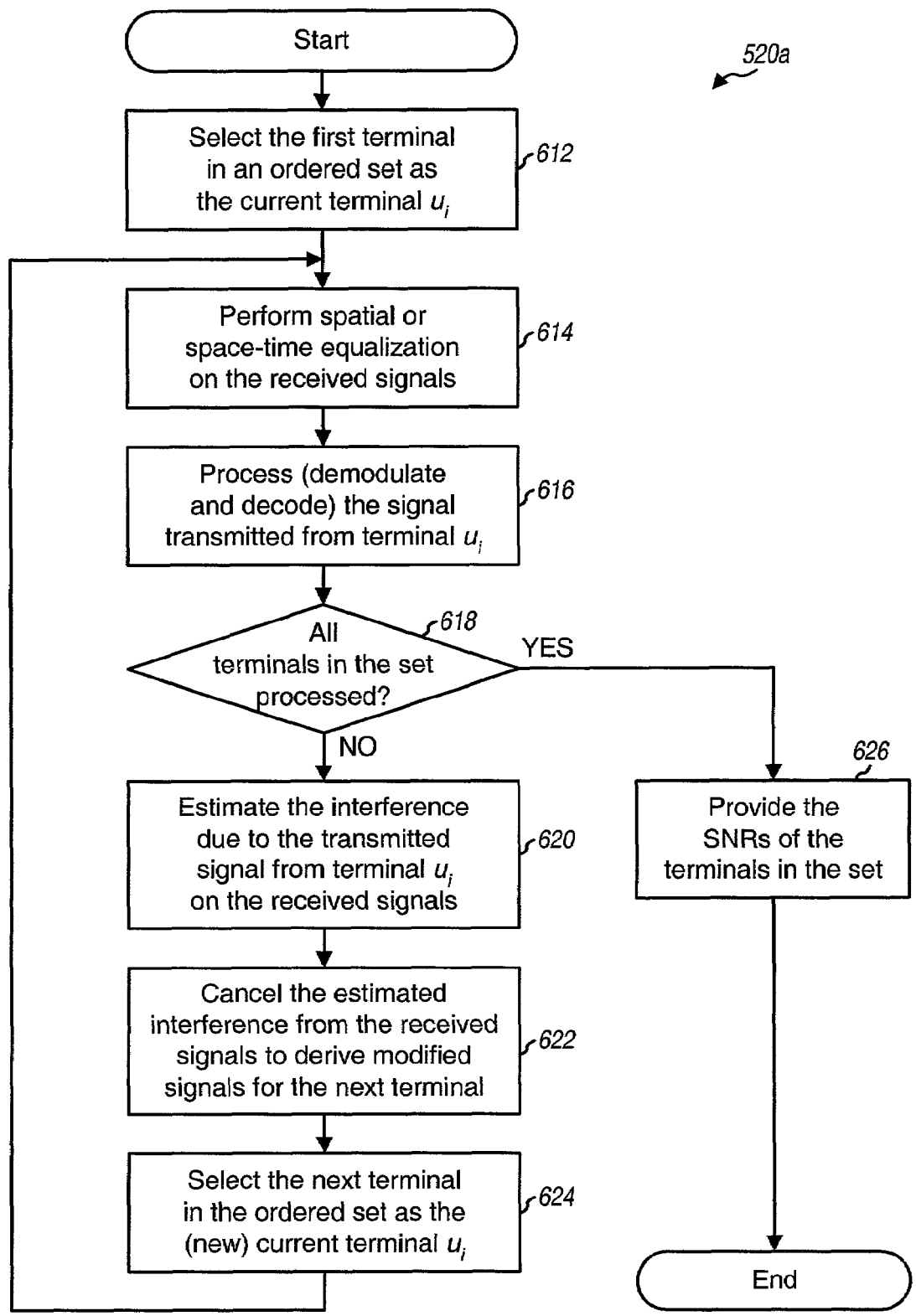
FIGS. 6A and 6B are flow diagrams for two successive cancellation receiver processing schemes whereby the processing order is (1) imposed by an ordered set of terminals and (2) determined based on the post-processed SNRs, respectively.

FIG. 6A is a flow diagram for a successive cancellation receiver processing scheme 520a whereby the processing order is imposed by an ordered set of terminals. This flow diagram may be used for step 520 in FIG. 5. The processing shown in FIG. 6A is performed for a particular sub-hypothesis, which corresponds to a set of ordered terminals, $\underline{u}(k)=\{u_a(k), u_b(k), \ldots, u_{N_T}(k)\}$. Initially, the first terminal in the ordered set is selected as the current terminal to be processed (i.e., $u_i=u_a(k)$), at step 612.

For the successive cancellation receiver processing technique, the base station first performs spatial or space-time equalization on the $N_R$ received signals to attempt to separate the individual signals transmitted by the terminals in the set $\underline{u}(k)$, at step 614. The spatial or space-time equalization may be performed as described below. The amount of achievable signal separation is dependent on the amount of correlation between the transmitted signals, and greater signal separation may be obtained if these signals are less correlated. Step 614 provides $N_T$ post-processed signals derived from the $N_R$ received signals and corresponding to the $N_T$ signals transmitted by the terminals in the set $\underline{u}(k)$. As part of the spatial or space-time processing, the SNR corresponding to the post-processed signal for the current terminal $u_i$ is also determined.

The post-processed signal for terminal $u_i$ is further processed (i.e., "detected") to obtain a decoded data stream for the terminal, at step 616. The detection may include demodulating, deinterleaving, and decoding the post-processed signal to obtain the decoded data stream.

At step 618, a determination is made whether or not all terminals in the set $\underline{u}(k)$ have been processed. If all terminals have been processed, then the SNRs of the terminals are provided, at step 626, and the receiver processing for this ordered set terminates. Otherwise, the interference due to the signal transmitted from terminal $u_i$ on each of the received signals is estimated, at step 620. The interference may be estimated (e.g., as described below) based on the channel response matrix $\underline{H}(k)$ for the terminals in the set $\underline{u}(k)$. The estimated interference due to terminal $u_i$ is then subtracted (i.e., canceled) from the received signals to derive modified signals, at step 622. These modified signals represent estimates of the received signals if terminal $u_i$ had not transmitted (i.e., assuming that the interference cancellation was effectively performed). The modified signals are used in the next iteration to process the signal transmitted from the next terminal in the set $\underline{u}(k)$. The next terminal in the set $\underline{u}(k)$ is then selected as the (new) current terminal $u_i$, at step 624. In particular, $u_i=u_b(k)$ for the second iteration, $u_i=u_c(k)$ for the third iteration, and so on, and $u_i=u_{N_T}(k)$ for the last iteration for the ordered set $\underline{u}(k)=\{u_a(k), u_b(k), \ldots, u_{N_T}(k)\}$.

The processing performed in steps 614 and 616 is repeated on the modified signals (instead of the received signals) for each subsequent terminal in the set $\underline{u}(k)$. Steps 620 through 624 are also performed for each iteration except for the last iteration.

Using the successive cancellation receiver processing technique, for each hypothesis of $N_T$ terminals, there are $N_T$ factorial possible orderings (e.g., $N_T!=24$ if $N_T=4$). For each ordering of terminals within a particular hypothesis (i.e., for each sub-hypothesis), the successive cancellation receiver processing (step 520) provides a set of SNRs for the post-processed signals for these terminals, which may be expressed as:

$$\gamma_{hyp,order}(k)=\{\gamma_1(k), \gamma_2(k), \ldots, \gamma_{N_T}(k)\}, \qquad \text{Eq (18)}$$

where $\gamma_i(k)$ is the SNR for the k-th frequency subchannel group after the receiver processing at the i-th terminal in the sub-hypothesis.

Each sub-hypothesis is further associated with a performance metric, $R_{hyp,order}(k)$, which may be a function of various factors. For example, a performance metric based on the SNRs of the terminals may be expressed as shown in equation (4). In an embodiment, the performance metric for the sub-hypothesis is a function of the achievable throughputs for all $N_T$ terminals in the set $\underline{u}(k)$, which may be expressed as shown in equation (5), where the throughput $r_i(k)$ associated with the i-th terminal in the sub-hypothesis may be expressed as shown in equation (6).

The uplink scheduling scheme described in FIGS. 5 and 6A may be used to evaluate all possible orderings of each possible set of active terminals desiring to transmit data on the uplink. The total number of potential sub-hypotheses to be evaluated by the uplink scheduler can be quite large, even for a small number of active terminals. In fact, the total number of sub-hypotheses can be expressed as:

$$N_{sub-hyp} = N_G \cdot N_T! \binom{N_U}{N_T} = \frac{N_G \cdot N_T!}{(N_U - N_T)!}, \qquad \text{Eq (19)}$$

where $N_U$ is the number of terminals to be considered for scheduling (again, a MIMO terminal may be represented as multiple terminals in the scheduling). For example, if $N_G=16$, $N_U=8$, and $N_T=4$, then $N_{sub-hyp}=26,880$. An exhaustive search may be used to determine the sub-hypothesis that provides the best system performance for each frequency subchannel group, as quantified by the performance metric used to select the best sub-hypothesis.

Similar to the downlink, a number of techniques may be used to reduce the complexity of the processing to schedule terminals for uplink transmission. Some scheduling schemes based on some of these techniques are described below. Other scheduling schemes may also be implemented and are within the scope of the invention. These scheduling schemes may also provide high system performance while reducing the amount of processing required to schedule terminals for uplink data transmission.

In a second uplink scheduling scheme, the terminals included in each hypothesis are processed in a specific order that is determined based on a particular defined rule. In an embodiment, this scheme relies on the successive cancellation receiver processing to determine the specific order for processing the terminals in the hypothesis. For example and as described below, for each iteration, the successive cancellation receiver processing scheme can recover the transmitted signal having the best SNR after equalization. In this case, the processing order is determined based on the post-processed SNRs for the terminals in the hypothesis.

Figure 6B:
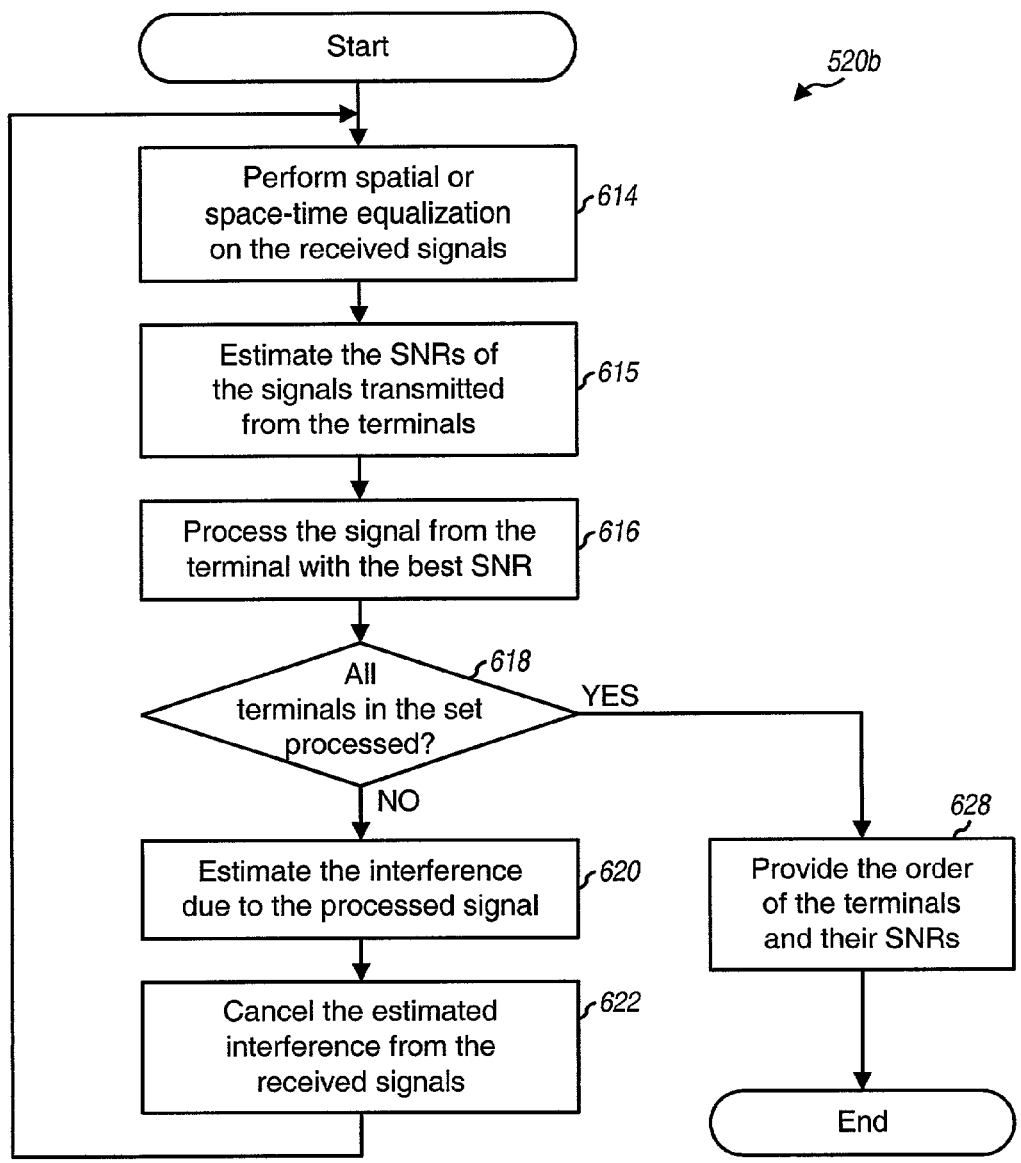

FIG. 6B is a flow diagram for a successive cancellation receiver processing scheme 520b whereby the processing order is determined based on the post-processed SNRs. This flow diagram may also be used for step 520 in FIG. 5. However, since the processing order is determined based on the post-processed SNRs achieved by the successive cancellation receiver processing, only one sub-hypothesis is effectively evaluated for each hypothesis, and steps 518 and 524 in FIG. 5 may be omitted.

Initially, spatial or space-time equalization is performed on the received signals to attempt to separate the individual transmitted signals, at step 614. The SNRs of the transmitted signals after the equalization are then estimated, at step 615. In an embodiment, the transmitted signal corresponding to the terminal with the best SNR is selected and further processed (i.e., demodulated and decoded) to obtain a corresponding decoded data stream, at step 616. At step 618, a determination is made whether or not all transmitted signals (i.e., all terminals in the hypothesis) have been processed. If all terminals have been processed, then the processing order of the terminals and their SNRs are provided, at step 628, and the receiver processing for this terminal set terminates. Otherwise, the interference due to the transmitted signal just processed is estimated, at step 620, and subtracted (i.e., canceled) from the received signals to derive the modified signals, at step 622. Steps 614, 616, 618, 620, and 622 in FIG. 6B correspond to identically numbered steps in FIG. 6A.

In a third uplink scheduling scheme, the terminals included in each hypothesis are processed based on a specific order. With successive cancellation receiver processing, the SNR of an unprocessed terminal improves with each iteration, as the interference from each processed terminal is removed. Thus, on average, the first terminal to be processed will have the lowest SNR, the second terminal to be processed will have the second to lowest SNR, and so on. Using this knowledge, the processing order for the terminals may be specified for a hypothesis. The processing order represents another degree of freedom that may be used by the scheduler to achieve the system goals and requirements.

In one embodiment of the third uplink scheduling scheme, the processing order for each hypothesis is selected based on the priority of the terminals in the hypothesis. For example, the lowest priority terminal in the hypothesis may be processed first, the next lowest priority terminal may be processed next, and so on, and the highest priority terminal may be processed last. This embodiment allows the highest priority terminal to achieve the highest SNR possible for the hypothesis, which in turn supports the highest possible data rate. In this manner, the terminals may be assigned transmission channels in a particular order, based on their priority, such that the highest priority terminal is assigned the highest possible data rate. In another embodiment of the third uplink scheduling scheme, the processing order for each hypothesis is selected based on user payload, latency requirements, emergency service priority, and so on.

In a fourth uplink scheduling scheme, the terminals are scheduled based on their priority, which may be determined based on one or more metrics (e.g., average throughput), system constraints and requirements (e.g., maximum latency), other factors, or a combination thereof, as described above. For each scheduling interval, a number of highest priority terminals may be considered for scheduling.

Figure 7:
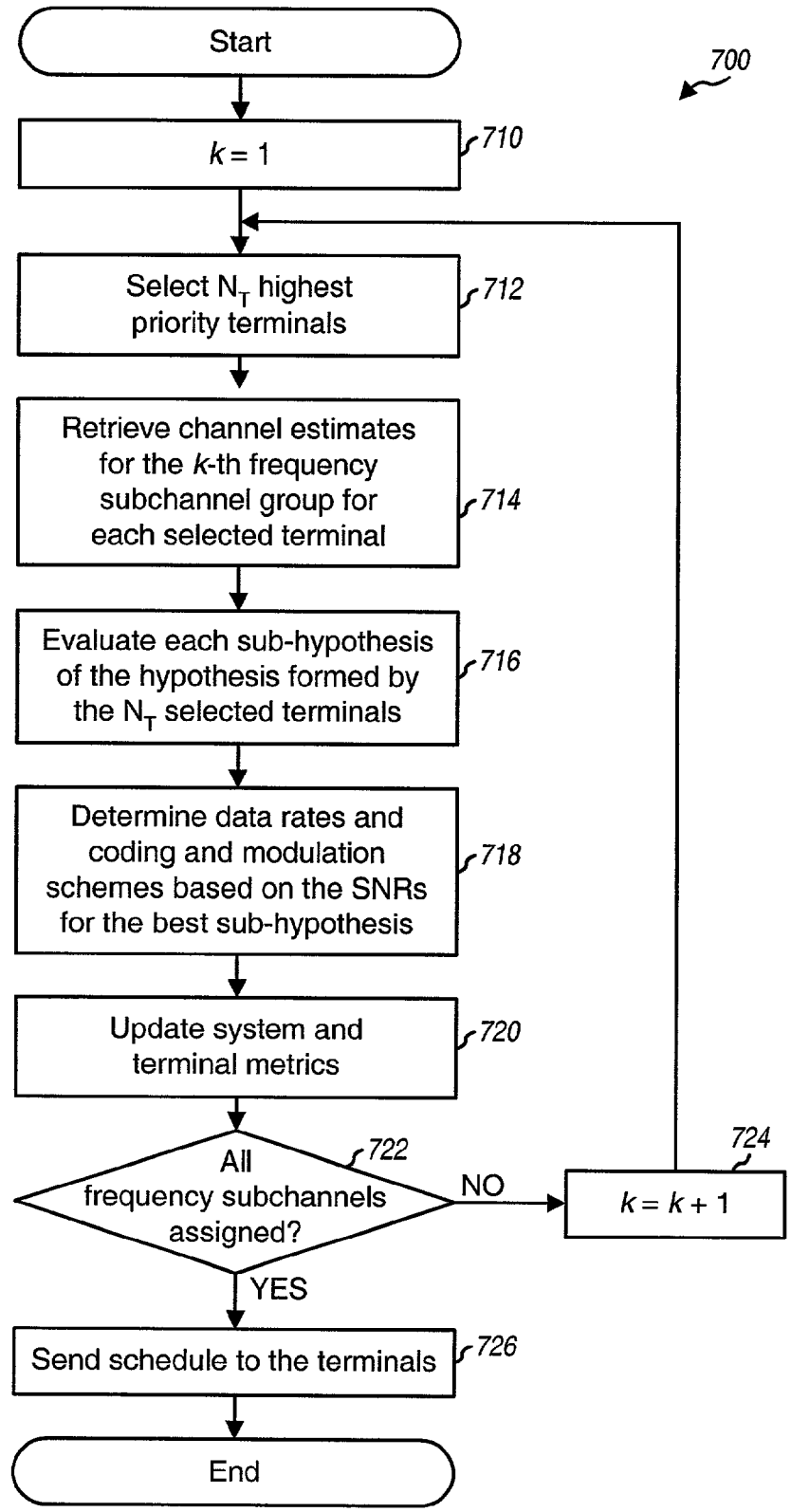
FIG. 7 is a flow diagram for a priority-based uplink scheduling scheme whereby a set of $N_T$ highest priority terminals is considered for scheduling.

FIG. 7 is a flow diagram for a priority-based uplink scheduling scheme 700 whereby a set of $N_T$ highest priority terminals is considered for scheduling for each frequency subchannel group. Initially, the first frequency subchannel group is considered by setting the frequency index k=1, at step 710. The spatial subchannels for the k-th frequency subchannel group are then assigned to the terminals for uplink transmission starting at step 712.

The scheduler examines the priority for all active terminals in the list and selects the set of $N_T$ highest priority terminals, at step 712. The remaining active terminals in the list are not considered for scheduling for this frequency subchannel group in this scheduling interval. The channel estimates for each selected terminal are retrieved and used to form the channel response matrix $\underline{H}(k)$, at step 714.

Each sub-hypothesis of the hypothesis formed by the $N_T$ selected terminals is then evaluated, and the corresponding vector of post-processed SNRs, $\underline{\gamma}_{hyp,order}(k)$, for each sub-hypothesis is derived, at step 716. The best sub-hypothesis is selected, and the data rates and the coding and modulation schemes for the terminals in the best sub-hypothesis are determined (e.g., based on their achieved SNRs), at step 718. The metrics of the active terminals in the list and the system metrics are then updated, at step 720.

A determination is then made whether or not all frequency subchannels have been assigned for uplink transmission, at step 722. If all frequency subchannels have not been assigned, then the next frequency subchannel group is considered by incrementing the index k (i.e., k=k+1), at step 724. The process then returns to step 712 to assign the spatial subchannels of this new frequency subchannel group to the same or a different set of terminals. Steps 712 through 724 are repeated for each frequency subchannel group to be assigned.

If all frequency subchannel groups have been assigned, at step 722, then a schedule indicative of the selected terminals and their assigned transmission channels and rates may be formed and communicated to these terminals, at step 726. The process then terminates for this scheduling interval.

The uplink scheduling of terminals based on priority is also described in U.S. patent application Ser. No. 09/859,346, entitled "Method and Apparatus for Allocating Uplink Resources in a Multiple-Input Multiple-Output (MIMO) Communication System," filed May 16, 2001, and U.S. Pat. No. 5,923,650, entitled "Method and Apparatus for Reverse Link Rate Scheduling," issued Jul. 13, 1999. These patent and patent application are assigned to the assignee of the present application and incorporated herein by reference.

The same target setpoint may be used for all data streams received at the base station. However, this common setpoint for all received data streams is not a requirement. Other uplink scheduling schemes that select terminals for data transmission, assign transmission channels to the selected terminals, and further select setpoints to be used for the assigned transmission channels may also be devised. A particular setpoint may be achieved for a data stream via a power control mechanism that direct the terminal to adjust its transmit power for the data stream such that the received SNR for the data stream is approximately equal to the setpoint.

Various uplink scheduling schemes may be devised with non-uniform setpoints for the data streams transmitted from the scheduled terminals. In one embodiment, higher setpoints may be used for higher priority terminals, and lower setpoints may be used for lower priority terminals. In another embodiment, the setpoints may be selected such that a desired data rate is achieved for each of the scheduled terminals. In yet another embodiment, the setpoints may be selected to achieve high system throughput, which may be possible by using higher setpoints for better transmission channels and lower setpoints for poor transmission channels. Other schemes to select different setpoints for different transmission channels to achieve the desired results may also be implemented, and this is within the scope of the invention.

Similar to the downlink, it is also not necessary to use all of the available transmission channels for uplink data transmission. In one embodiment, only transmission channels with achieved SNRs above a particular threshold SNR are selected for use, and transmission channels with achieved SNRs below this threshold SNR are not used.

For many of the uplink scheduling schemes described above, the successive cancellation receiver processing technique is used to process the received signals at the base station, which may provide improved SNRs and thus higher throughput. However, the uplink scheduling may also be performed without the use of successive cancellation receiver processing at the base station. For example, the base station may simply use spatial or space-time equalization to process the received signals to recover the transmitted signals. It can be shown that substantial gains may be achieved by exploiting the multi-user diversity environment and/or the frequency signatures of the terminals in scheduling uplink data transmission (i.e., without relying on successive cancellation receiver processing at the base station).

Other uplink scheduling schemes may also be implemented, and this is within the scope of the invention. For a FDM-TDM uplink scheduling scheme, one MIMO terminal may be assigned all of the spatial subchannels for each frequency subchannel group, and the frequency signatures of the terminals may be considered in the uplink scheduling to achieve high performance. For a SDMA-TDM uplink scheduling scheme, all frequency subchannels of each spatial subchannel may be assigned to a single terminal, which may be a SIMO or MIMO terminal.

Other Scheduling Considerations

For both the downlink and uplink, if partial-CSI (e.g., the post-processed SNR) is used to schedule terminals for data transmission, then a common coding and modulation scheme may be used for all transmission channels assigned to a given terminal, or a different coding and modulation scheme may be used for each assigned transmission channel. The use of a common coding and modulation scheme for all assigned transmission channels can simplify the processing at both the terminal and the base station. The scheduler may be designed to take this into consideration when scheduling terminals for data transmission on the available transmission channels. For example, it may be preferable to assign transmission channels having similar transmission capacities (e.g., similar SNRs) to the same terminal so that a common coding and modulation scheme may be used for the data transmission on the multiple transmission channels assigned to this terminal.

For both the downlink and uplink, the scheduling schemes can be designed to consider sets of terminals that have similar link margins. Terminals may be grouped according to their link margin properties. The scheduler may then consider combinations of terminals in the same "link margin" group when searching for mutually compatible spatial signatures. The grouping of terminals according to link margin may improve the overall spectral efficiency of the scheduling schemes compared to that achieved by ignoring link margins. Moreover, by scheduling terminals with similar link margins to transmit concurrently, power control may be more easily exercised (e.g., on the entire set of terminals) to improve overall spectral reuse. This may be viewed as a combination of adaptive reuse scheduling in combination with SDMA for SIMO/MIMO (which relies on spatial processing at the receiver to separate the multiple transmitted data streams) or MISO (which relies on beam-steering by the transmitter to separate the multiple transmitted data streams). Moreover, a scheduling scheme that evaluates the hybrid of these two (beams and margins) may also be implement, and this is within the scope of the invention.

Scheduling based on link margins and adaptive reuse are described in further detail in U.S. patent application Ser. No. 09/532,492, published as U.S. Patent Publication No. 2002-0154705, entitled "High Efficiency, High Performance Communications System Employing Multi-Carrier Modulation," and U.S. Patent Application Serial No. 09/848,937, published as U.S. Patent Publication No. 2003-0013451, entitled "Method and Apparatus for Controlling Uplink Transmissions of a Wireless Communication System," both assigned to the assignee of the present application and incorporated herein by reference.

For simplicity, various scheduling schemes have been described whereby (1) a set of $N_T$ terminals is selected for downlink or uplink transmission for a given frequency subchannel group (where a MIMO terminal may represent multiple ones of these $N_T$ terminals), with each terminal being assigned to one spatial subchannel, (2) the number of transmit antennas is equal to the number of receive antennas (i.e., $N_T = N_R$), and (3) one independent data stream is transmitted on each spatial subchannel of each frequency subchannel group. In this case, the number of data streams for each frequency subchannel group is equal to the number of spatial subchannels, and each of the $N_T$ terminals in the set is effectively assigned to a respective spatial subchannel.

For the downlink, each scheduled terminal may be equipped with more receive antennas than the total number of data streams. Moreover, multiple scheduled terminals may share a particular transmit antenna at the base station. The sharing may be achieved via time division multiplexing (e.g., assigning different fractions of a time slot to different terminals), frequency division multiplexing (e.g., assigning different frequency subchannels in each frequency subchannel group to different terminals), code division multiplexing (e.g., assigning different orthogonal codes to different terminals), some other multiplexing schemes, or any combination of the multiplexing schemes.

For the uplink, the scheduled terminals may also share a multiplexed array of receive antennas at the base station. In this case, the total number of transmit antennas for the scheduled terminals may be greater than the number of receive antennas at the base station, and the terminals may share the available transmission channels using another multiple-access technique (e.g., time, frequency, and/or code division multiplexing).

The scheduling schemes described herein select terminals and assign transmission channels to the selected terminals based on channel state information, which may comprise post-processed SNRs. The post-processed SNRs for the terminals are dependent on the particular transmit power level used for the data streams. For simplicity, the same transmit power level is assumed for all data streams (i.e., no power control of the transmit power).

However, by allocating different amounts of transmit power to different data streams and/or by controlling the transmit power for each data stream, the achievable SNRs may be adjusted. For the downlink, by decreasing the transmit power for a particular data stream via power control, the SNR associated with that data stream is reduced, the interference caused by this data stream on other data streams would also be reduced, and other data streams may be able to achieve better SNRs. For the uplink, by decreasing the transmit power of a particular terminal via power control, the SNR for this terminal is reduced, the interference due to this terminal would also be reduced, and other terminals may be able to achieve better SNRs. Power control of (and power allocation among) multiple terminals simultaneously sharing non-orthogonal spatial channels may be achieved by placing various constraints to ensure system stability, as described above. Thus, transmit power allocation and/or power control may also be used in conjunction with the scheduling schemes described herein, and this is within the scope of the invention.

The downlink and uplink scheduling schemes described herein may be designed to support a number of features. First, the scheduling schemes can support mixed mode operation whereby any combination of SIMO and MIMO terminals may be scheduled for data transmission over a "channel", which may be a time slot, a frequency band, a code channel, and so on. Second, the scheduling schemes provide a schedule for each scheduling interval that includes a set of "mutually compatible" terminals based on their spatial and frequency signatures. Mutual compatibility may be taken to mean co-existence of transmission on the same channel and at the same time given specific constraints regarding terminals' data rate requirements, transmit power, link margin, capability between SIMO and MIMO terminals, and possibly other factors. Third, the scheduling schemes support variable data rate adaptation based on the SNRs of the post-processed signals for the terminals. Each scheduled terminal is informed when to communicate, which data rate(s) to use (e.g., on a per data stream basis), and the particular mode (e.g., SIMO, MIMO).

MIMO-OFDM System

Figure 8A:
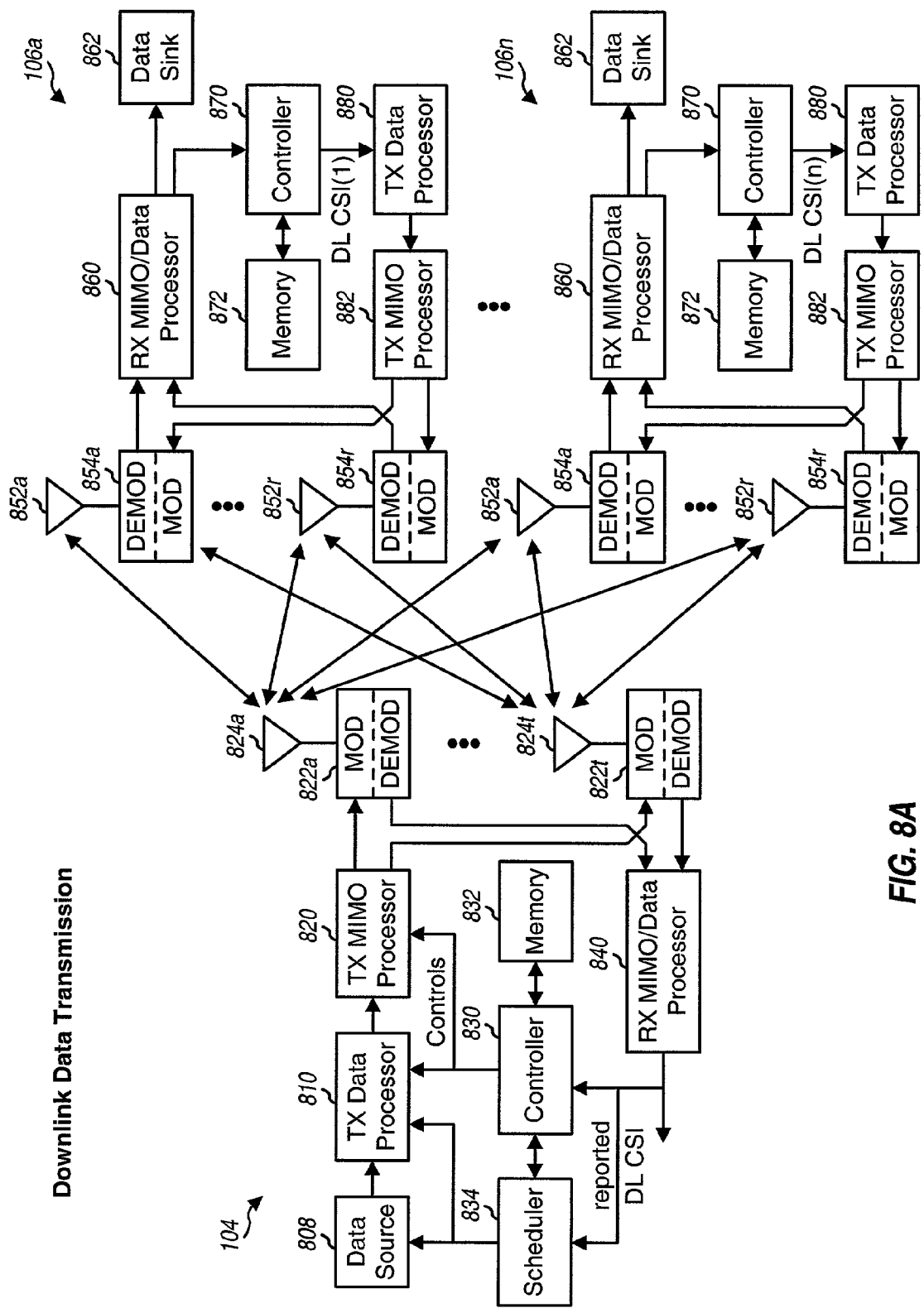
FIGS. 8A and 8B are block diagrams of a base station and two terminals for downlink and uplink data transmission, respectively.

FIG. 8A is a block diagram of a base station 104 and two terminals 106 within MIMO-OFDM system 100 for downlink data transmission. At base station 104, a data source 808 provides data (i.e., information bits) to a transmit (TX) data processor 810. For each independent data stream, TX data processor 810 (1) codes the data based on a particular coding scheme, (2) interleaves (i.e., reorders) the coded bits based on a particular interleaving scheme, and (3) maps the interleaved bits into modulation symbols for one or more transmission channels selected for use for that data stream. The coding increases the reliability of the data transmission. The interleaving provides time diversity for the coded bits, permits the data to be transmitted based on an average SNR for the transmission channels, combats fading, removes correlation between coded bits used to form each modulation symbol, and may further provide frequency diversity if the coded bits are transmitted over multiple frequency subchannels. The coding and modulation (i.e., symbol mapping) may be performed based on control signals provided by a controller 830.

A TX MIMO processor 820 receives and demultiplexes the modulation symbols from TX data processor 810 and provides a stream of symbol vectors for each transmit antenna used for data transmission, one symbol vector per symbol period. Each symbol vector includes up to $N_F$ modulation symbols for the $N_F$ frequency subchannels of the transmit antenna. TX MIMO processor 820 may further precondition the modulation symbols if full CSI processing is performed (e.g., if the channel response matrix $\underline{H}(k)$ is available). MIMO and full-CSI processing is described in further detail in the aforementioned U.S. patent application Ser. No. 09/993,087. Each symbol vector stream is then received and modulated by a respective modulator (MOD) 822 and transmitted via an associated antenna 824.

At each terminal 106 to which a data transmission is directed, antennas 852 receive the transmitted signals, and the received signal from each antenna is provided to a respective demodulator (DEMOD) 854. Each demodulator (or front-end unit) 854 performs processing complementary to that performed at modulator 822. The received modulation symbols from all demodulators 854 are then provided to a receive (RX) MIMO/data processor 860 and processed to recover one or more data streams transmitted to the terminal. RX MIMO/data processor 860 performs processing complementary to that performed by TX data processor 810 and TX MIMO processor 820 and provides decoded data to a data sink 862. The processing by terminal 106 is described in further detail below.

At each active terminal 106, RX MIMO/data processor 860 further estimates the channel conditions for the downlink and provides channel state information (CSI) indicative of the estimated channel conditions. The CSI may comprise post-processed SNRs, channel gain estimates, and so on. A controller 870 receives and may further transform the downlink CSI (DL CSI) into some other form (e.g., rate). The downlink CSI is processed (e.g., coded and symbol mapped) by a TX data processor 880, further processed by a TX MIMO processor 882, modulated by one or more modulators 854, and transmitted back to base station 104 via an uplink (or feedback) channel. The downlink CSI may be reported by the terminal using various signaling techniques, as described below.

At base station 104, the transmitted feedback signal is received by antennas 824, demodulated by demodulators 822, and processed by a RX MIMO/data processor 840 in a complementary manner to that performed by TX data processor 880 and TX MIMO processor 882. The reported downlink CSI is then provided to controller 830 and a scheduler 834.

Scheduler 834 uses the reported downlink CSI to perform a number of functions such as (1) selecting the best set of terminals for downlink data transmission and (2) assigning the available transmission channels to the selected terminals. Scheduler 834 or controller 830 may further use the reported downlink CSI to determine the coding and modulation scheme to be used for each data stream. Scheduler 834 may schedule terminals to achieve high throughput and/or based on some other performance criteria or metrics.

Figure 8B:
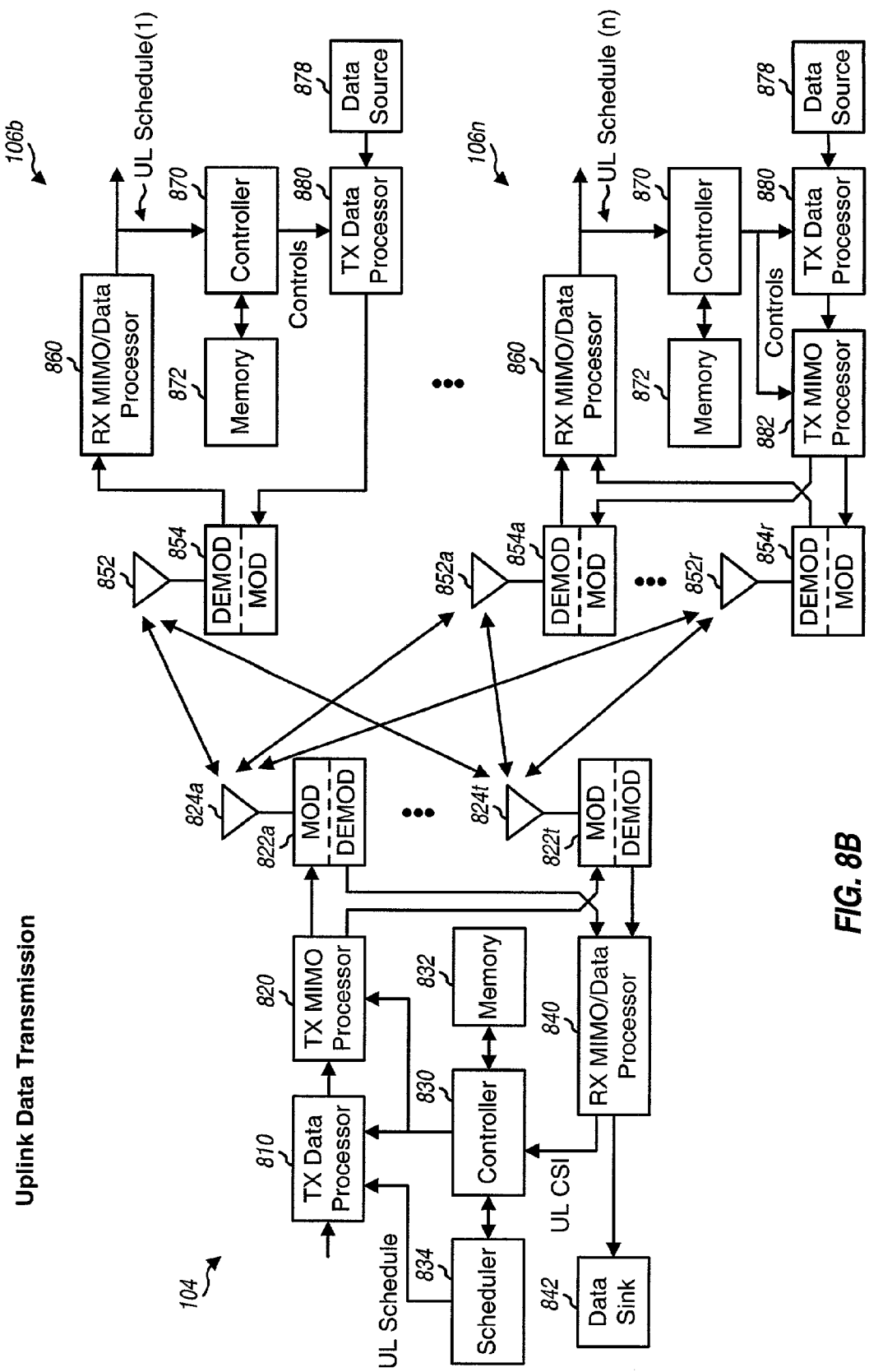

FIG. 8B is a block diagram of a base station 104 and two terminals 106 for uplink data transmission. At each terminal scheduled for data transmission on the uplink, a data source 878 provides data to TX data processor 880, which codes, interleaves, and maps the data into modulation symbols. If multiple transmit antennas are used for uplink data transmission, TX MIMO processor 882 receives and further processes the modulation symbols to provide a stream of modulation symbol vectors for each antenna used for data transmission. Each symbol vector stream is then received and modulated by a respective modulator 854 and transmitted via an associated antenna 852.

At base station 104, antennas 824 receive the transmitted signals, and the received signal from each antenna is provided to a respective demodulator 822. Each demodulator 822 performs processing complementary to that performed at modulator 854. The modulation symbols from all demodulators 822 are then provided to RX MIMO/data processor 840 and processed to recover the data streams transmitted by the scheduled terminals. RX MIMO/data processor 840 performs processing complementary to that performed by TX data processor 880 and TX MIMO processor 882 and provides decoded data to a data sink 842.

For each terminal 106 desiring to transmit data on the uplink during an upcoming scheduling interval (or only the $N_T$ or $N_X$ highest priority terminals), RX MIMO/data processor 840 further estimates the channel conditions for the uplink and derives uplink CSI (UL CSI), which is provided to controller 830. Scheduler 834 may also receive and use the uplink CSI to perform a number of functions such as (1) selecting the best set of terminals for data transmission on the uplink, (2) determining a particular processing order for the data streams from the selected terminals, and (3) determining the rate to be used for each data stream. For each scheduling interval, scheduler 834 provides an uplink schedule that indicates which terminal(s) have been selected for data transmission and their assigned transmission channels and rates. The rate for each data stream may include the date rate and coding and modulation scheme to be used for the data stream.

TX data processor 810 receives and processes the uplink schedule, and provides processed data indicative of the schedule to one or more modulators 822. Modulator(s) 822 further condition the processed data and transmit the uplink schedule to the terminals via the wireless link. The uplink schedule may be sent to the terminal using various signaling and messaging techniques.

At each active terminal 106, the transmitted signals are received by antennas 852, demodulated by demodulators 854, and provided to RX MIMO/data processor 860. Processor 860 performs processing complementary to that performed by TX MIMO processor 820 and TX data processor 810 and recovers the uplink schedule for that terminal (if any), which is then provided to controller 870 and used to control the uplink transmission by the terminal.

In FIGS. 8A and 8B, scheduler 834 is shown as being implemented within base station 104. In other implementations, scheduler 834 may be implemented within some other element of MIMO-OFDM system 100 (e.g., a base station controller that couples to and interacts with a number of base stations).

Figure 9:
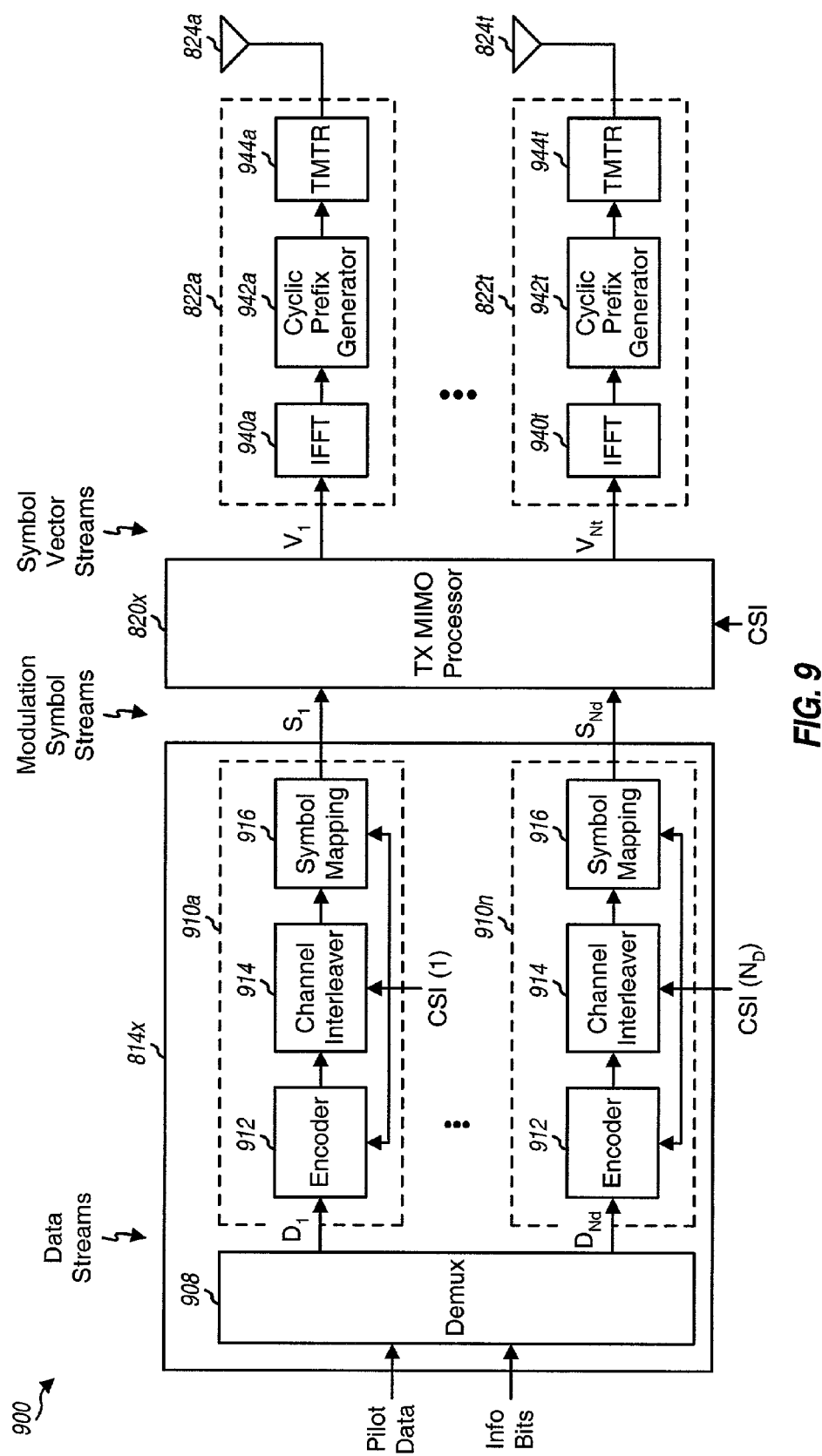
FIG. 9 is a block diagram of an embodiment of a transmitter unit.

FIG. 9 is a block diagram of an embodiment of a transmitter unit 900. For clarity, transmitter unit 900 is described as being the transmitter portion of base station 104 in FIGS. 8A and 8B. However, transmitter unit 900 may also be used for the transmitter portion of each terminal for uplink transmissions.

Transmitter unit 900 is capable of processing multiple data streams for one or more terminals based on the available CSI (e.g., as reported by the terminals). Transmitter unit 900 includes (1) a TX data processor 814x that receives and processes information bits to provide modulation symbols and (2) a TX MIMO processor 820x that demultiplexes the modulation symbols for the $N_T$ transmit antennas.

In the specific embodiment shown in FIG. 9, TX data processor 814x includes a demultiplexer 908 coupled to a number of channel data processors 910, one processor for each of $N_D$ independent data streams to be transmitted to the terminal(s). Demultiplexer 908 receives and demultiplexes the aggregate information bits into $N_D$ data streams, each of which may be transmitted over one or more transmission channels. Each data stream is provided to a respective channel data processor 910.

In the embodiment shown in FIG. 9, each channel data processor 910 includes an encoder 912, a channel interleaver 914, and a symbol mapping element 916. Encoder 912 codes the information bits in the received data stream based on a particular coding scheme to provide coded bits. Channel interleaver 914 interleaves the coded bits based on a particular interleaving scheme to provide diversity. And symbol mapping element 916 maps the interleaved bits into modulation symbols for the one or more transmission channels used for transmitting the data stream.

Pilot data (e.g., data of known pattern) may also be coded and multiplexed with the processed information bits. The processed pilot data may be transmitted (e.g., in a time division multiplexed (TDM) or code division multiplexed (CDM) manner) in all or a subset of the transmission channels used to transmit the information bits. The pilot data may be used at the receiver systems to perform channel estimation.

As shown in FIG. 9, the data coding, interleaving, and modulation (or a combination thereof) may be adjusted based on the available CSI (e.g., as reported by the receiver systems). In one coding and modulation scheme, adaptive coding is achieved by using a fixed base code (e.g., a rate ⅓ Turbo code) and adjusting the puncturing to achieve the desired code rate, as supported by the SNRs of the transmission channels used to transmit the data. For this scheme, the puncturing may be performed after the channel interleaving. In another coding and modulation scheme, different coding schemes may be used based on the reported CSI. For example, each of the data streams may be coded with an independent code. With this scheme, the successive cancellation receiver processing technique may be used at the receivers to detect and decode the data streams to derive a more reliable estimate of the transmitted data streams, as described in further detail below.

Symbol mapping element 916 can be designed to group sets of interleaved bits to form non-binary symbols, and to map each non-binary symbol to a point in a signal constellation corresponding to a particular modulation scheme (e.g., QPSK, M-PSK, M-QAM, or some other scheme) selected for the data stream. Each mapped signal point corresponds to a modulation symbol. The number of information bits that may be transmitted for each modulation symbol for a particular level of performance (e.g., one percent PER) is dependent on the SNRs of the transmission channels used to transmit the data stream. Thus, the coding and modulation scheme for each data stream may be selected based on the available CSI. The channel interleaving may also be adjusted based on the available CSI.

The modulation symbols from TX data processor 814x are provided to TX MIMO processor 820x. TX MIMO processor 820x receives $N_D$ modulation symbol streams from $N_D$ channel data processors 910 and demultiplexes the received modulation symbols into $N_T$ symbol vector streams, $V_1$ through $V_{N_T}$, one symbol vector stream for each antenna used to transmit data. Each symbol vector stream is provided to a respective modulator 822. In the embodiment shown in FIG. 9, each modulator 822 includes an inverse fast Fourier transform (IFFT) processor 940, a cyclic prefix generator 942, and a transmitter (TMTR) 944.

IFFT processor 940 converts each received symbol vector into its time-domain representation (which is referred to as an OFDM symbol) using the IFFT. IFFT processor 940 can be designed to perform the IFFT on any number of frequency subchannels (e.g., 8, 16, 32, . . . , $N_F$, . . . ). In an embodiment, for each symbol vector converted to an OFDM symbol, cyclic prefix generator 942 repeats a portion of the time-domain representation of the OFDM symbol to form a "transmission symbol" for a specific transmit antenna. The cyclic prefix ensures that the transmission symbol retains its orthogonal properties in the presence of multipath delay spread, thereby improving performance against deleterious path effects. The implementation of IFFT processor 940 and cyclic prefix generator 942 is known in the art and not described in detail herein.

Transmitter 944 then converts the time-domain transmission symbols from an associated cyclic prefix generator 942 into an analog signal, and further amplifies, filters, quadrature modulates, and upconverts the analog signal to provide a modulated signal suitable for transmission over the wireless link. The modulated signals from transmitters 944 are then transmitted from antennas 824 to the terminals.

An example MIMO-OFDM system is described in the aforementioned U.S. patent application Ser. No. 09/532,492. OFDM modulation is also described in a paper entitled "Multicarrier Modulation for Data Transmission: An Idea Whose Time Has Come," by John A. C. Bingham, IEEE Communications Magazine, May 1990, which is incorporated herein by reference.

FIG. 9 shows an example coding and modulation scheme that may be used with full or partial CSI to provide improved performance (e.g., high throughput). Some other coding and modulation schemes are described in further detail in the aforementioned U.S. patent application Ser. Nos. 09/854,235, issued as U.S. Pat. No. 6,785,341 09/826,481, issued as U.S. Pat. No. 6,771,706, and 09/956,449, published as U.S. Patent Publication No. 2003-0003880, and in U.S patent application Ser. No. 09/776,075, published as U.S. Patent Publication No. 2003-0043928, entitled "Coding Scheme for a Wireless Communication System," which is assigned to the assignee of the present application and incorporated herein by reference. Still other coding and modulation schemes may also be used, and this is within the scope of the invention.

Figure 10A:
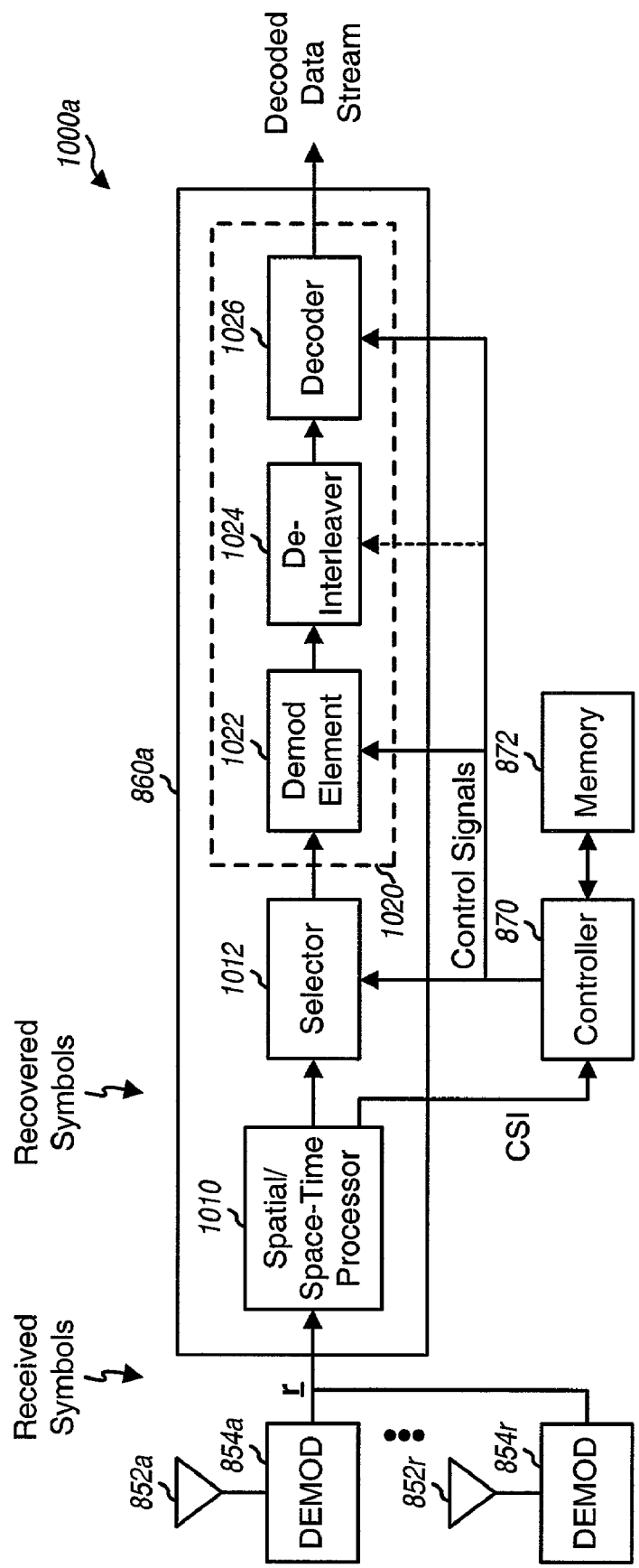
FIGS. 10A and 10B are block diagrams of two embodiments of a receiver unit without and with successive cancellation receiver processing, respectively.

FIG. 10A is a block diagram of an embodiment of a receiver unit 1000a. For clarity, receiver unit 1000a is described as being the receiver portion of one terminal 106 in FIGS. 8A and 8B. However, receiver unit 1000a may also be used for the receiver portion of base station 104 for uplink transmissions.

The transmitted signals from $N_T$ transmit antennas are received by each of $N_R$ antennas 852a through 852r, and the received signal from each antenna is routed to a respective demodulator 854 (which is also referred to as a front-end processor). Each demodulator 854 conditions (e.g., filters and amplifies) a respective received signal, downconverts the conditioned signal to an intermediate frequency or baseband, and digitizes the downconverted signal to provide data samples. Each demodulator 854 may further demodulate the data samples with a recovered pilot.

Each demodulator 854 also performs processing complementary to that performed by modulator 822 shown in FIG. 9. For OFDM, each demodulator 854 includes an FFT processor and a demultiplexer (both of which are not shown in FIG. 10A for simplicity). The FFT processor generates transformed representations of the data samples and provides a stream of symbol vectors. Each symbol vector includes $N_F$ symbols received for $N_F$ frequency subchannels, and one vector is provided for each symbol period. The $N_R$ symbol vector streams from the FFT processors of all $N_R$ demodulators are then provided to the demultiplexer, which demultiplexes each symbol vector stream into $N_G$ received symbol vector streams for the $N_G$ frequency subchannel groups. Each received symbol vector includes $N_k$ received symbols for the $N_k$ frequency subchannels in the k-th frequency subchannel group, where $1 \leq N_k \leq N_F$. The demultiplexer may then provide up to $N_G \cdot N_R$ received symbol vector streams for the $N_G$ frequency subchannel groups in the $N_R$ received signals.

Within a RX MIMO/data processor 860a, a spatial/space-time processor 1010 is used to perform MIMO processing for the received symbols for each frequency subchannel group used for data transmission. One spatial/space-time processor may be used to perform the MIMO processing for each frequency subchannel group, or one spatial/space-time processor may be used to perform the MIMO processing for all frequency subchannel groups (e.g., in a time division multiplexed manner).

Spatial/space-time processor 1010 may be designed to perform spatial processing or space-time processing on the received symbols to provide estimates of the transmitted modulation symbols. Spatial processing may be used fix a non-dispersive channel (i.e., a flat fading channel) to null out the undesired signals and/or to maximize the received SNR of each of the constituent signals in the presence of noise and interference from the other signals. The spatial processing may be performed based on a channel correlation matrix inversion (CCMI) technique, a minimum mean square error (MMSE) technique, a full-CSI technique, or some other technique. Space-time processing may be used for a dispersive channel (i.e., a frequency selective fading channel) to ameliorate both "crosstalk" from the other transmitted signals as well as inter-symbol interference (ISI) from all of the transmitted signals due to dispersion in the channel. The space-time processing may be performed based on a MMSE linear equalizer (MMSE-LE), a decision feedback equalizer (DFE), a maximum-likelihood sequence estimator (MLSE), or some other technique. Spatial and space-time processing is described in further detail in the aforementioned U.S. patent application Ser. No. 09/993,087, published as U.S. Patent Publication No. 2003-0125040.

For a particular frequency subchannel group, spatial/space-time processor 1010 receives and processes $N_R$ received symbol vector streams and provides $N_T$ recovered symbol vector streams. Each recovered symbol vector includes up to $N_k$ recovered symbols that are estimates of the $N_k$ modulation symbols transmitted on the $N_k$ frequency subchannels of the k-th frequency subchannel group in one symbol period. Spatial/space-time processor 1010 may further estimate the post-processed SNR for each received data stream. The SNR estimate may be derived as described in the aforementioned U.S. patent application Ser. Nos. 09/956,449, published as U.S. Patent Publication No. 2003-0003880, 09/854,235, issued as U.S. Pat. No. 6,785,341, and 09/993,087, published as U.S. Patent Publication No. 2003-0125040.

A selector 1012 receives the $N_T$ recovered symbol vector streams from spatial/space-time processor 1010 and extracts the recovered symbols corresponding to the one or more data streams to be recovered. Alternatively, the desired recovered symbols are extracted within spatial/space-time processor 1010. In any case, the desired recovered symbols are extracted and provided to a RX data processor 1020.

Within RX data processor 1020, a demodulation element 1022 demodulates each recovered symbol in accordance with a demodulation scheme (e.g., M-PSK, M-QAM) used for that symbol at the transmitter unit. The demodulated data is then de-interleaved by a de-interleaver 1024 and the de-interleaved data is further decoded by a decoder 1026. The demodulation, deinterleaving, and decoding are performed in a complementary manner to the modulation, interleaving, and coding performed at the transmitter unit. For example, a Turbo decoder or a Viterbi decoder may be used for decoder 1026 if Turbo or convolutional coding, respectively, is performed at the transmitter unit. The decoded data stream from decoder 1026 represents an estimate of the transmitted data stream.

Figure 10B:
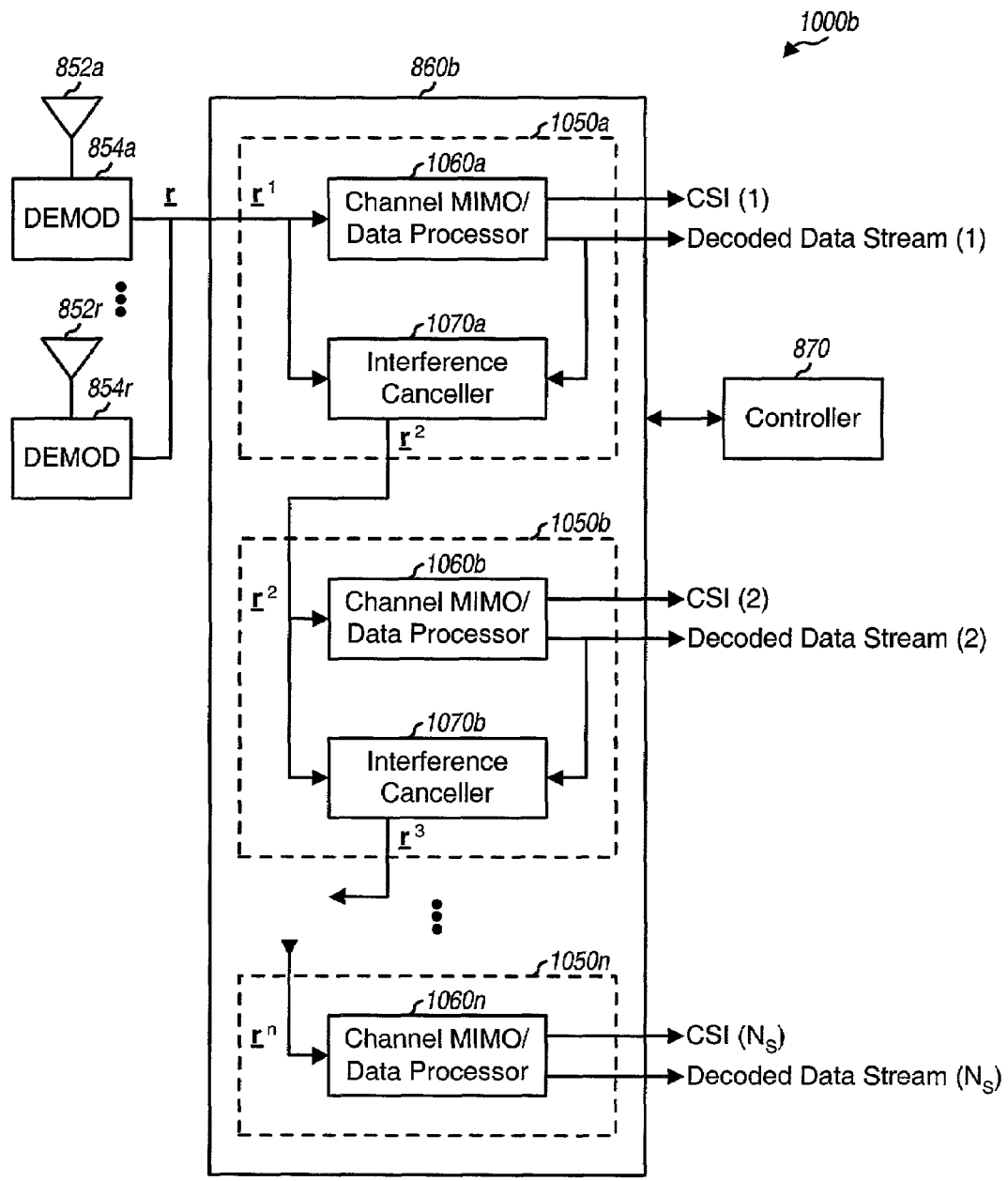

FIG. 10B is a block diagram of a receiver unit 1000b capable of implementing the successive cancellation receiver processing technique. Receiver unit 1000b may also be used for the receiver portion of base station 104 or terminal 106. The transmitted signals are received by each of $N_R$ antennas 852, and the received signal from each antenna is routed to a respective demodulator 854. Each demodulator 854 processes a respective received signal and provides a stream of received symbols to a RX MIMO/data processor 860b. RX MIMO/data processor 860b may be used to process the $N_R$ received symbol vector streams from the $N_R$ receive antennas for each frequency subchannel group used for data transmission, where each received symbol vector includes $N_k$ received symbols for the $N_k$ frequency subchannels in the k-th frequency subchannel group.

In the embodiment shown in FIG. 10B, RX MIMO/data processor 860b includes a number of successive (i.e., cascaded) receiver processing stages 1050, one stage for each of the transmitted signals to be recovered. In one transmit processing scheme, one independent data stream is transmitted on each spatial subchannel of each frequency subchannel group. For this transmit processing scheme, the number of data streams for each frequency subchannel group is equal to the number of transmitted signals, which is also equal to the number of transmit antennas used for data transmission (which may be all or a subset of the available transmit antennas). For clarity, RX MIMO/data processor 860b is described for this transmit processing scheme.

Each receiver processing stage 1050 (except for the last stage 1050n) includes a channel MIMO/data processor 1060 coupled to an interference canceller 1070, and the last stage 1050n includes only channel MIMO/data processor 1060n. For the first receiver processing stage 1050a, channel MIMO/data processor 1060a receives and processes the $N_R$ received symbol vector streams from demodulators 854a through 854r to provide a decoded data stream for the first transmitted signal. And for each of the second through last stages 1050b through 1050n, the channel MIMO/data processor 1060 for that stage receives and processes the $N_R$ modified symbol vector streams from the interference canceller 1070 in the preceding stage to derive a decoded data stream for the transmitted signal being recovered by that stage. Each channel MIMO/data processor 1060 further provides CSI (e.g., the SNR) for the associated transmission channel.

For the first receiver processing stage 1050a, interference canceller 1070a receives the $N_R$ received symbol vector streams from all $N_R$ demodulators 854. And for each of the second through second-to-last stages, interference canceller 1070 receives the $N_R$ modified symbol vector streams from the interference canceller in the preceding stage. Each interference canceller 1070 also receives the decoded data stream from the channel MIMO/data processor 1060 within the same stage, and performs the processing (e.g., coding, interleaving, and modulation) to derive $N_T$ remodulated symbol vector streams that are estimates of the $N_T$ transmitted modulation symbol vector streams for the frequency subchannel group.

The $N_T$ remodulated symbol vector streams (for the n-th iteration) are further processed with the estimated channel response to provide estimates, $\hat{i}^n$, of the interference due to the decoded data stream. The estimates $\hat{i}^n$ include $N_R$ vectors, with each vector being an estimate of a component in one of the $N_R$ received signals due to the decoded data stream. These components are interference to the remaining (not yet detected) transmitted signals included in the $N_R$ received signals. Thus, the interference estimates, $\hat{i}^n$, are subtracted (i.e., canceled) from the received symbol vector streams, $\underline{r}^n$, to provide $N_R$ modified symbol vector streams, $\underline{r}^{n+1}$, having the components from the decoded data stream removed. The modified symbol vector streams, $\underline{r}^{n+1}$, are provided to the next receiver processing stage, as shown in FIG. 10B. Each interference canceller 1070 thus provides $N_R$ modified symbol vector streams that include all but the cancelled interference components. Controller 870 may be used to direct various steps in the successive cancellation receiver processing.

The successive cancellation receiver processing technique is described in further detail in the aforementioned U.S patent application Ser. Nos. 09/854,235, issued as U.S. Pat. No. 6,785,341, and 09/993,087, published as U.S. Patent Publication No. 2003-0125040, and by P. W. Wolniansky et al. in a paper entitled "V-BLAST: An Architecture for Achieving Very High Data Rates over the Rich-Scattering Wireless Channel," Proc. ISSSE-98, Pisa, Italy, which is incorporated herein by reference.

FIG. 10B shows a receiver structure that may be used in a straightforward manner when one independent data stream is transmitted over each transmit antenna of each frequency subchannel group. In this case, each receiver processing stage 1050 may be operated to recover one of the transmitted data streams and to provide the decoded data stream corresponding to the recovered data stream.

For some other transmit processing schemes, a data stream may be transmitted over multiple transmit antennas, frequency subchannels, and/or time intervals to provide spatial, frequency, and/or time diversity, respectively. For these schemes, the receiver processing initially derives a received symbol stream for each transmit antenna of each frequency subchannel. Modulation symbols for multiple transmit antennas, frequency subchannels, and/or time intervals may then be combined in a complementary manner as the demultiplexing performed at the transmitter unit. The stream of combined symbols is then processed to recover the transmitted data stream.

For simplicity, the receiver architecture shown in FIG. 10B provides the (received or modified) symbol vector streams to each receiver processing stage 1050, and these streams have the interference components due to previously decoded data streams removed (i.e., canceled). In the embodiment shown in FIG. 10B, each stage removes the interference components due to the data stream decoded by that stage. In some other designs, the received symbol vector streams may be provided to all stages, and each stage may perform the cancellation of interference components from all previously decoded data streams (which may be provided from preceding stages). The interference cancellation may also be skipped for one or more stages (e.g., if the SNR for the data stream is high). Various modifications to the receiver architecture shown in FIG. 10B may be made and are within the scope of the invention.

FIGS. 10A and 10B represent two embodiments of a receiver unit capable of processing a data transmission, determining the characteristics of the transmission channels (e.g., the post-processed SNR), and reporting CSI back to the transmitter unit. Other designs based on the techniques presented herein and other receiver processing techniques may also be contemplated and are within the scope of the invention.

Channel State Information (CSI)

The CSI used to select the proper data rate and the coding and modulation scheme for each independent data stream may comprise any type of information that is indicative of the characteristics of the communication link. The CSI may be categorized as either "full CSI" or "partial CSI". Various types of information may be provided as full or partial CSI, and some examples are described below.

In one embodiment, the partial CSI comprises SNR, which may be derived as the ratio of the signal power over the noise-and-interference power. The SNR is typically estimated and provided for each transmission channel used for data transmission (e.g., each transmit data stream), although an aggregate SNR may also be provided for a number of transmission channels. The SNR estimate may be quantized to a value having a particular number of bits. In one embodiment, the SNR estimate is mapped to an SNR index, e.g., using a look-up table.

In another embodiment, the partial CSI comprises signal power and noise-and-interference power. These two components may be separately derived and provided for each transmission channel or each set of transmission channels used for data transmission.

In yet another embodiment, the partial CSI comprises signal power, noise power, and interference power. These three components may be derived and provided for each transmission channel or a set of transmission channels used for data transmission.

In yet another embodiment, the partial CSI comprises signal-to-noise ratio and a list of interference powers for observable interference terms. This information may be derived and provided for each transmission channel or each set of transmission channels used for data transmission.

In yet another embodiment, the partial CSI comprises signal components in a matrix form (e.g., $N_R \times N_T$ complex entries for all transmit-receive antenna pairs) and the noise-and-interference components in matrix form (e.g., $N_R \times N_T$ complex entries). The transmitter unit may then properly combine the signal components and the noise-and-interference components for the appropriate transmit-receive antenna pairs to derive the quality of each transmission channel used for data transmission (e.g., the post-processed SNR for each transmitted data stream, as received at the receiver unit).

In yet another embodiment, the partial CSI comprises a data rate indicator for each transmit data stream. The quality of the transmission channels to be used for data transmission may be determined initially (e.g., based on the SNR estimated for the transmission channel) and a data rate corresponding to the determined channel quality may then be identified (e.g., based on a look-up table) for each transmission channel or each group of transmission channels. The identified data rate is indicative of the maximum data rate that may be transmitted on the transmission channel for the required level of performance. The data rate may be mapped to and represented by a data rate indicator (DRI), which may be efficiently coded. For example, if (up to) seven possible data rates are supported by the transmitter unit for each transmit antenna, then a 3-bit value may be used to represent the DRI where, e.g., a zero may indicate a data rate of zero (i.e., don't use the transmit antenna) and 1 through 7 may be used to indicate seven different data rates. In a typical implementation, the channel quality measurements (e.g., the SNR estimates) are mapped directly to the DRI based on, e.g., a look-up table.

In yet another embodiment, the partial CSI comprises a rate to be used at the transmitter unit for each data stream. In this embodiment, the rate may identify the particular coding and modulation scheme to be used for the data stream such that the desired level of performance is achieved.

In yet another embodiment, the partial CSI comprises a differential indicator for a particular measure of quality for a transmission channel. Initially, the SNR or DRI or some other quality measurement for the transmission channel is determined and reported as a reference measurement value. Thereafter, monitoring of the quality of the link continues, and the difference between the last reported measurement and the current measurement is determined. The difference may then be quantized to one or more bits, and the quantized difference is mapped to and represented by the differential indicator, which is then reported. The differential indicator may indicate an increase or decrease to the last reported measurement by a particular step size (or to maintain the last reported measurement). For example, the differential indicator may indicate that (1) the observed SNR for a particular transmission channel has increased or decreased by a particular step size, or (2) the data rate should be adjusted by a particular amount, or some other change. The reference measurement may be transmitted periodically to ensure that errors in the differential indicators and/or erroneous reception of these indicators do not accumulate.

Full CSI includes sufficient characterization (e.g., the complex gain) across the entire system bandwidth (i.e., each frequency subchannel) for the propagation path between each transmit-receive antenna pair in the $N_R \times N_T$ channel response matrix $\underline{H}(k)$.

In one embodiment, the full CSI comprises eigenmodes plus any other information that is indicative of, or equivalent to, SNR. For example, the SNR-related information may be a data rate indication per eigenmode, an indication of the coding and modulation scheme to be used per eigenmode, the signal and interference power per eigenmode, the signal to interference ratio per eigenmode, and so on. The information described above for the partial CSI may also be provided as the SNR related information.

In another embodiment, the full CSI comprises a matrix $\underline{A} = \underline{H}^H \underline{H}$. This matrix $\underline{A}$ is sufficient to determine the eigenmodes and eigenvalues of the channel, and may be a more efficient representation of the channel (e.g., fewer bits may be required to transmit the full CSI for this representation).

Differential update techniques may also be used for all of the full CSI data types. For example, differential updates to the full CSI characterization may be sent periodically, when the channel changes by some amount, and so on.

Other forms of full or partial CSI may also be used and are within the scope of the invention. In general, the full or partial CSI includes sufficient information in whatever form that may be used to adjust the processing at the transmitter unit such that the desired level of performance is achieved for the transmitted data streams.

Deriving and Reporting CSI

The CSI may be derived based on the signals transmitted by the transmitter unit and received at the receiver unit. In an embodiment, the CSI is derived based on a pilot included in the transmitted signals. Alternatively or additionally, the CSI may be derived based on the data included in the transmitted signals.

In yet another embodiment, the CSI comprises one or more signals transmitted on the reverse link from the receiver unit to the transmitter unit. In some systems, a degree of correlation may exist between the downlink and uplink (e.g. for time division duplexed (TDD) systems, where the uplink and downlink share the same system bandwidth in a time division multiplexed manner). In these systems, the quality of the downlink may be estimated (to a requisite degree of accuracy) based on the quality of the uplink, which may be estimated based on signals (e.g., pilot signals) transmitted from the receiver unit. The pilot signals transmitted on the uplink would then represent a means by which the transmitter unit could estimate the CSI as observed at the receiver unit. In TDD systems, the transmitter unit can derive the channel response matrix $\underline{H}(k)$ (e.g., based on the pilot transmitted on the uplink), account for differences between the transmit and receive array manifolds, and receive an estimate of the noise variance at the receiver unit. The array manifold deltas may be resolved by a periodic calibration procedure that may involve feedback between the receiver unit and transmitter unit.

The signal quality may be estimated at the receiver unit based on various techniques. Some of these techniques are described in the following patents, which are assigned to the assignee of the present application and incorporated herein by reference:

U.S. Pat. No. 5,799,005, entitled "System and Method for Determining Received Pilot Power and Path Loss in a CDMA Communication System," issued Aug. 25, 1998;

U.S. Pat. No. 5,903,554, entitled "Method and Apparatus for Measuring Link Quality in a Spread Spectrum Communication System," issued May 11, 1999;

U.S. Pat. Nos. 5,056,109, and 5,265,119, both entitled "Method and Apparatus for Controlling Transmission Power in a CDMA Cellular Mobile Telephone System," respectively issued Oct. 8, 1991 and Nov. 23, 1993; and U.S. Pat. No. 6,097,972, entitled "Method and Apparatus for Processing Power Control Signals in CDMA Mobile Telephone System," issued Aug. 1, 2000.

The CSI may be reported back to the transmitter unit using various CSI transmission schemes. For example, the CSI may be sent in full, differentially, or a combination thereof. In one embodiment, full or partial CSI is reported periodically, and differential updates are sent based on the prior transmitted CSI. As an example for full CSI, the updates may be corrections (based on an error signal) to the reported eigenmodes. The eigenvalues typically do not change as rapidly as the eigenmodes, so these may be updated at a lower rate. In another embodiment, the CSI is sent only when there is a change (e.g., if the change exceeds a particular threshold), which may lower the effective rate of the feedback channel. As an example for partial CSI, the SNRs may be sent back (e.g., differentially) only when they change. For an OFDM system, correlation in the frequency domain may be exploited to permit reduction in the amount of CSI to be fed back. As an example for an OFDM system using partial CSI, if the SNR corresponding to a particular spatial subchannel for $N_M$ frequency subchannels is similar, the SNR and the first and last frequency subchannels for which this condition is true may be reported. Other compression and feedback channel error recovery techniques to reduce the amount of data to be fed back for CSI may also be used and are within the scope of the invention.

Various types of information for CSI and various CSI reporting mechanisms are also described in U.S patent application Ser. No. 08/963,386, issued as U.S. Pat. No. 6,574,211, entitled "Method and Apparatus for High Rate Packet Data Transmission," assigned to the assignee of the present application, and in "TIE/EIA/IS-856 cdma2000 High Rate Packet Data Air Interface Specification", both of which are incorporated herein by reference.

For clarity, various aspects and embodiments of the resource allocation have been described specifically for the downlink and uplink. Various techniques described herein may also be used to allocate resources in "ad hoc" or peer-to-peer networks, and this is within the scope of the invention.

The MIMO-OFDM system described herein may also be designed to implement any number of standards and designs for CDMA, TDMA, FDMA, and other multiple access techniques. The CDMA standards include the IS-95, cdma2000, and W-CDMA standards, and the TDMA standards include the Global System for Mobile Communications (GSM) standard. These standards are known in the art and incorporated herein by reference.

The elements of the base station and terminals may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. Some of the functions and processing described herein may also be implemented with software executed on a processor.

Certain aspects of the invention may be implemented with a combination of software and hardware. For example, the processing to schedule terminals for downlink and/or uplink data transmission may be performed based on program codes executed on a processor (scheduler 834 in FIG. 8).

Headings are included herein for reference and to aid in locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for scheduling data transmission for a plurality of terminals in a wireless communication system, comprising:

forming at least one set of terminals for possible data transmission for each of a plurality of frequency bands, wherein each set includes one or more terminals and corresponds to a hypothesis to be evaluated;

evaluating the performance of each hypothesis;

selecting one hypothesis for each frequency band based on the evaluated performance; and selecting and scheduling the one or more terminals in each selected hypothesis for data transmission on the corresponding frequency band.

2. The method of claim 1, wherein each frequency band corresponds to a respective group of one or more frequency subchannels.

3. The method of claim 1, wherein the plurality of terminals are scheduled for downlink data transmission.

4. The method of claim 3, further comprising:

forming one or more sub-hypotheses for each hypothesis, wherein each sub-hypothesis corresponds to specific assignments of a plurality of transmit antennas to the one or more terminals in the hypothesis, and wherein the performance of each sub-hypothesis is evaluated and one sub-hypothesis is selected for each frequency band based on the evaluated performance.

5. The method of claim 3, further comprising:

assigning a plurality of transmit antennas to the one or more terminals in each hypothesis, and wherein the performance of each hypothesis is evaluated based in part on the antenna assignments for the hypothesis.

6. The method of claim 5, wherein the assigning for each hypothesis includes identifying a transmit antenna and terminal pair with a best metric among all unassigned transmit antennas, assigning the transmit antenna in the pair to the terminal in the pair, and removing the assigned transmit antenna and terminal from consideration for the hypothesis.

7. The method of claim 5, wherein the plurality of transmit antennas are assigned to the one or more terminals in each hypothesis based on a priority of each terminal.

8. The method of claim 7, wherein the highest priority terminal in each hypothesis is assigned a transmit antenna associated with a highest throughput, and the lowest priority terminal in the hypothesis is assigned a transmit antenna associated with a lowest throughput.

9. The method of claim 3, further comprising:
forming a channel response matrix for a plurality of terminals in a particular hypothesis, and wherein the performance of the hypothesis is evaluated based on the channel response matrix.

10. The method of claim 9, wherein the evaluating includes
deriving a matrix of steering vectors to be used to generate a plurality of beams for the plurality of terminals in the particular hypothesis.

11. The method of claim 10, further comprising:
deriving a scaling matrix to be used to adjust transmit power for each terminal in the particular hypothesis.

12. The method of claim 1, wherein th plurality of terminals are scheduled far uplink data transmission.

13. The method of claim 12, further comprising:
forming one or more sub-hypotheses for each hypothesis, wherein each sub-hypothesis corresponds to a specific ordering of the one or more terminals in the hypothesis, and wherein the performance of each sub-hypothesis is evaluated and, one sub-hypothesis is selected for each frequency band based on the evaluated performance.

14. The method of claim 13, wherein one terminal ordering is formed for each hypothesis based on a priority of each terminal in the hypothesis.

15. The method of claim 13, wherein each sub-hypothesis is evaluated by
processing signals hypothetically transmitted from the one or more terminals in the sub-hypothesis to provide processed signals, and
estimating signal-to-noise-and-interference ratios (SNRs) for the processed signals.

16. The method of claim 15, wherein the SNRs for the processed signals are dependent on a particular order in which the hypothetically transmitted signals are processed, and wherein the hypothetically transmitted signals are processed in a specific order determined by the terminal ordering for the sub-hypothesis being evaluated.

17. The method of claim 15, wherein one sub-hypothesis is formed for each hypothesis, and wherein the terminal ordering for the sub-hypothesis is determined based on the SNRs for the processed signals.

18. The method of claim 15, wherein one sub-hypothesis is formed for each hypothesis, and wherein transmitted signals from a lowest priority terminal in the hypothesis are processed first and transmitted signals from a highest priority terminal are processed last.

19. The method of claim 12, wherein the performance of each hypothesis is evaluated based on successive cancellation receiver processing.

20. The method of claim 19, wherein the successive cancellation receiver processing performs a plurality of iterations to recover a plurality of signals hypothetically transmitted from the one or more terminals in each hypothesis, one iteration for each hypothetically transmitted signal to be recovered.

21. The method of claim 20, wherein each iteration includes
processing a plurality of input signals in accordance with a particular equalization scheme to provide a plurality of processed signals,
detecting the processed signal corresponding to the hypothetically transmitted signal being recovered in the iteration to provide a decoded data stream, and
selectively deriving a plurality of modified signals based on the input signals and having interference components due to the decoded data stream approximately removed, and
wherein the input signals for a first iteration are signals received from the one or more terminals in the hypothesis being evaluated and the input signals for each subsequent iteration are the modified signals from a preceding iteration.

22. The method of claim 1, wherein each hypothesis is evaluated based in part on channel state information (CSI) for each terminal in the hypothesis.

23. The method of claim 22, wherein the channel state information comprises signal-to-noise-and-interference ratios (SNRs).

24. The method of claim 23, wherein each set of one or more terminals to be evaluated for a particular frequency band is associated with a respective matrix of SNRs achieved by the one or more terminals in the set for that frequency band.

25. The method of claim 22, wherein the channel state information comprises a channel gain for each transmit-receive antenna pair to be used for data transmission.

26. The method of claim 1, further comprising:
determining a data rate for each data stream to be transmitted for each scheduled terminal, and wherein a plurality of data steams are transmitted at the determined data rates.

27. The method of claim 26, further comprising:
determining a coding and modulation scheme to be used for each data stream to be transmitted, and wherein the plurality of data streams are processed based on the determined coding and modulation schemes prior to transmission.

28. The method of claim 1, wherein the plurality of terminals are scheduled for data transmission over a plurality of spatial subchannels.

29. The method of claim 28, wherein each selected hypothesis includes a plurality of SIMO terminals, wherein each SIMO terminal is assigned one spatial subchannel.

30. The method of claim 28, wherein each selected hypothesis includes a single MIMO terminal assigned all spatial subchannels.

31. The method of claim 28, wherein each selected hypothesis includes a combination of SIMO and MIMO terminals, wherein each SIMO terminal is assigned one spatial subchannel and each MIMO terminal is assigned two or more spatial subchannels.

32. The method of claim 1, wherein at least one set includes a plurality of MISO terminals each having a single antenna to receive a downlink data transmission.

33. The method of claim 1, wherein each set of multiple terminals includes terminals having similar link margins.

34. The method of claim 1, wherein the evaluating for each hypothesis includes
computing a performance metric for the hypothesis.

35. The method of claim 34, wherein the performance metric is a function of an overall throughput achievable by the one or more terminals in the hypothesis for a particular frequency band.

36. The method of claim 35, wherein the throughput for each terminal in the hypothesis is determined based on a signal-to-noise-and-interference ratio (SNR) achieved by the terminal for the particular frequency band.

37. The method of claim 35, wherein the throughput for each terminal is determined based on a signal-to-noise-and-interference ratio (SNR) achieved by the terminal for each of a plurality of frequency subchannels in the particular frequency band.

38. The method of claim 34, wherein for each frequency band the hypothesis having the best performance metric is selected for scheduling.

39. The method of claim 1, further comprising:
prioritizing the plurality of terminals to be scheduled for data transmission.

40. The method of claim 39, further comprising:
selecting a group of N highest priority terminals to be considered for scheduling for each frequency band, where N is one or greater.

41. The method of claim 39, further comprising:
maintaining one or more metrics for each terminal to be considered for scheduling, and wherein the priority of each terminal is determined based on the one or more metrics maintained for the terminal.

42. The method of claim 41, wherein one metric maintained for each terminal relates to an average throughput achieved by the terminal.

43. The method of claim 39, wherein the priority of each terminal is determined based on one or more factors maintained for the terminal and associated with quality of service (QoS).

44. In a multiple-output (MIMO) communication system utility orthogonal frequency division multiplexing (OFDM), a method for scheduling downlink data transmission for a plurality of terminals, comprising:
forming at least one set of terminals for possible data transmission for each of a plurality of frequency bands, wherein each set includes one or more terminals and corresponds to a hypothesis to be evaluated, and wherein each frequency band corresponds to a respective group of one or more frequency subchannels;
forming one or more sub-hypotheses for each hypothesis, wherein each sub-hypothesis corresponds to specific assignments of a plurality of transmit antennas to the one or more terminals in the hypothesis;
evaluating the performance of each sub-hypothesis;
selecting one sub-hypothesis for each frequency band based on the evaluated performance; and
selecting and scheduling the one or more terminals in each selected sub-hypothesis for downlink data transmission on the corresponding frequency band.

45. The method of claim 44, wherein the evaluating for each sub-hypothesis includes
determining an overall throughput for the one or more terminals in the sub-hypothesis based on the specific antenna assignments, and
wherein for each frequency band the sub-hypothesis with the highest throughput is selected.

46. The method of claim 44, wherein one set of terminals is formed, and wherein the one or more terminals in each set are selected based on priority.

47. In a multiple-input multiple-output (MIMO) communication system utilizing orthogonal frequency division multiplexing (OFDM), a method for scheduling downlink data transmission for a plurality of terminals, comprising:
forming at least one set of terminals for possible data transmission for each of a plurality of frequency bands, wherein each set includes a plurality of terminals and corresponds to a hypothesis to be evaluated, and wherein each frequency band corresponds to a respective group of one or more frequency subchannels;
forming a channel response matrix for the plurality of terminals in each hypothesis;
evaluating the performance of each hypothesis based on the channel response matrix;
selecting one hypothesis for each frequency band based on the evaluated performance; and
selecting and scheduling the one or more terminals in each selected hypothesis for downlink data transmission on the corresponding frequency band.

48. In a multiple-input multiple-output (MIMO) communication system utilizing orthogonal frequency division multiplexing (OFDM), a method for scheduling uplink data transmission for a plurality of terminals, comprising:
forming at least one set of terminals for possible data transmission for each of a plurality of frequency bands, wherein each set includes one or more terminals and corresponds to a hypothesis to be evaluated, and wherein each frequency band corresponds to a respective group of one or more frequency subchannels;
forming one or more sub-hypotheses for each hypothesis, wherein each sub-hypothesis corresponds to a specific ordering of the one or more terminals in the hypothesis
evaluating the performance of each sub-hypothesis;
selecting one sub-hypothesis for each frequency band based on the evaluated performance; and
selecting and scheduling the one or more terminals in each selected sub-hypothesis for uplink data transmission on the corresponding frequency band.

49. The method of claim 48, wherein signals transmitted from the one or more scheduled terminals in the selected sub-hypothesis for each frequency band are processed in a particular order determined by the ordering for the sub-hypothesis.

50. The method of claim 48, wherein the evaluating for each sub-hypothesis includes
processing each signal hypothetically transmitted from each terminal in the sub-hypothesis to provide a corresponding processed signal, and
determining a signal-to-noise-and-interference ratio (SNR) for each processed signal.

51. The method of claim 50, wherein one sub-hypothesis is formed for each hypothesis, and wherein the ordering in the sub-hypothesis is selected to achieve a best performance for the hypothesis, as determined by one or mare performance metrics.

52. A memory communicatively coupled to a digital signal processing device (DSPD) capable of interpreting digital information to:
receive channel state information ((CSI) indicative of channel estimates for a plurality of terminals inn wireless communication system;
form at least one set of terminals for possible data transmission for each of a plurality of frequency bands, wherein each set includes one or more terminals and corresponds to a hypothesis to be evaluated;
evaluate the performance of each hypothesis based in part on the channel state information for the one or more terminals in the hypothesis;
select one hypothesis for each frequency band based on the evaluated performance; and
select and schedule the one or more terminals in each selected hypothesis for data transmission on the corresponding frequency band.

53. A computer program product for scheduling data transmission for a plurality of terminals in a wireless communication system, comprising:

code for receiving channel state information (CSI) indicative of channel estimates for a plurality of terminals in the communication system;

code for forming at least one set of terminals for possible data transmission for each of a plurality of frequency bands, wherein each set includes one or more terminals and corresponds to a hypothesis to be evaluated;

code for evaluating the performance of each hypothesis based in part on the channel state information for the one or more terminals in the hypothesis;

code for selecting one hypothesis for each frequency band based on the evaluated performance;

code for selecting and scheduling the one or more terminals in each selected hypothesis for data transmission on the corresponding frequency band; and a computer-usable medium for stating the codes.

54. A scheduler in a multiple-input multiple-output (MIMO) communication system utilizing orthogonal frequency division multiplexing (OFDM), comprising:

means for receiving channel state information (CSI) indicative of channel estimates for a plurality of terminals in the communication system;

means for forming at least one set of terminals for possible data transmission for each of a plurality of frequency bands, wherein each set includes one or more terminals and corresponds to a hypothesis to be evaluated;

means for evaluating the performance of each hypothesis based in part on the channel state information for the one or more terminals in the hypothesis;

means for selecting one hypothesis for each frequency band based on the evaluated performance; and means for selecting and scheduling the one or more terminals in each selected hypothesis for data transmission on die corresponding frequency band.

55. The scheduler of claim 54, further comprising:

means for forming one or more sub-hypotheses for each hypothesis, wherein each sub-hypothesis corresponds to specific assignments of a plurality of transmit antennas to the one or more terminals in the hypothesis for downlink data transmission, wherein the performance of each sub-hypothesis is evaluated and one sub-hypothesis is selected for each frequency band based on the evaluated performance.

56. The scheduler of claim 54, further comprising:

means for forming one or more sub-hypotheses for each hypothesis, wherein each sub-hypothesis corresponds to a specific order for processing uplink dan transmissions from the one or more terminals in the hypothesis, wherein the performance of each sub-hypothesis is evaluated and one sub-hypothesis is selected for each frequency band based on the evaluated performance.

57. The scheduler of claim 54, further comprising:

means for prioritizing the plurality of terminals to be scheduled for data transmission.

58. A base station in a multiple-output (MIMO) communication system utilizing orthogonal frequency division multiplexing (OFDM), comprising:

a scheduler operative to receive channel state information (CSI) indicative of channel estimates for a plurality of terminals in the communication system, select a set of one or more terminals for data transmission for each of a plurality of frequency bands, and assign the one or more terminals in each selected set with a plurality of spatial subchannels in the corresponding frequency band;

a transmit data processor operative to receive and process data to provide a plurality of data streams for transmission to one or more scheduled terminals, wherein the data is processed based on the channel state information for the one or more scheduled terminals;

at least one modulator operative to process the plurality of data streams to provide a plurality of modulated signals; and a plurality of antennas configured to receive and transmit the plurality of modulated signals to the one or more scheduled terminals.

59. The base station of claim 58, wherein the scheduler is further operative to select a data rate for each data stream.

60. The base station of claim 58, wherein the scheduler is further operative to select a coding and modulation scheme to be used for each data stream, and wherein the transmit data processor is further operative to process the data for each data stream based on the coding and modulation scheme selected for the data stream.

61. The base station of claim 58, further comprising:

at least one demodulator operative to process a plurality of signals received via the plurality of antennas to provide a plurality of received signals, and a receive data processor operative to process the plurality of received signals to derive channel state information for the plurality of terminals in the communication system.

62. A transmitter apparatus in a multiple-input multiple-output (MIMO) communication system utilizing orthogonal frequency division multiplexing (OFDM), comprising:

means for receiving channel state information (CSI) indicative of channel estimates for a plurality of terminals in the communication system;

means for selecting a set of one or more terminals for data transmission for each of a plurality of frequency bands;

means for assigning the one or more terminals in each selected set with a plurality of spatial subchannels in the corresponding frequency band;

means for processing data to provide a plurality of data streams for transmission to one or more scheduled terminals, wherein the data is processed based on the channel state information for the one or more scheduled terminals;

means for processing the plurality of data streams to provide a plurality of modulated signals; and means for transmitting the plurality of modulated signals to the one or more scheduled terminals.

63. A terminal in a multiple-input multiple-output (MIMO) communication system, comprising:

a plurality of antennas, each antenna configured to receive a plurality of transmitted signals and to provide a respective received signal;

a plurality of front-end units, each front-end unit operative to process a respective received signal to provide a corresponding stream of samples, and to derive channel state information (CSI) for a plurality of sample streams;

a receive processor operative to process the plurality of sample streams from the plurality of front-end units to provide one or more decoded data streams; and a transmit data processor operative to process the channel state information for transmission, and wherein the terminal is one of one or more terminals included in a set selected and scheduled for data transmission via one or more of a plurality of frequency bands for a particular time interval.

64. The terminal of claim 63, further comprising:
at least one demodulator operative to process the plurality of sample streams to provide one or more received symbol streams for one or more spatial subchannels of one or more frequency subchannels assigned to the terminal for downlink data transmission.

65. A multiple-input multiple-output (MIMO) communication system utilizing orthogonal frequency division multiplexing (OFDM), comprising:
a scheduler operative to receive channel state information (CSI) indicative of channel estimates for a plurality of terminals in the communication system, select a set of one or more terminals for data transmission on each of a plurality of frequency bands, and assign the one or more terminals in each selected set with a plurality of spatial subchannels in the corresponding frequency band;
a base station operative to process transmissions for one or more terminals scheduled for data transmission on the plurality of spatial subchannels of the plurality of frequency bands; and
a plurality of terminals, each terminal operative to communicate with the base station via one or more spatial subchannels of one or more frequency bands assigned to the terminal when scheduled for data transmission by the scheduler.

* * * * *